United States Patent
Yang et al.

(10) Patent No.: US 12,431,744 B2
(45) Date of Patent: Sep. 30, 2025

(54) WIRELESS RECEIVING DEVICE, WIRELESS CHARGING SYSTEM, WIRELESS CHARGING METHOD

(71) Applicant: GUANGDONG OPPO MOBILE TELECOMMUNICATIONS CORP., LTD., Guangdong (CN)

(72) Inventors: Jun Yang, Guangdong (CN); Jun Zhang, Guangdong (CN); Shiming Wan, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 815 days.

(21) Appl. No.: 17/734,659

(22) Filed: May 2, 2022

(65) Prior Publication Data

US 2022/0263351 A1 Aug. 18, 2022

Related U.S. Application Data

(63) Continuation of application No. PCT/CN2019/118785, filed on Nov. 15, 2019.

(51) Int. Cl.
*H02J 7/00* (2006.01)
*G06F 1/3206* (2019.01)
(Continued)

(52) U.S. Cl.
CPC ............ *H02J 50/80* (2016.02); *G06F 1/3206* (2013.01); *H02J 50/12* (2016.02); *H02J 50/40* (2016.02)

(58) Field of Classification Search
CPC ............... H02J 7/00; H02J 50/80; H02J 50/12
(Continued)

(56) References Cited

U.S. PATENT DOCUMENTS 5,352,969 A * 10/1994 Gilmore .............. H02J 7/00047
320/160
5,612,580 A * 3/1997 Janonis ................... H02J 9/062
307/64
(Continued)

FOREIGN PATENT DOCUMENTS

CN    103633703    3/2014
CN    203607899    5/2014
(Continued)

OTHER PUBLICATIONS

WIPO, International Search Report and Written Opinion for International Application No. PCT/CN2019/118785, Jul. 28, 2020.
(Continued)

*Primary Examiner* — Alexis B Pacheco
(74) *Attorney, Agent, or Firm* — Hodgson Russ LLP

(57) ABSTRACT

A wireless receiving device, a wireless charging system and a wireless charging method are provided. The device includes a plurality of receiving coils coupled with a transmitting coil respectively, and configured to receive wireless charging signals transmitted from the transmitting coil respectively; and a plurality of wireless receiving-processing circuits configured to perform a voltage and/or current process for the wireless charging signals received by the receiving coils, to charge a battery. A terminal of each of the wireless receiving-processing circuits is connected to a corresponding one of the receiving coils, and another terminal of each of the wireless receiving-processing circuits is connected to the battery. Since the wireless receiving device includes a plurality of receiving coils and a plurality of wireless receiving-processing circuits, a charging speed and a charging efficiency of wireless charging may be improved.

18 Claims, 13 Drawing Sheets

(51) Int. Cl.
  *H02J 7/14* (2006.01)
  *H02J 50/12* (2016.01)
  *H02J 50/40* (2016.01)
  *H02J 50/80* (2016.01)
(58) Field of Classification Search
  USPC .......................................................... 320/109
  See application file for complete search history.

(56) References Cited

U.S. PATENT DOCUMENTS

| | | | | |
|---|---|---|---|---|
| 5,774,347 | A * | 6/1998 | Nakanishi | G05F 1/565 363/81 |
| 8,890,470 | B2 * | 11/2014 | Partovi | H02J 50/80 320/108 |
| 9,812,890 | B1 * | 11/2017 | Leabman | H02J 50/80 |
| 2009/0121675 | A1 * | 5/2009 | Ho | H02M 3/33507 320/108 |
| 2011/0140671 | A1 * | 6/2011 | Kim | H02J 50/50 320/137 |
| 2012/0175967 | A1 * | 7/2012 | Dibben | B60L 53/124 307/104 |
| 2013/0009462 | A1 | 1/2013 | Amano et al. | |
| 2014/0015335 | A1 * | 1/2014 | Lee | H02J 50/80 307/104 |
| 2015/0155095 | A1 | 6/2015 | Wu et al. | |
| 2016/0099601 | A1 | 4/2016 | Leabman et al. | |
| 2016/0105032 | A1 * | 4/2016 | Cho | H02J 50/12 307/104 |
| 2018/0159359 | A1 * | 6/2018 | Park | H02J 50/402 |
| 2018/0191206 | A1 * | 7/2018 | Bronson | G06F 1/28 |
| 2019/0199128 | A1 * | 6/2019 | Neufeld | H02K 7/1823 |
| 2021/0313870 | A1 * | 10/2021 | Iwabuki | H02M 1/007 |

FOREIGN PATENT DOCUMENTS

| | | |
|---|---|---|
| CN | 104052099 | 9/2014 |
| CN | 106160249 | 11/2016 |
| CN | 107220446 | 9/2017 |
| CN | 107612159 | 1/2018 |
| CN | 107919710 | 4/2018 |
| CN | 107919735 | 4/2018 |
| CN | 108155727 | 6/2018 |
| CN | 109888863 | 6/2019 |
| WO | 2015123651 | 8/2015 |
| WO | 2018053721 | 3/2018 |
| WO | 2019128405 | 7/2019 |

OTHER PUBLICATIONS

Yang et al., "Intelligent wireless charging and discharging system for multiple series parallel lithium batteries," Journal of Yunnan University (Natural Sciences Edition), vol. 40, No. 2, 2018.
EPO, European Search Report and Opinion for EP Application No. 19952618.7, Sep. 26, 2022.
CNIPA, Second Office Action for CN Application No. 201980100245. 2, Mar. 8, 2024.
CNIPA, Rejection Decision for CN Application No. 201980100245. 2, May 21, 2024.
CNIPA, First Office Action for CN Application No. 201980100245. 2, Nov. 6, 2023.
EPO, Communication for EP Application No. 19952618.7, Jul. 15, 2025.

* cited by examiner

1000 receiving, by a plurality of receiving coils, wireless charging signals transmitted from a transmitting coil ~S1010 performing, by a plurality of wireless receiving-processing circuits, a voltage and/or current process for the wireless charging signals received by the receiving coils, to charge a battery ~S1020 controlling and adjusting output currents of at least some of the plurality of the receiving coils, in response to the impedances of the plurality of the receiving coils or impedances of the plurality of wireless receiving-processing circuits being different ~S1030

FIG. 11

1200 receiving, by a plurality of receiving coils, wireless charging signals transmitted from a transmitting coil ~S1210 performing, by a plurality of AC/DC converting circuits, a voltage and/or current process for the wireless charging signals received by the receiving coils, to obtain DC voltages and DC currents ~S1220 performing, by voltage converting circuits, a voltage-boosting or voltage-bucking process for the DC voltages to obtain a target DC voltage for charging a battery ~S1230

FIG. 12

WIRELESS RECEIVING DEVICE, WIRELESS CHARGING SYSTEM, WIRELESS CHARGING METHOD

CROSS REFERENCE TO RELATED APPLICATIONS

The present application is a continuation-application of International (PCT) Patent Application No. PCT/CN2019/118785, filed on Nov. 15, 2019, the entire disclosure of which is incorporated by reference herein.

TECHNICAL FIELD

The present disclosure relates to a technical field of charging, and in particular to a wireless receiving device, a wireless charging system, and a wireless charging method.

BACKGROUND

In the relate art, when a means of wireless charging is adopted to charge an electronic device (such as a mobile phone, a pad, a wristband, etc.), requirements for a wireless charging power are becoming higher and higher.

In a process of the wireless charging, generally a power adapter is connected to a wireless charging base. An output power of the power adapter is transmitted to the electronic device by means of a wireless (such as an electromagnetic signal or an electromagnetic microwave) and configured to wirelessly charge the electronic device.

However, with a battery capacity of the electronic device increasing, requirements for a wireless charging rate are becoming higher and higher, and existing wireless charging methods cannot satisfy increasing requirements for the wireless charging rate.

SUMMARY OF THE DISCLOSURE

A wireless receiving device, a wireless charging system, a wireless charging method are provided in the embodiments of the present disclosure, to solve charging problems in a related art.

According to a first aspect, a wireless receiving device is provided and includes a plurality of receiving coils coupled with a transmitting coil respectively, and configured to receive wireless charging signals transmitted from the transmitting coil respectively; and a plurality of wireless receiving-processing circuits configured to perform a voltage and/or current process for the wireless charging signals received by the receiving coils, to charge a battery. A terminal of each of the wireless receiving-processing circuits is connected to a corresponding one of the receiving coils, and another terminal of each of the wireless receiving-processing circuits is connected to the battery.

According to a second aspect, a wireless receiving device is provided and includes a plurality of receiving coils coupled with a transmitting coil, and configured to receive wireless charging signals transmitted from the transmitting coil respectively; a plurality of Alternating Current (AC)/Direct Current (DC) converting circuits configured to perform a voltage and/or current process for the wireless charging signals received from the plurality of the receiving coils respectively, to obtain DC voltages and DC currents; and voltage converting circuits connected to the plurality of the AC/DC converting circuits, and configured to perform a voltage-boosting or voltage-bucking process for the DC voltages to obtain a target DC voltage for charging a battery. A terminal of each of the AC/DC converting circuits is connected to a corresponding one of the plurality of the receiving coils, and another terminal of each of the AC/DC converting circuits is connected to the voltage converting circuits.

According to a third aspect, a wireless charging system is provided and includes a wireless transmitting device and a wireless receiving device. The wireless transmitting device includes an inverter circuit configured to convert an input DC to an AC and a transmitting coil configured to convert the AC to a wireless charging signal capable of being transmitted through an electromagnetic domain. The wireless receiving device includes a plurality of receiving coils coupled with the transmitting coil, and configured to receive wireless charging signals transmitted by the transmitting coil; and a plurality of wireless receiving-processing circuits configured to perform a voltage and/or current process for the wireless charging signals received by the receiving coils, to charge a battery. A terminal of each of the wireless receiving-processing circuits is connected to a corresponding one of the receiving coils, and another terminal of each of the wireless receiving-processing circuits is connected to the battery.

According to a fourth aspect, a wireless charging method is provided and includes a plurality of receiving coils receiving wireless charging signals transmitted from a transmitting coil; and a plurality of wireless receiving-processing circuits performing a voltage and/or current process for the wireless charging signals received by the receiving coils, to charge a battery. A terminal of each of the wireless receiving-processing circuits is connected to a corresponding one of the receiving coils, and another terminal of each of the wireless receiving-processing circuits is connected to the battery.

According to a fifth aspect, a wireless charging method is provided and includes a plurality of receiving coils receiving wireless charging signals transmitted from a transmitting coils; a plurality of AC/DC converting circuits performing a voltage and/or current process for the wireless charging signals received from the plurality of the receiving coils respectively, to obtain DC voltages and DC currents; and voltage converting circuits performing a voltage-boosting or voltage-bucking voltage process for the DC voltages to obtain a target DC voltage for charging a battery. A terminal of each of the AC/DC converting circuits is connected to a corresponding one of the plurality of the receiving coils, and another terminal of each of the AC/DC converting circuits is connected to the voltage converting circuits.

According to a sixth aspect, a wireless charging method is provided and includes converting an input DC to an AC; converting the AC to a wireless charging signal capable of being transmitted through an electromagnetic domain; a plurality of receiving coils receiving wireless charging signals transmitted from the transmitting coil; and wireless receiving-processing circuits performing a voltage and/or current process for the wireless charging signals received by the receiving coils, to charge a battery. A terminal of each of the wireless receiving-processing circuits is connected to a corresponding one of the receiving coils, and another terminal of each of the wireless receiving-processing circuits is connected to the battery.

According to a seventh aspect, a non-transitory computer-readable storage medium is provided and configured to store computer programs. The computer programs are configured to cause a computer to perform the method described in any one of aspects or embodiments of the fourth aspect to the sixth aspect.

According to an eighth aspect, a computer program product is provided and includes computer program instructions configured to cause a computer to perform the method described in any one of aspects or embodiments of the fourth aspect to the sixth aspect.

BRIEF DESCRIPTION OF THE DRAWINGS

FIG. 11 is a schematic flowchart of the wireless charging method according to another embodiment of the present disclosure.

FIG. 12 is a schematic flowchart of the wireless charging method according to a yet embodiment of the present disclosure.

DETAILED DESCRIPTION

Figure 1:
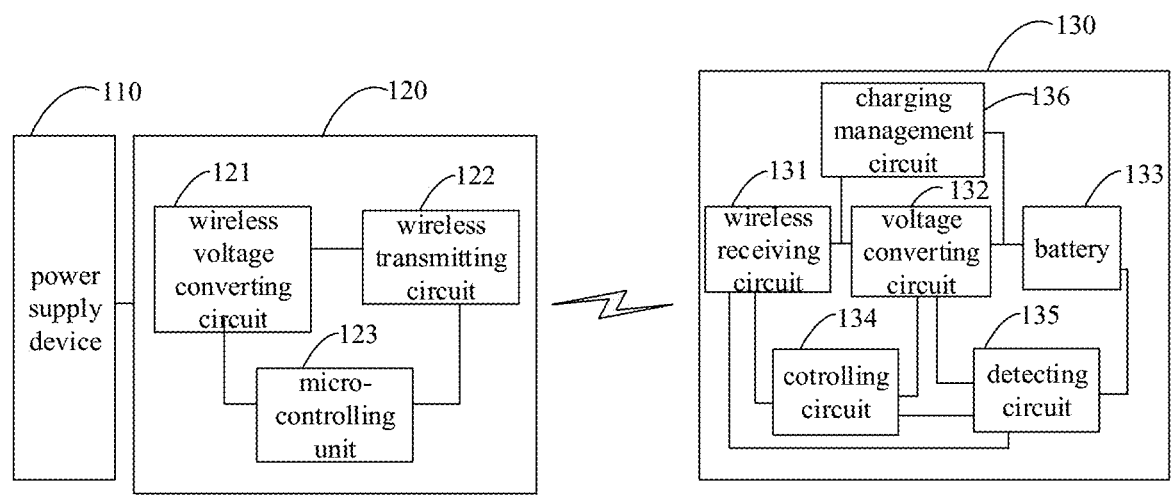
FIG. 1 is a schematic view of a wireless charging system according to an embodiment of the present disclosure.

The technical solutions in the embodiments of the present disclosure will be clearly and completely described in the following with reference to accompanying drawings. Obviously, the embodiments described are part of the embodiments of the present disclosure, but not all of the embodiments. Based on the embodiments in the present disclosure, all other embodiments obtained by those of ordinary skill in the art without creative work shall fall within a protection scope of the present disclosure.

In order to understand the solutions of the present disclosure more clearly, an operating principle of the wireless charging will be briefly introduced in the following. However, it should be understood that contents introduced in the following is only for a better understanding of the present disclosure, and should not specifically limit the present disclosure.

According to a first aspect, a wireless receiving device is provided and includes a plurality of receiving coils coupled with a transmitting coils respectively, and configured to receive wireless charging signals transmitted from the transmitting coil respectively; and a plurality of wireless receiving-processing circuits configured to perform a voltage and/or current process for the wireless charging signals received by the receiving coils, to charge a battery. A terminal of each of the wireless receiving-processing circuits is connected to a corresponding one of the receiving coils, and another terminal of each of the wireless receiving-processing circuits is connected to the battery.

In some embodiments, the receiving coils include a first receiving coil coupled to the transmitting coil, and configured to receive a first wireless charging signal from the transmitting coil; and a second receiving coil coupled to the transmitting coil, and configured to receive a second wireless charging signal from the transmitting coil.

In some embodiments, the first receiving coil and the second receiving coil are arranged at least overlappingly, to make the first receiving coil and the second receiving coil able to be simultaneously aligned with the transmitting coil.

In some embodiments, the first receiving coil and the second receiving coil are arranged on a same Flexible Printed Circuit (FPC) substrate and are isolated by a shielding layer.

In some embodiments, both the first receiving coil and the second receiving coil are formed by winding wires covered with an insulating material.

In some embodiments, the plurality of the wireless receiving-processing circuits include a first AC/DC converting circuit connected to the first receiving coil, and configured to convert the first wireless charging signal to a first DC voltage and a first DC current; and a second AC/DC converting circuit connected to the second receiving coil, and configured to convert the second wireless charging signal to a second DC voltage and a second DC current. The plurality of the wireless receiving-processing circuits further include a first voltage converting circuit connected to the first AC/DC converting circuit and a second voltage converting circuit connected to the second AC/DC converting circuit. The first voltage converting circuit and the second AC/DC converting circuit are configured to perform a voltage-boosting or voltage-bucking voltage process for the first DC voltage and the second DC voltage respectively, to obtain a third DC voltage for charging the battery. The wireless receiving-processing circuits further include a controlling circuit, configured to control the first AC/DC converting circuit and the first voltage converting circuit to operate, and/or control the second AC/DC converting circuit and the second voltage converting circuit to operate, based on charging stages of the battery. In some embodiments, the charging stages of the battery comprise at least one of: a trickle charging stage, a constant-current charging stage and a constant-voltage charging stage.

In some embodiments, the first voltage converting circuit includes a DC-DC buck circuit, a buck-boost circuit or a charging IC.

In some embodiments, the controlling circuit is configured to control the first voltage converting circuit to operate in one or more of the following charging stages: the trickle charging stage, the constant-current charging stage and the constant-voltage charging stage.

In some embodiments, the second voltage converting circuit includes a charge pump circuit.

In some embodiments, the controlling circuit is configured to control the charge pump circuit to operate in the constant-current charging stage.

In some embodiments, both the first voltage converting circuit and the second voltage converting circuit include a charge pump circuit respectively. The wireless receiving-processing circuits further include a third voltage converting circuit connected to the first AC/DC converting circuit and/or the second AC/DC converting circuit. The controlling circuit is configured to control the first voltage converting circuit and the second voltage converting circuit to operate in the constant-current charging stage, and control the third voltage converting circuit to operate in the trickle charging stage and/or the constant-voltage charging stage.

In some embodiments, the third voltage converting circuit includes a buck circuit or a buck-boost circuit or a charging IC.

In some embodiments, the wireless receiving-processing circuits include a first AC/DC converting circuit connected to the first receiving coil, and configured to convert the first wireless charging signal in a first DC voltage and a first DC current; a second AC/DC converting circuit connected to the second receiving coil, and configured to convert the second wireless charging signal to a second DC voltage and a second DC current; a first voltage converting circuit connected to the first AC/DC converting circuit; and a second voltage converting circuit connected to the second AC/DC converting circuit. The first AC/DC converting circuit and the second AC/DC converting circuit are configured to perform a voltage-boosting or a voltage-bucking process for the first DC voltage and the second DC voltage respectively, to obtain a third DC voltage for charging the battery. The wireless receiving-processing circuits further include a controlling circuit configured to control the first AC/DC converting circuit and the first voltage converting circuit to operate, and/or control the second AC/DC converting circuit and the second voltage converting circuit to operate, based on charging modes of the battery. The charging modes of the battery include a first charging mode and a second charging mode, and a first charging speed of the first charging mode is greater than a second charging speed of the second charging mode.

In some embodiments, the battery includes a plurality of cells connected in parallel or a plurality of cells connected in series.

In some embodiments, voltage converting circuits included by the wireless receiving-processing circuits are configured to perform the voltage-bucking process for DC voltages after being processed by AC/DC converting circuits included by the wireless receiving-processing circuits, in response to the battery including the plurality of cells connected in parallel.

In some embodiments, voltage converting circuits included by the wireless receiving-processing circuits are configured to perform the voltage-boosting process for DC voltages after being processed by AC/DC converting circuits included by the wireless receiving-processing circuits, in response to the battery including the plurality of cells connected in series.

In some embodiments, each of the wireless receiving-processing circuits includes an AC/DC converting circuit configured to convert a wireless charging signal received by a receiving coil connected to the AC/DC converting circuit to a DC voltage and a DC current; and a voltage converting circuit configured to perform a voltage-boosting or a voltage-bucking process for the DC voltage output by the AC/DC converting circuit, to obtain a charging voltage satisfying charging requirements of the battery.

In some embodiments, the wireless receiving device may further include a controlling circuit configured to generate feedback information based on at least one of charging parameters and feed the feedback information back to a wireless transmitting device. The charging parameters include a voltage between two terminals of the battery, a charging current of the battery, an output current of each of the AC/DC converting circuits, an output voltage of each of the AC/DC converting circuits. The feedback information is configured to instruct the wireless transmitting device to adjust transmission powers of wireless charging signals transmitted from the wireless transmitting device.

In some embodiments, the feedback information may include the voltage between two terminals of the battery, the charging current of the battery, the output current of each of the AC/DC converting circuits, the output voltage of each of the AC/DC converting circuits. The voltage between two terminals of the battery and the charging current of the battery are provided to the wireless transmitting device to determine the transmission powers of the wireless charging signals, the output current of each of the AC/DC converting circuits and the output voltage of each of the AC/DC converting circuits are provided to the wireless transmitting device to determine transmission voltages of the wireless charging signals after the transmission powers of the wireless charging signals being determined.

In some embodiments, the controlling module is further configured to determine a required charging power of the battery based on the voltage between the two terminals of the battery and/or the charging current of the battery, and feed the required charging power as the feedback information back to the wireless transmitting device, to make the wireless transmitting device adjust the transmission powers of the wireless charging signals.

In some embodiments, the wireless receiving device may further include a controlling circuit configured to determine a required current of the battery based on output currents and/or output voltages of the AC/DC converting circuits, and feed the required current back to the wireless transmitting device to make the wireless transmitting device adjust the transmission powers of the wireless charging signals based on the required current.

In some embodiments, the wireless receiving device may further includes a controlling circuit configured to determine a required charging power of the battery based on information of the battery, and determine a required current of the battery based on output currents of the AC/DC converting circuits, and determine a required voltage of the battery based on the required charging power and the required current, and feed the required voltage or a voltage difference between the required voltage and an output voltage of any one of the AC/DC converting circuits back to the wireless transmitting device.

In some embodiments, the feedback information is configured to instruct the wireless transmitting device to increase or decrease the transmission voltages.

In some embodiments, the wireless receiving device is configured to send the feedback information to the wireless transmitting device by any one or more of the plurality of the receiving coils; or the wireless receiving device is configured to send the feedback information to the wireless transmitting device by means of an out-of-band communication.

In some embodiments, power received by the plurality of the receiving coils are the same.

In some embodiments, the wireless receiving device may further include a controlling circuit configured to control the powers received by the plurality of the receiving coils.

In some embodiments, the controlling circuit is configured to control the powers received by the plurality of the receiving coils based on differences among impedances of the plurality of the receiving coils.

In some embodiments, the wireless transmitting device may further include a controlling circuit configured to control and adjust output currents of at least part of the plurality of the receiving coils, in response to impedances of the plurality of the receiving coils or impedances of the plurality of the wireless receiving-processing circuits being different.

In some embodiments, the wireless transmitting device may further include a controlling circuit configured to control some of the plurality of the receiving coils to receive the wireless charging signals transmitted from a wireless transmitting device, some of the wireless receiving-processing circuits corresponding to the some of the receiving coils being configured to perform a voltage and/or current process for the wireless charging signals. The some of the receiving coils are at least one of the receiving coils.

In some embodiments, the controlling circuit is configured to control the some of the plurality of the receiving coils to receive the wireless charging signals transmitted from the wireless transmitting device, the some of the wireless receiving-processing circuits corresponding to the some of the receiving coils being configured to perform the voltage and/or current process for the wireless charging signals, in response to at least one of preset conditions being satisfied. The preset conditions include a power transmitted from the wireless transmitting device being less than a preset power threshold; a temperature of any one of the multiple receiving coils being greater than a preset temperature threshold; and an output voltage or output current of any one of the wireless receiving-processing circuits being greater than a preset voltage/current threshold.

In some embodiments, the battery includes a plurality of cells, each of the plurality of the wireless receiving-processing circuits being connected to and configured to charge for one of the cells.

According to a second aspect, a wireless receiving device is provided and includes a plurality of receiving coils coupled with a transmitting coil, and configured to receive wireless charging signals transmitted from the transmitting coil respectively; a plurality of Alternating Current (AC)/Direct Current (DC) converting circuits configured to perform a voltage and/or current process for the wireless charging signals received from the plurality of the receiving coils respectively, to obtain DC voltages and DC currents; and voltage converting circuits connected to the plurality of the AC/DC converting circuits, and configured to perform a voltage-boosting or voltage-bucking process for the DC voltages to obtain a target DC voltage for charging a battery. A terminal of each of the AC/DC converting circuits is connected to a corresponding one of the plurality of the receiving coils, and another terminal of each of the AC/DC converting circuits is connected to the voltage converting circuits.

In some embodiments, the receiving coils include a first receiving coil coupled to the transmitting coil, and configured to receive a first wireless charging signal from the transmitting coil; and a second receiving coil coupled to the transmitting coil, and configured to receive a second wireless charging signal from the transmitting coil.

In some embodiments, the first receiving coil and the second receiving coil are arranged at least overlappingly, to make the first receiving coil and the second receiving coil able to be simultaneously aligned with the transmitting coil.

In some embodiments, the first receiving coil and the second receiving coil are arranged on a same Flexible Printed Circuit (FPC) substrate and are isolated by a shielding layer.

In some embodiments, both the first receiving coil and the second receiving coil are formed by winding wires covered with an insulating material.

In some embodiments, the plurality of the AC/DC converting circuits include a first AC/DC converting circuit connected to the first receiving coil, and configured to convert the first wireless charging signal to a first DC voltage and a first DC current; and a second AC/DC converting circuit connected to the second receiving coil, and configured to convert the second wireless charging signal to a second DC voltage and a second DC current. The voltage converting circuits include a first voltage converting circuit configured to perform the voltage-boosting or voltage-bucking process for the first DC voltage and the second DC current, to obtain the target DC voltage for charging the battery. The wireless receiving device further includes a controlling circuit configured to control the first AC/DC converting circuit and the first voltage converting circuit to operate, and/or control the second AC/DC converting circuit and the first voltage converting circuit to operate, based on charging stages or charging modes of the battery. The charging stages of the battery include at least one of: a trickle charging stage, a constant-current charging stage and a constant-voltage charging stage. The charging modes of the battery include a first charging mode and a second charging mode, and a first charging speed of the first charging mode is greater than a second charging speed of the second charging mode.

In some embodiments, the first voltage converting module includes a charge pump circuit. The voltage converting modules further include a second converting module connected to the first AC/DC converting module and/or the second AC/DC converting module. The controlling module is configured to control the first voltage converting module to operate in the constant-current charging stage and control the second voltage converting module to operate in the trickle charging stage and the constant-voltage charging stage; or control the first voltage converting module to operate in the first charging mode and control the second voltage converting module to operate in the second charging mode.

In some embodiments, the second voltage converting module comprises a buck circuit, a buck-boost circuit or a charging IC.

According to a third aspect, a wireless charging system is provided and includes a wireless transmitting device and a wireless receiving device. The wireless transmitting device includes an inverter circuit configured to convert an input DC to an AC and a transmitting coil configured to convert the AC to a wireless charging signal capable of being transmitted through an electromagnetic domain. The wireless receiving device includes a plurality of receiving coils coupled with the transmitting coil, and configured to receive wireless charging signals transmitted by the transmitting coil; and a plurality of wireless receiving-processing circuits configured to perform a voltage and/or current process for the wireless charging signals received by the receiving coils, to charge a battery. A terminal of each of the wireless receiving-processing circuits is connected to a corresponding one of the receiving coils, and another terminal of each of the wireless receiving-processing circuits is connected to the battery.

In some embodiments, the receiving coils include a first receiving coil coupled to the transmitting coil, and configured to receive a first wireless charging signal from the transmitting coil; and a second receiving coil coupled to the transmitting coil, and configured to receive a second wireless charging signal from the transmitting coil.

In some embodiments, the plurality of the wireless receiving-processing modules comprise a first AC/DC converting module connected to the first receiving coil, and configured to convert the first wireless charging signal to a first DC voltage and a first DC current; a second AC/DC converting module connected to the second receiving coil, and configured to convert the second wireless charging signal to a second DC voltage and a second DC current; a first voltage converting module connected to the first AC/DC converting module; and a second voltage converting module connected to the second AC/DC converting module. The first voltage converting module and the second voltage converting module are configured to perform a voltage-boosting or voltage-bucking voltage process for the first DC voltage and the second DC voltage respectively, to obtain a third DC voltage for charging the battery. The wireless receiving device further comprises a controlling module configured to control the first AC/DC converting module and the first voltage converting module to operate, and/or control the second AC/DC converting module and the second voltage converting module to operate, based on charging stages or charging modes of the battery. The charging stages of the battery comprise at least one of: a trickle charging stage, a constant-current charging stage and a constant-voltage charging stage. The charging modes of the battery comprise a first charging mode and a second charging mode, and a first charging speed of the first charging mode is greater than a second charging speed of the second charging mode.

According to a fourth aspect, a wireless charging method is provided and includes a plurality of receiving coils receiving wireless charging signals transmitted from a transmitting coil; and a plurality of wireless receiving-processing circuits performing a voltage and/or current process for the wireless charging signals received by the receiving coils, to charge a battery. A terminal of each of the wireless receiving-processing circuits is connected to a corresponding one of the receiving coils, and another terminal of each of the wireless receiving-processing circuits is connected to the battery.

In some embodiments, the receiving coils include a first receiving coil coupled to the transmitting coil, and configured to receive a first wireless charging signal from the transmitting coil; and a second receiving coil coupled to the transmitting coil, and configured to receive a second wireless charging signal from the transmitting coil.

In some embodiments, the first receiving coil and the second receiving coil are arranged at least overlappingly, to make the first receiving coil and the second receiving coil able to be simultaneously aligned with the transmitting coil.

In some embodiments, the first receiving coil and the second receiving coil are arranged on a same Flexible Printed Circuit (FPC) substrate and are isolated by a shielding layer.

In some embodiments, both the first receiving coil and the second receiving coil are formed by winding wires covered with an insulating material.

In some embodiments, the plurality of the wireless receiving-processing modules comprise a first AC/DC converting module connected to the first receiving coil and a second AC/DC converting module connected to the second receiving coil, the method further comprising the first AC/DC converting module converting the first wireless charging signal to a first DC voltage and a first DC current; and the second AC/DC converting module converting the second wireless charging signal to a second DC voltage and a second DC current. the wireless receiving-processing modules further comprise a first voltage converting module connected to the first AC/DC converting module and a second voltage converting module connected to the second AC/DC converting module, the method further comprising the first voltage converting module and the second voltage converting module performing a voltage-boosting or voltage-bucking process for the first DC voltage and the second DC voltage respectively, to obtain a third DC voltage for charging the battery. The wireless receiving device further comprises a controlling module, the method further comprising the controlling module controlling the first AC/DC converting module and the first voltage converting module to operate, and/or controlling the second AC/DC converting module and the second voltage converting module to operate, based on charging stages or charging modes of the battery. The charging stages of the battery comprise at least one of a trickle charging stage, a constant-current charging stage and a constant-voltage charging stage. The charging modes of the battery comprise a first charging mode and a second charging mode, and a first charging speed of the first charging mode is greater than a second charging speed of the second charging mode.

According to a fifth aspect, a wireless charging method is provided and includes a plurality of receiving coils receiving wireless charging signals transmitted from a transmitting coils; a plurality of AC/DC converting circuits performing a voltage and/or current process for the wireless charging signals received from the plurality of the receiving coils respectively, to obtain DC voltages and DC currents; and voltage converting circuits performing a voltage-boosting or voltage-bucking voltage process for the DC voltages to obtain a target DC voltage for charging a battery. A terminal of each of the AC/DC converting circuits is connected to a corresponding one of the plurality of the receiving coils, and another terminal of each of the AC/DC converting circuits is connected to the voltage converting circuits.

In some embodiments, the receiving coils include a first receiving coil coupled to the transmitting coil, and configured to receive a first wireless charging signal from the transmitting coil; and a second receiving coil coupled to the transmitting coil, and configured to receive a second wireless charging signal from the transmitting coil.

In some embodiments, the first receiving coil and the second receiving coil are arranged at least overlappingly, to make the first receiving coil and the second receiving coil able to be simultaneously aligned with the transmitting coil.

In some embodiments, the first receiving coil and the second receiving coil are arranged on a same Flexible Printed Circuit (FPC) substrate and are isolated by a shielding layer.

In some embodiments, both the first receiving coil and the second receiving coil are formed by winding wires covered with an insulating material.

In some embodiments, the plurality of the AC/DC converting modules comprise a first AC/DC converting module connected to the first receiving coil and a second AC/DC converting module connected to the second receiving coil, the method further comprising the first AC/DC converting module converting the first wireless charging signal to a first DC voltage and a first DC current; and the second AC/DC converting module converting the second wireless charging signal to a second DC voltage and a second DC current. The voltage converting modules performing a voltage-boosting or voltage-bucking process for the DC voltages to obtain a target DC voltage charging for a battery, comprises the voltage converting modules comprising a first voltage converting module, the first voltage converting module performing the voltage-boosting or boosting-bucking process for the first DC voltage and the second DC current, to obtain the target DC voltage charging for the battery. The wireless receiving device further comprises a controlling module, the method further comprising the controlling module controlling the first AC/DC converting module and the voltage converting modules to operate, and/or controlling the second AC/DC converting module and the voltage converting modules to operate, based on charging stages or charging modes of the battery. The charging stages of the battery comprise at least one of: a trickle charging stage, a constant-current charging stage and a constant-voltage charging stage. The charging modes of the battery comprise a first charging mode and a second charging mode, and a first charging speed of the first charging mode is greater than a second charging speed of the second charging mode.

According to a sixth aspect, a non-transitory computer-readable storage medium is provided and configured to store computer programs. The computer programs are configured to cause a computer to perform the method described in any one of aspects or embodiments of the fourth aspect to the sixth aspect.

FIG. 1 is a schematic view of a wireless charging system according to an embodiment of the present disclosure. The wireless charging method will be introduced briefly in the following with reference to FIG. 1.

Referring to FIG. 1, the wireless charging system may include a power supply device 110, a wireless transmitting device 120, and a to-be-charged device 130. The transmitting device 120 may be, for example, a wireless charging base. The to-be-charged device 130 may be, for example, a terminal.

After the power supply device 110 is connected to the transmitting device 120, an output voltage and an output current of the power supply device 110 are transmitted to the transmitting device 120.

The transmitting device 120 may convert the output voltage and the output current of the power supply device 110 to wireless charging signals (e.g., electromagnetic signals) through an internal wireless transmitting circuit 122 for transmission. For example, the wireless transmitting circuit 122 may convert the output current of the power supply device 110 to an AC, and convert the AC to a wireless charging signal through a transmitting coil or a transmitting antenna (not shown in the drawings). A wireless voltage converting circuit 121 may perform a convert processing for the output voltage of the power supply device 110. A micro-controlling unit 123 may control voltages of the wireless voltage converting circuit 121 and the wireless transmitting circuit 122.

The to-be-charged device 130 may be configured to receive the wireless charging signal transmitted from the wireless transmitting circuit 122 through a wireless receiving circuit 131, and convert the wireless charging signal to an output voltage and an output current of the wireless receiving circuit 131.

For example, the wireless receiving circuit 131 may convert the electromagnetic signals transmitted from the wireless transmitting circuit 122 to the AC via a receiving coil or a receiving antenna (not shown in the drawings), perform operations such as rectification and/or filtration for the AC, and further convert the AC to the output voltage and the output current of the wireless receiving circuit 131. A voltage converting circuit 132 or a charging management circuit 136 may be configured to adjust an output voltage and an output current of the wireless receiving circuit 131, to obtain a charging voltage and/or a charging current expected by a battery 133 in the to-be-charged device 130 to achieve charging for the battery 133.

The above-mentioned charging management circuit 136 may be, for example, a charging IC (Integrated Circuit).

A detecting circuit 135 in the embodiments of the present disclosure may detect information of the battery 133, such as battery temperature, a battery voltage and a battery current, etc. The detecting circuit 135 may also detect an output current and an output voltage of the voltage converting circuit 132 or the charging management circuit 136, and the output voltage and the output current of the wireless receiving circuit 131, etc.

When the wireless charging method is adopted to charge the to-be-charged device, with the requirements for wireless charging power becoming higher and higher, in order to increase the wireless charging power, the wireless charging power may be increased by increasing the number of receiving coils. After the number of receiving coils is increased, in some embodiments, a shared rectifying circuit may be configured to perform a rectification process for electrical energies received by multiple receiving coils. The above method, due to serious heating of coils, is not suitable for a higher-power transmission. In addition, a complicated control logic of the rectifying circuit may limit an ability of the method to further improve a wireless transmitting power.

Therefore, a wireless receiving device, a wireless charging system, and a wireless charging method are provided by the embodiments of the present disclosure. In this way, a possibility of a disorder of the rectifying circuit in an operating process may be reduced, and the wireless charging power and the charging speed may be improved.

The to-be-charged device adopted in the embodiments of the present disclosure may refer to a terminal, and the terminal may include, but be not limited to be set to a device connected by a wired line (for example, by a Public Switched Telephone Network (PSTN), a Digital Subscriber Line (DSL), a digital cable, a direct cable connection, and/or another data connection/network) and/or receiving/transmitting communication signals by a wireless interface (e.g., a cellular networks, a Wireless Local Area Networks (WLAN), a digital television network such as a Digital Video Broadcasting Handheld (DVB-H) network, a satellite network, an Amplitude Modulation-Frequency Modulation (AM-FM) broadcast transmitter, and/or a wireless interface of another communication terminal). The terminal configured to communicate by the wireless interface may be referred to as "a wireless communication terminal", "a wireless terminal" and/or "a mobile terminal".

Examples of the mobile terminal include, but are not limited to, a satellite or a cellular telephone. The mobile terminal may be a Personal Communication System (PCS) terminal obtained by combining a cellular radio telephone with functions of data processing, a facsimile, and a data communication. The mobile terminal may also be an Internet/Personal Digital Assistant (PDA) including a radio telephone, a pager, an internet/intranet access, a web browser, a memo pad, a calendar, and/or a Global Positioning System (GPS) receiver. The mobile terminal may also be a conventional laptop and/or palmtop receiver or other electronic device including a radio-telephone transceiver. In some embodiments, the to-be-charged device may refer to a mobile terminal device or a handheld terminal device, such as a mobile phone, a pad, and the like. In some embodiments, the to-be-charged device mentioned in the embodiments of the present disclosure may refer to a chip system, and in the present embodiments, the battery of the to-be-charged device may or may not belong to the chip system.

In addition, the to-be-charged device may also include other to-be-charged devices having charging requirements, such as mobile phones, mobile power sources (such as power banks, travel chargers, etc.), electric vehicles, notebook computers, drones, tablet computers, e-books, electronic cigarettes, intelligent to-be-charged devices and small electronic products, etc. The intelligent to-be-charged devices may include, for example, a watch, a wristband, smart glasses, a cleaning robot, and the like. The small electronic products may include, for example, a wireless earphone, a Bluetooth speaker, an electric toothbrush, a rechargeable wireless mouse, and the like.

A wireless receiving device 200 provided by the embodiments of the present disclosure will be described in detail in the following in conjunction with FIG. 2.

Figure 2:
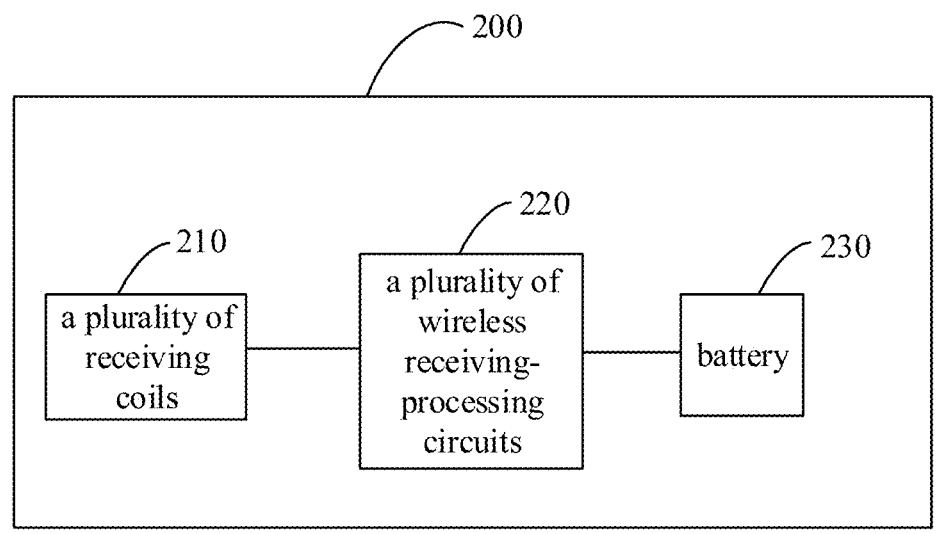
FIG. 2 is a schematic view of a wireless receiving device according to an embodiment of the present disclosure.

Referring to FIG. 2, FIG. 2 is a schematic view of a wireless receiving device 200 according to an embodiment of the present disclosure. The wireless receiving device 200 may include a plurality of receiving coils 210, a plurality of wireless receiving-processing circuits 220, and a battery 230.

In some embodiments, the wireless receiving device 200 in the present embodiment may be a to-be-charged device 130 in FIG. 1.

The plurality of the receiving coils 210 are coupled with a transmitting coil and configured to receive wireless charging signals transmitted from the transmitting coil.

The wireless charging signals in the present embodiment may be transmitted through a transmitting coil (or a transmission antenna) of a wireless transmitting device. In some embodiments, the wireless transmitting device may include a wireless transmitting drive circuit and a transmitting coil. The wireless transmitting driving circuit may be configured to generate an AC with a higher frequency. The transmitting coil or the transmission antenna may be configured to convert the AC with the higher frequency to an electromagnetic signal and transmit the electromagnetic signal out.

The plurality of the receiving coils 210 in the present embodiment may include two or three or more receiving coils, which are not specifically limited in the present disclosure. In the present embodiment, the plurality of the receiving coils 210 may simultaneously receive wireless signals transmitted from the wireless transmitting device, or may not simultaneously receive the wireless signals transmitted from the wireless transmitting device.

The plurality of the wireless receiving-processing circuits 220 are configured to perform a voltage and/or current process for the wireless charging signals received by the plurality of the receiving coils 210 to charge the battery 230. In some embodiments, a terminal of each of the wireless receiving-processing circuits is connected to a corresponding one of the receiving coils, and another terminal of each of the wireless receiving-processing circuits is connected to the battery.

In the present embodiment, the plurality of the wireless receiving-processing circuits 220 may correspond to the plurality of the receiving coils 210 one to one, and configured to process voltages and/or currents of the wireless charging signals received by the plurality of the receiving coils 210. Multiple voltages and currents after being processed by the plurality of the wireless receiving-processing circuits 220 may be configured to charge the battery 230 together.

For the wireless receiving device provided by the present embodiment, since the wireless receiving device includes a plurality of receiving coils and a plurality of wireless receiving-processing circuits, a charging speed and a charging efficiency of wireless charging may be improved. Further, since the plurality of the wireless receiving-processing circuits are configured to process voltages and currents received by the plurality of the receiving coils respectively, a possibility of an operating disorder of a rectifying circuit may be reduced.

Figure 3:
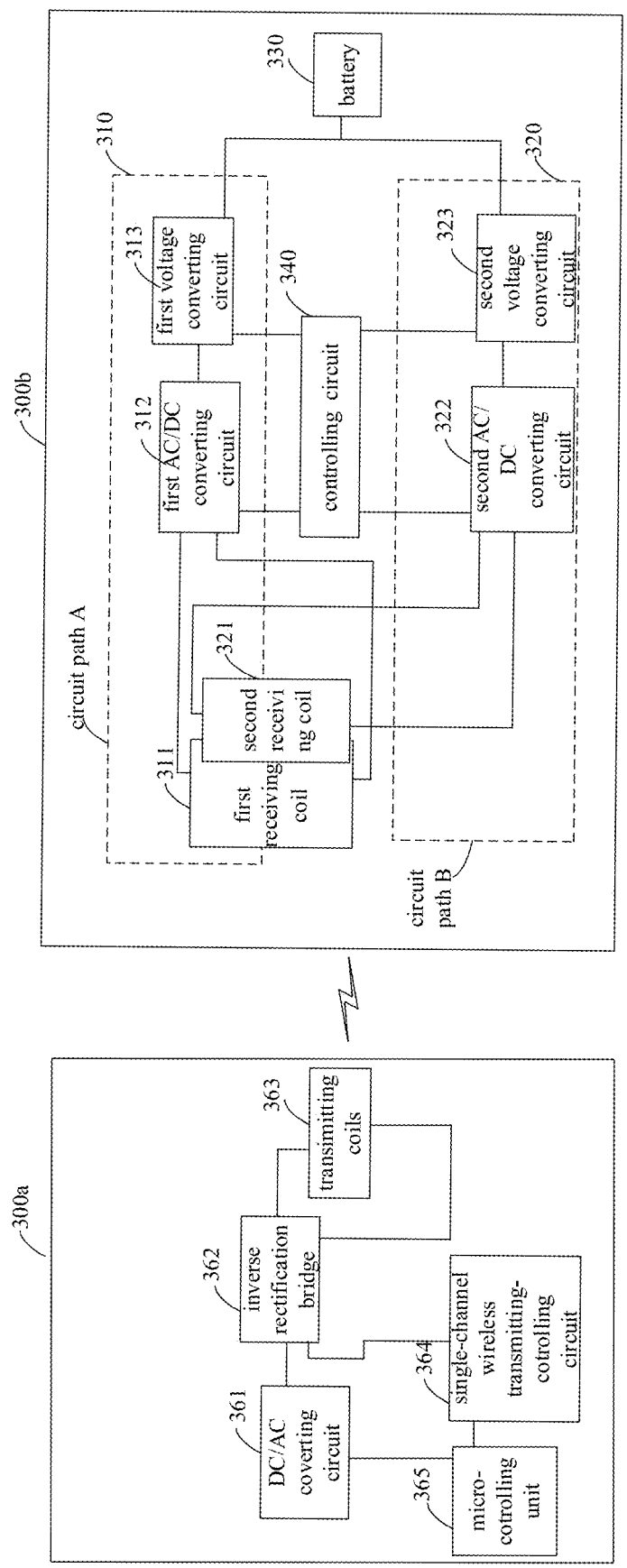
FIG. 3 is a schematic view of the wireless receiving device according to another embodiment of the present disclosure.

In some embodiments, referring to FIG. 3, FIG. 3 a schematic view of the wireless receiving device according to another embodiment of the present disclosure.

In FIG. 3, the receiving coils 210 include a first receiving coil 311 coupled to the transmitting coil, and configured to receive a first wireless charging signal from the transmitting coil; and a second receiving coil 321 coupled to the transmitting coil, and configured to receive a second wireless charging signal from the transmitting coil.

In the present embodiment, the first receiving coil 311 and the second receiving coil 321 may be configured to simultaneously receive the wireless charging signals transmitted from the transmitting coil, or not to simultaneously receive the wireless charging signals transmitted from the wireless transmitting coil.

The first receiving coil 311 and the second receiving coil 321 in the present embodiment may be the receiving coils 210 in FIG. 2.

It should be understood that FIG. 3 simply schematically shows that a wireless receiving device 300b may include two receiving coils. In some embodiments, the wireless receiving device may further include a third receiving coil, or even more, such that the voltages and/or currents after being processed by the plurality of the wireless receiving-processing circuits may be configured to charge the battery together.

In some embodiments, referring to FIG. 3, the first receiving coil and the second receiving coil are arranged at least overlappingly, to make the first receiving coil and the second receiving coil able to be simultaneously aligned with the transmitting coil.

In the present embodiment, the first receiving coil 311 and the second receiving coil 321 may be arranged at least overlappingly, in other words, the first receiving coil 311 and the second receiving coil 321 may be stacked together to obtain a structure of a magnetic shielding material, such that the first receiving coil 311 and the second receiving coil 321 may be simultaneously aligned with the transmitting coil. That is, the first receiving coil 311 and the second receiving coil 321 may receive signals transmitted from the transmitting coil to the maximum extent.

In some embodiments, the first receiving coil and the second receiving coil are arranged on a same Flexible Printed Circuit (FPC) substrate and are isolated by a shielding layer.

In some embodiments, both the first receiving coil and the second receiving coil are formed by winding wires covered with an insulating material.

In the present embodiment, the first receiving coil 311 and the second receiving coil 321 may be located on the same FPC substrate, such that the space may be saved to the maximum extent, and the first receiving coil 311 and the second receiving coil 321 may not interfere with each other in a process of receiving the wireless charging signals since the first receiving coil 311 and the second receiving coil 321 are isolated from each other by the shielding layer.

In the present embodiment, the first receiving coil 311 and the second receiving coil 321 may be formed by winding the wires covered with the insulating material, for example, the wires may be enameled wires or the like.

In some embodiments, referring to FIG. 3, the plurality of the wireless receiving-processing circuits include a first AC/DC converting circuit 312 connected to the first receiving coil 311, and configured to convert the first wireless charging signal to a first DC voltage and a first DC current; and a second AC/DC converting circuit 322 connected to the second receiving coil 321, and configured to convert the second wireless charging signal to a second DC voltage and a second DC current.

The plurality of the wireless receiving-processing circuits further include a first voltage converting circuit 313 connected to the first AC/DC converting circuit 312 and a second voltage converting circuit 323 connected to the second AC/DC converting circuit 322. The first voltage converting circuit 313 and the second AC/DC converting circuit 322 are configured to perform a voltage-boosting or voltage-bucking voltage process for the first DC voltage and the second DC voltage respectively, to obtain a third DC voltage for charging the battery.

The wireless receiving-processing circuits further include a controlling circuit 340. The controlling circuit 340 is configured to control the first AC/DC converting circuit 312 and the first voltage converting circuit 313 to operate, and/or control the second AC/DC converting circuit 322 and the second voltage converting circuit 323 to operate, based on charging stages of the battery. In some embodiments, the charging stages of the battery comprise at least one of: a trickle charging stage, a constant-current charging stage and a constant-voltage charging stage.

In the present embodiment, the first receiving coil 311 and the second receiving coil 321 may be the receiving coils 210 in FIG. 2. A circuit composed of the first AC/DC converting circuit 312, the first voltage converting circuit 313, the second AC/DC converting circuit 322 and the second voltage converting circuit 323 together may be the plurality of the wireless receiving-processing circuits 220 in FIG. 2.

It should be understood that FIG. 3 simply schematically shows that the wireless receiving device may include two receiving coils, two AC/DC converting circuits and two voltage converting circuits. In some embodiments, the wireless receiving device may further include the third receiving coil, a third AC/DC converting module, and a third voltage converting module, or even more, such that multiple voltages and/or currents after being processed by the voltage converting circuits may be configured to charge the battery 230 together.

In the present embodiment, a current output by the first AC/DC converting circuit may be a current output by the first receiving coil 311, or may be a current detected on a charging circuit path from the first receiving coil 311 to the first AC/DC converting circuit 312, which will not be limited specifically in the present disclosure. As long as a current may reflect the first receiving coil 311, the current may be applied in the present embodiment. Similarly, a current output by the second AC/DC converting circuit 322 may be a current output by the second receiving coil 321, or may be a current detected on a charging circuit path from the second receiving coil 321 to the second AC/DC converting circuit 322, which will not be limited specifically in the present disclosure. As long as a current may reflect the second receiving coil 321, the current may be applied in the present embodiment.

In a process of charging the battery, the controlling circuit 340 may be configured to control a rectification operation executed by the first AC/DC converting circuit 312, may also be configured to control a rectification operation executed by the second AC/DC converting circuit 322, and may also be configured to control the rectification operation executed by the first AC/DC converting circuit 312 and the rectification operation executed by the second AC/DC converting circuit 322 simultaneously. In other embodiments, the controlling circuit 340 may be configured to control a filtering operation executed by the first AC/DC converting circuit 312, may also be configured to control a filtering operation executed by the second AC/DC converting circuit 322, and may also be configured to control the filtering operation executed by the first AC/DC converting circuit 312 and the filtering operation executed by the second AC/DC converting circuit 322 simultaneously. In other embodiments, the controlling circuit 340 may be configured to control a converting operation executed by the first AC/DC converting circuit 312, may also be configured to control a converting operation executed by the second AC/DC converting circuit 322, and may also be configured to control the converting operation executed by the first AC/DC converting circuit 312 and the converting operation executed by the second AC/DC converting circuit 322 simultaneously. No specific limitation is made in the present disclosure.

The controlling circuit 340 in the present embodiment may be controlled by a Micro Control Unit (MCU) and/or an Application Processor (AP).

It should be understood that, in the present embodiment, operations of the first AC/DC converting circuit 312 and the second AC/DC converting circuit 322, and the first voltage converting circuit 313 and the second voltage converting circuit 323 may be controlled by different controlling circuits. For example, the wireless receiving device 300*b* may include a first controlling circuit 340*a* and a second controlling circuit 340*b*. The first controlling circuit 340*a* is configured to control the operations of the first AC/DC converting circuit 312 and the first voltage converting circuit 313, and the second controlling circuit 340*b* is configured to control the operations of the second AC/DC converting circuit 322 and the second voltage converting circuit 323.

In the present embodiment, the first AC/DC converting circuit 312 and the second AC/DC converting circuit 322 may include rectifiers having rectification functions to perform rectification operations. The first AC/DC converting circuit 312 and the second AC/DC converting circuit 322 may include filters having filtering functions to perform filtering operations. It is not limited specifically in the present disclosure.

In the present embodiment, referring to FIG. 3, taking two identical receiving coils as an example to describe. That is, an impedance, a number of turns, and a material of the first receiving coil 311 are the same with an impedance, a number of turns, and a material of the second receiving coil 321. In response to a power transmitted by the wireless transmitting device being 10 W, that is, a voltage transmitted by the wireless transmitting device being 5V and a current transmitted by the wireless transmitting device being 2 A, if both a gain of the transmitting coil and gains of the receiving coils are 1, in a case without an energy loss, since a magnetic field generated by the transmitting coil has a same magnetic flux on each of the receiving coils, the transmitting coil has the same voltage on each of the receiving coils. That is, the maximum voltage amplitude of a first AC received by the first receiving coil 311 may also be 5V, and the maximum voltage amplitude of a second AC received by the second receiving coil 321 may also be 5V. For the currents on the receiving coils, since a first current on the first receiving coil 311 and a second current on the second receiving coil 321 are the same, a third current provided by the transmitting coil is a superposition of the first current on the first receiving coil 311 and the second current on the second receiving coil 321. Therefore, the third current on the transmitting coil is double the first current on the first receiving coil 311 or the second current on the second receiving coil 321. That is, when the third current on the transmitting coil is 2 A, the maximum current amplitude of the first receiving coil 311 may be 1 A, and the maximum current amplitude of the second receiving coil 321 may also be 1 A. After the first AC/DC converting circuit 312 performs a rectification process and a filtering process for a first AC received by the first receiving coil 311, a first DC may be obtained. The first voltage converting circuit 313 may be configured to perform a converting process on the first DC after being processed by the first AC/DC converting circuit 312. Similarly, after the second AC/DC converting circuit 322 performs the rectification process and the filtering process for a second AC received by the second receiving coil 321, a relatively stable second DC may be obtained. The second voltage converting circuit 323 may be configured to perform the converting process for the second DC after being processed by the second AC/DC converting circuit 322. The first DC obtained after being processed by the first voltage converting circuit 313 and the second DC obtained after being processed by the second voltage converting circuit 323 may be configured to charge the battery 330.

In the present embodiment, the gain of the transmitting coil and the gains of the receiving coils may be other values, for example, n. A value of n may be 2, 3, or 4, or the like. Taking the gain or the gains being 2 as an example to illustrate, in a case where the gain of the transmitter coil is 2 and the gains of the receiver coils are 2, in response to the power transmitted by the wireless transmitting device being 10 W, that is, the voltage transmitted by the wireless transmitting device being 5V and the current transmitted by the wireless transmitting device being 2 A, in the case without the energy loss, since both the gain of the transmitting coil and the gains of the receiving coils are 2, that is, the magnetic flux on each of the receiving coils is double a magnetic flux generated by the transmitting coil, therefore, the voltage of each of the receiving coils is double a voltage of the transmitting coil. That is, the maximum voltage amplitude of the first AC received by the first receiving coil 311 may be 10V, and the maximum voltage amplitude of the second AC received by the second receiving coil 321 may also be 10V. For the currents on the receiving coils, since the first current on the first receiving coil 311 and the second current on the second receiving coil 321 are the same, the third current provided by the transmitting coil is a superposition of the first current on the first receiving coil 311 and the second current on the second receiving coil 321. Therefore, the third current on the transmitting coil is double the first current on the first receiving coil 311 or the second current on the second receiving coil 321. That is, when the third current on the transmitting coil is 2 A, the maximum current amplitude of the first receiving coil 311 may be 2 A, and the maximum current amplitude of the second receiving coil 321 may also be 2 A.

It should be understood that numerical values in the present embodiment are only for illustration as examples, other numerical values may also be allowed, which should not be construed particular limitations to the present disclosure.

In the present embodiments, the wireless receiving device includes multiple AC/DC converting circuits and multiple voltage converting circuits, and the multiple AC/DC converting circuits are connected to the receiving coils. The multiple AC/DC converting circuits may perform the rectification process and the filtering process for the voltages and the currents received by the receiving coils. The multiple voltage converting circuits may perform the voltage-boosting/voltage-bucking process for the voltages and the currents received by the receiving coils. In this way, a possibility of the operating disorder of the rectifying circuit may be reduced. Furthermore, the currents received by the receiving coils are processed by the multiple AC/DC converting circuits, within a voltage range and a current range that the battery is allowed to be charged, a charging power and the charging speed of the battery may be further improved.

Figure 4:
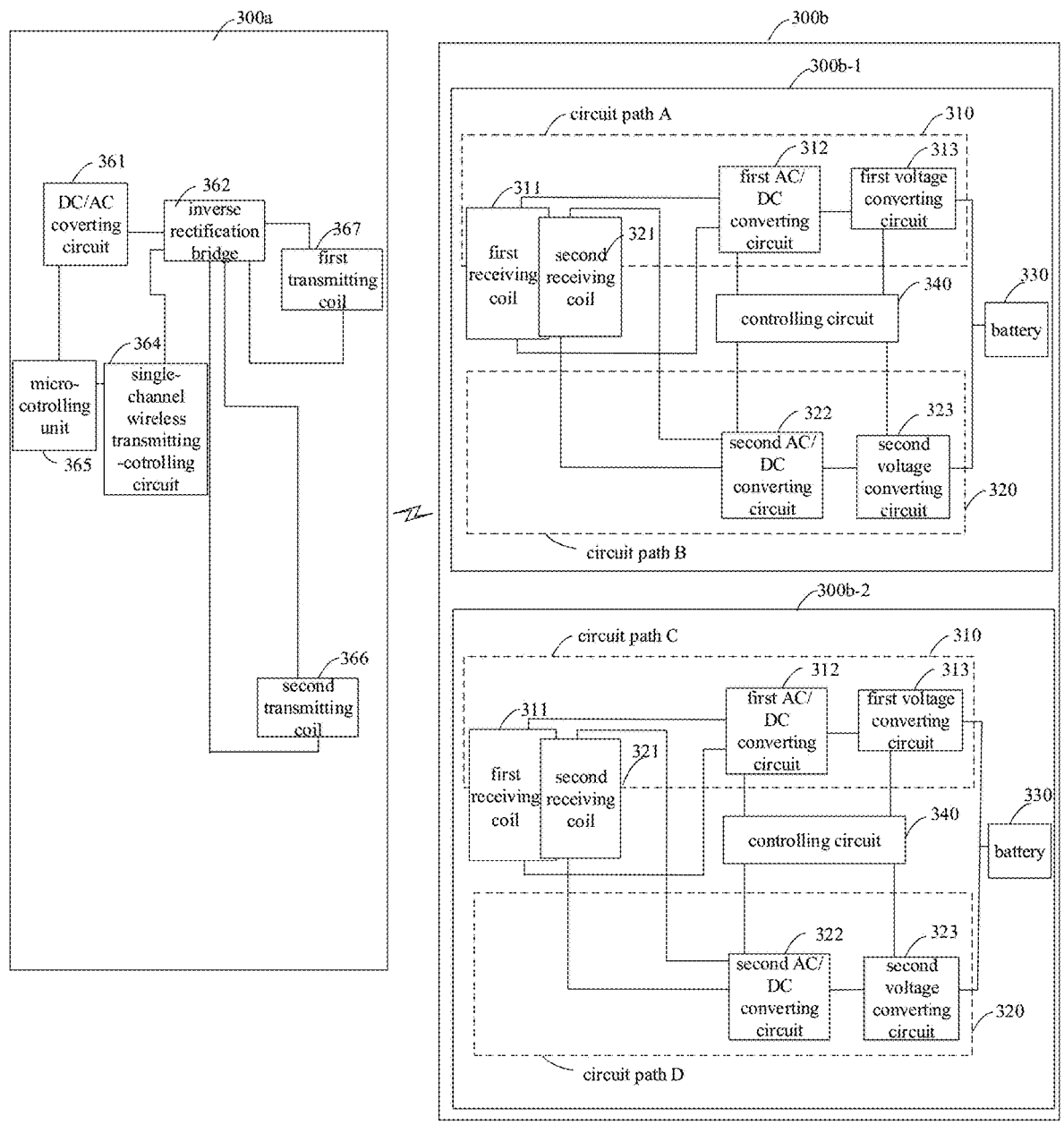
FIG. 4 is a schematic view of the wireless receiving device according to a yet embodiment of the present disclosure.

In some embodiments, referring to FIG. 4, another wireless receiving device of the present disclosure is provided.

In FIG. 4, a wireless transmitting device 300*a* may also include multiple transmitting coils. For example, taking the wireless transmitting device including two transmitting coils, that is, a first transmitting coil 367 and a second transmitting coil 366, as an example to describe. A wireless charging signal transmitted by the first transmitting coil 367 may be received by the first receiving coil 311 and the second receiving coil 321 included in a circuit path A and a circuit path B. A wireless charging signal transmitted by the second transmitting coil 366 may be received by the first receiving coil 311 and the second receiving coil 321 included in a circuit path C and a circuit path D.

In an embodiment, referring to FIG. 4, the wireless receiving device 300*b* may include a first wireless receiving unit 300*b*-1 and a second wireless receiving unit 300*b*-2. The voltage converted by the first voltage converting circuit 313 and the second voltage converting circuit 323 in the first wireless receiving unit 300*b*-1, may be configured to charge the battery 330 in the first wireless receiving unit 300*b*-1. The voltage converted by the first voltage converting circuit 313 and the second voltage converting circuit 323 in the second wireless receiving unit 300*b*-2, may be configured to charge the battery 330 in the second wireless receiving unit 300*b*-2.

In another embodiment, the voltage converted by the first voltage converting circuit 313 and the second voltage converting circuit 323 in the first wireless receiving unit 300*b*-1, and the voltage converted by the first voltage converting circuit 313 and the second voltage converting circuit 323 in the second wireless receiving unit 300*b*-2, may be configured to charge a same battery, which is not specifically limited in the present disclosure.

In order to understand the present disclosure more clearly, stages included in the battery charging process, that is, charging stages, are firstly introduced in the following, so as to facilitate a subsequent understanding for solutions of the present disclosure. However, it should be understood that the description in the following is only for a better understanding of the present disclosure, and should not be construed as specific limitations to the present disclosure.

Figure 5A:
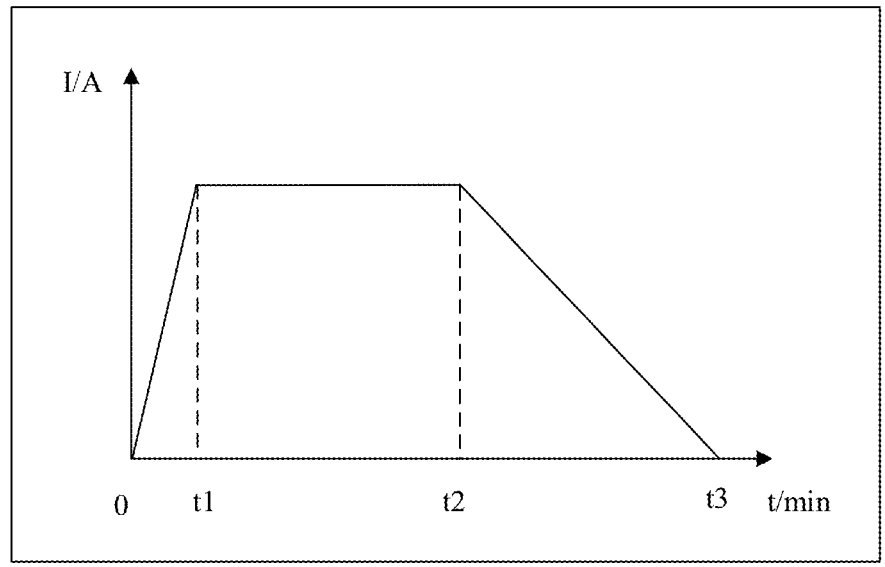
FIG. 5a is a schematic diagram of a changing of a charging current during a charging process of a to-be-charged device according to an embodiment of the present disclosure.
Figure 5B:
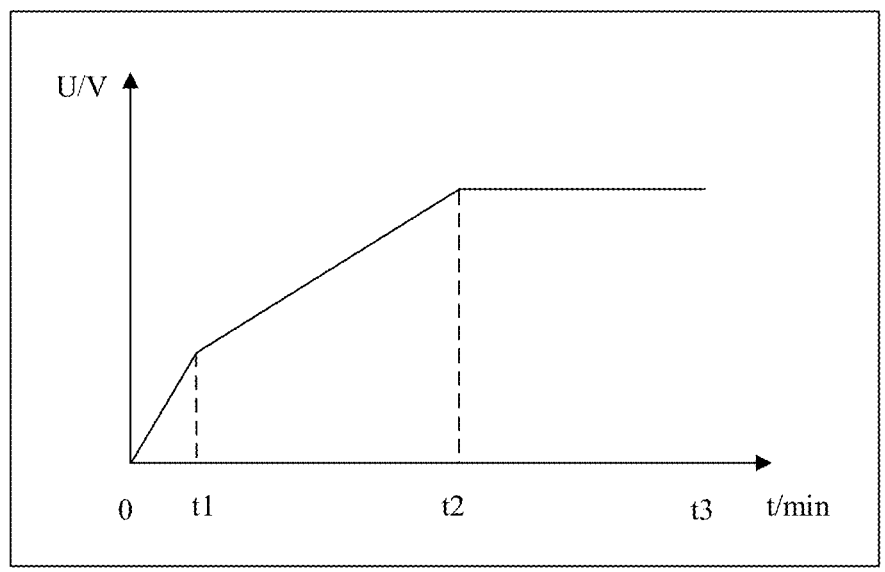
FIG. 5b is a schematic diagram of a changing of a charging voltage during the charging process of the to-be-charged device according to an embodiment of the present disclosure.

The charging process generally includes three stages: a trickle charging stage, a constant-current charging stage and a constant-voltage charging stage. A charging process of a lithium ion is taken as an example for description. Referring to FIG. 5*a* and FIG. 5*b*, FIG. 5*a* is a schematic diagram of a changing of a charging current during a charging process of a to-be-charged device according to an embodiment of the present disclosure. FIG. 5*b* is a schematic diagram of a changing of a charging voltage during the charging process of the to-be-charged device according to an embodiment of the present disclosure.

In a first period of time (0-t1), it may be the trickle charging stage. During the first period, a charging current is gradually increasing at a first rate, and a charging voltage is gradually increasing at a second rate. The first rate and the second rate are relatively small. In response to the charging voltage being greater than a first voltage threshold, the constant-current charging stage, that is, a second period of time (t1-t2) in FIG. 5*a* and a second period of time (t1-t2) in FIG. 5*b*, may be entered. During the second period of time (t1-t2), a relatively large constant current may be configured to charge the to-be-charged device. For example, the relatively large constant current may be 6.5 A. During the second period of time (t1-t2), the charging voltage is gradually increasing, in response to the charging voltage being greater than a second voltage threshold, the constant-voltage charging stage, that is, a third period of time (t2-t3) in FIG. 5*a* and a third period of time (t2-t3) in FIG. 5*b*, may be entered. During the third period of time (t2-t3), a power of the to-be-charged device may be about fully charged, therefore the charging current may be gradually decreasing, and the to-be-charged device is charged with a gradually decreasing charging current until the charging process is terminated.

It is pointed out above that the plurality of the wireless receiving-processing circuits may include multiple voltage converting circuits. In some embodiments, the voltage converting circuits may include boost circuits and buck circuits. The boost circuits may include a first boost circuit with a fixed boost ratio and a second boost circuit without a fixed boost ratio. The buck circuits may include a first circuit with a fixed buck ratio and a second circuit without a fixed buck ratio. These circuits may be applied to the embodiments of present disclosure, which will be introduced in detail in the following.

In some embodiments, the first voltage converting circuit 313 includes a DC-DC buck circuit, a buck-boost circuit or a charging IC.

In some embodiments, the controlling circuit 340 is configured to control the first voltage converting circuit to operate in one or more of the following charging stages: the trickle charging stage, the constant-current charging stage and the constant-voltage charging stage.

In the present embodiment, referring to FIG. 3, the first voltage converting circuit 313 may be a buck circuit or a buck-boost circuit or a charging IC without a fixed buck ratio. In the process of charging the battery, the circuit path A and the circuit path B may simultaneously choose the buck circuit or the buck-boost circuit or the charging IC without a fixed buck ratio to perform the converting process for a voltage after being processed by the rectification process and the filtering process. In other embodiments, the circuit path A may choose the buck circuit or the buck-boost circuit or the charging IC without a fixed buck ratio to perform the voltage-bucking process for the voltage after being processed by the rectification process and the filtering process, while the circuit path B may choose circuits with the fixed buck ratio to perform the converting process for the voltage after being processed by the rectification process and the filtering process.

In some embodiments, the circuit path A may include the first receiving coil 311, the first AC/DC converting circuit 312, the first voltage converting circuit 313 and the battery 330. The circuit path B may include the second receiving coil 321, the second AC/DC converting circuit 322, the second voltage converting circuit 323 and the battery 330.

In the process of charging the battery, the controlling circuit 340 may be configured to control circuits adopted by the first voltage converting circuit 313 and the second voltage converting circuit 323, based on the charging stages of the battery.

For example, the DC-DC Buck circuit may be controlled to operate in any stage of the trickle charging stage, the constant-current charging stage, and the constant-voltage charging stage in the charging process mentioned above.

In an embodiment, when a rated voltage of the battery is 4.4V, after the AC/DC converting circuits finish performing the rectification process and the filtering process for a received AC, a DC may be obtained. The first voltage converting circuit 313 and the second voltage converting circuit 323 may be configured to perform the voltage-bucking process for the DC in the trickle charging stage, the DC-DC Buck circuit or the charging IC circuit may be configured to perform the voltage-bucking process for the voltage after being processed by the rectification process and the filtering process.

When a voltage of the battery reaches the first voltage threshold, for example, when the voltage of the battery reaches 3V, the constant-current charging stage may be entered. In the constant-current charging stage, the first voltage converting circuit 313 may be configured to adopt the DC-DC buck circuit or the charging IC circuit to perform the voltage-bucking process for the voltage on the circuit path A after being processed by the first AC/DC converting circuit 312. For example, in FIG. 3, the first voltage converting circuit 313 may be configured to adopt the DC-DC buck circuit to perform the voltage-bucking process for the voltage on the circuit path A after being processed by the first AC/DC converting circuit 312. In response to a charging voltage expected by the battery being 3.4V, a voltage entering the first voltage converting circuit 313 may be any voltage value greater than 3.4V, for example, may be 6V. In response to the charging voltage expected by the battery being 3.8V, the voltage entering the first voltage converting circuit 313 may be any voltage value greater than 3.8V, for example, may be 7.6V. The second voltage converting circuit 323 may be configured to adopt the DC-DC buck circuit or a DC-DC charge pump, such that the charging voltage expected by the battery may be obtained after being processed by the first voltage converting circuit 313 and the second voltage converting circuit 313.

When the voltage of the battery reaches the second voltage threshold, for example, when the voltage of the battery reaches 4.2V, the constant-voltage charging stage may be entered. In the constant-voltage charging stage, the DC-DC buck circuit or the charging IC circuit may be configured to charge the battery.

In some embodiments, the second voltage converting circuit includes a charge pump circuit.

In some embodiments, the controlling circuit 340 is configured to control the charge pump circuit to operate in the constant-current charging stage.

In the present embodiment, referring to FIG. 3, the second voltage converting circuit 323 may be a charge pump circuit with a fixed buck ratio. In the process of charging the battery, in the circuit path A, the first voltage converting circuit 313 may be configured to adopt the buck circuit without a fixed buck ratio to perform the voltage-bucking process for the voltage after being processed by the first AC/DC converting circuit 312. In the circuit path B, the second voltage converting circuit 323 may be configured to adopt the voltage converting modules with the fixed buck ratio to perform the bucking voltage process for the voltage after being processed by the second AC/DC converting circuit 322.

In the process of charging the battery, the controlling circuit 340 may be configured to control the circuits adopted by the first voltage converting circuit 313 and the second voltage converting circuit 323, based on the charging stages of the battery.

For example, the controlling circuit 340 may be configured to control the charge pump circuit to operate in the constant-voltage charging stage of the charging process.

In an embodiment, in response to the rated voltage of the battery being 4.4V, after the AC/DC converting circuits finish performing the rectification process and the filtering process for the received AC, the DC may be obtained. The first voltage converting circuit 313 and the second voltage converting circuit 323 may perform the voltage-bucking process for the DC. In the trickle charging stage, the DC-DC buck circuit or the charging IC circuit may be configured to perform the voltage-bucking process for the voltage after being processed by the rectification process and the filtering process.

When the voltage of the battery reaches the first voltage threshold, for example, in when the voltage of the battery reaches 3V, the constant-current charging stage may be entered. In the constant-current charging stage, the second voltage converting circuit 323 may be configured to adopt the DC-DC charge pump circuit to perform the voltage-bucking process for the voltage on the circuit path B after being processed by the second AC/DC converting circuit 322. As for the voltage on the circuit path A, the DC-DC buck circuit may still be adopted. For example, in FIG. 3, the first voltage converting circuit 313 may be configured to adopt the DC-DC buck circuit to perform the voltage-bucking process for the voltage on the circuit path A after being processed by the first AC/DC converting circuit 312. The second voltage converting circuit 323 may be configured to adopt the DC-DC charge pump circuit to perform the voltage-bucking process for the voltage on the circuit path B after being processed by the second AC/DC converting circuit 322. In response to a buck ratio of the DC-DC charge pump circuit being 2, when the charging voltage expected by the battery is 3.4V, a voltage entering the DC-DC charge pump circuit may be 6.8V. When the charging voltage expected by the battery is 3.8V, the voltage entering the DC-DC charge pump may be 7.6V. In this way, the charging voltage expected by the battery may be obtained after the DC-DC charge pump circuit is passed through.

When the voltage of the battery reaches the second voltage threshold, for example, when the voltage of the battery reaches 4.2V, the constant-voltage charging stage may be entered. In the constant-voltage charging stage, the DC-DC buck circuit or the charging IC circuit may be configured to charge the battery.

Figure 6A:
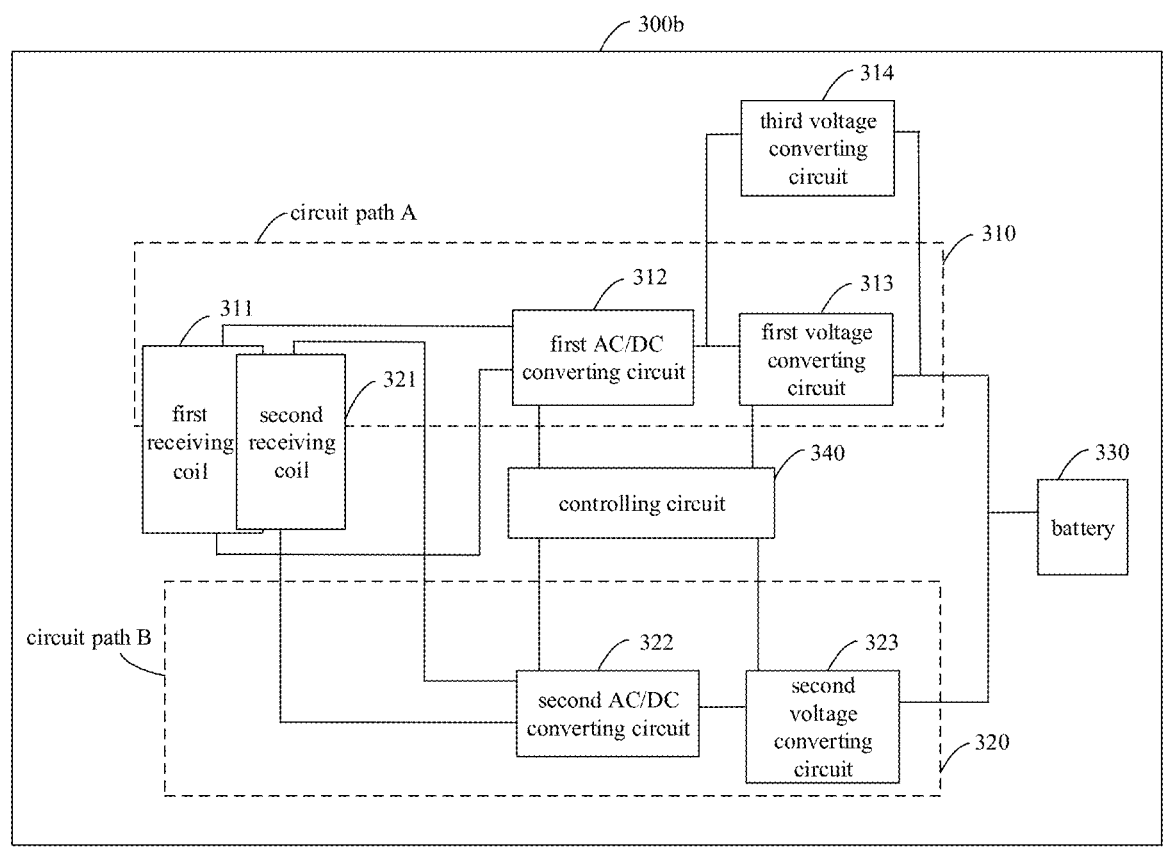
FIG. 6a is a schematic view of the wireless receiving device according to a yet embodiment of the present disclosure.
Figure 6B:
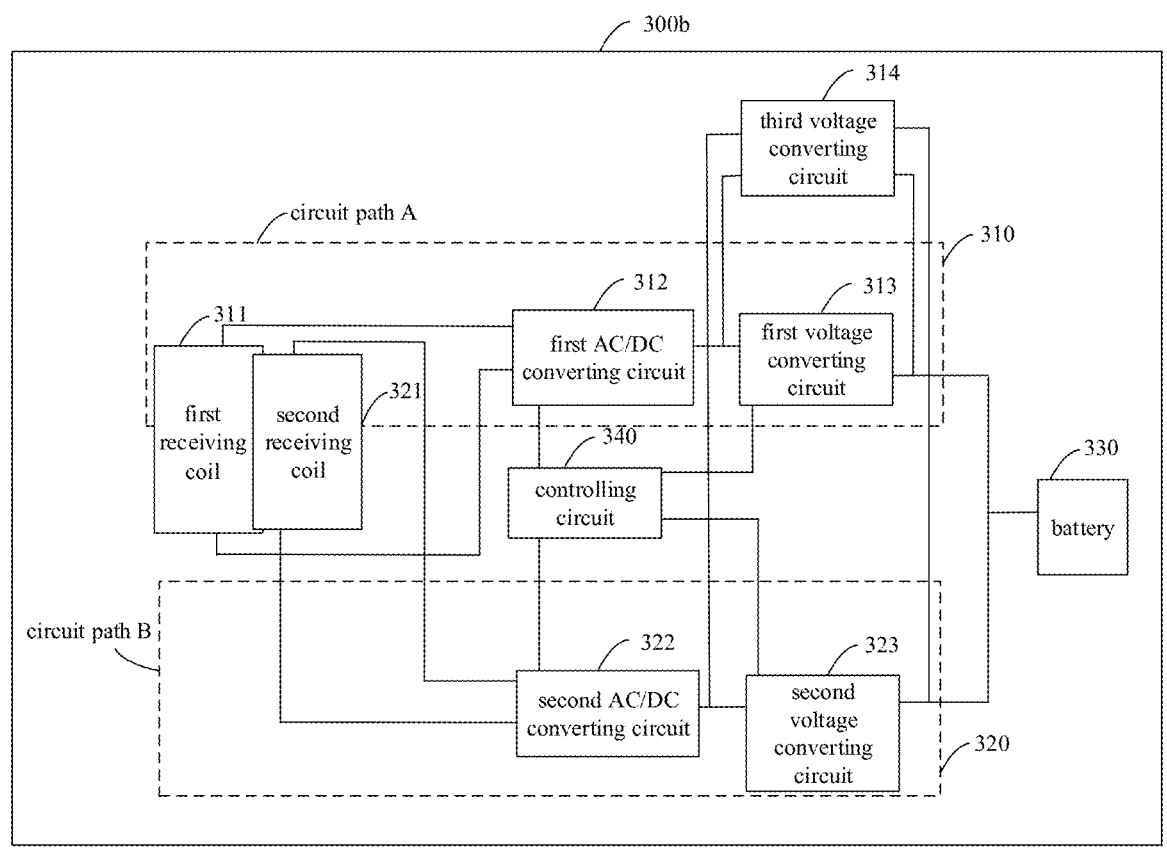
FIG. 6b is a schematic view of the wireless receiving device according to a yet embodiment of the present disclosure.

In some embodiments, referring to FIG. 6a and FIG. 6b, both the first voltage converting circuit and the second voltage converting circuit include a charge pump circuit respectively. The wireless receiving-processing circuits further include a third voltage converting circuit 314 connected to the first AC/DC converting circuit 312 and/or the second AC/DC converting circuit 322. The controlling circuit 340 is configured to control the first voltage converting circuit 313 and the second voltage converting circuit 323 to operate in the constant-current charging stage, and control the third voltage converting circuit 314 to operate in the trickle charging stage and/or the constant-voltage charging stage.

In some embodiments, the third voltage converting circuit includes a buck circuit or a buck-boost circuit or a charging IC.

In the present embodiment, referring to FIG. 6a, the third voltage converting circuit 314 may be connected to the first voltage converting circuit 313 in parallel. In this way, in the process of charging the battery 330, in response to the first voltage converting circuit 313 including the DC-DC charge pump circuit, the third voltage converting circuit 314 may be configured as an auxiliary circuit to manage the voltage. In another embodiment, referring to FIG. 6b, the third voltage converting circuit 314 may be connected to the first voltage converting circuit 313 and the second voltage converting circuit 323 in parallel, such that in the process of charging the battery 330, in response to the first voltage converting circuit 313 and the second voltage converting circuit 323 including DC-DC charge pump circuits, the third voltage converting circuit 314 may be configured as the auxiliary circuit to manage the voltage.

It can be understood that the third voltage converting circuit 314 may also be only connected to the second voltage converting circuit 323 in parallel, such that in the process of charging the battery 330, in response to the second voltage converting circuit 323 including the DC-DC charge pump circuit, the third voltage converting circuit 314 may be configured as the auxiliary circuit to manage the voltage.

In the present embodiment, the controlling circuit 340 may be configured to control the AC/DC converting circuits, and may also be configured to control the voltage converting circuits. For example, the controlling circuit 340 may be configured to control operations of the first AC/DC converting circuit and the second AC/DC converting module, and may also be configured to control operations of the first voltage converting circuit 313, the second voltage converting circuit 323 and the third voltage converting circuit 314.

In the present embodiment, both the first voltage converting circuit 313 and the second voltage converting circuit 323 may adopt circuits with the fixed buck ratio. For example, the first voltage converting circuit 313 may be configured to adopt a DC-DC charge pump circuit 1 to perform the voltage-bucking process for the voltage on the circuit path A after being processed by the first AC/DC converting circuit 312. The second voltage converting circuit 323 may be configured to adopt a DC-DC charge pump circuit 2 to perform the voltage-bucking process for the voltage on the circuit path B after being processed by the second AC/DC converting circuit 322. When both a buck ratio of the DC-DC charge pump circuit 1 and a buck ratio of the DC-DC charge pump circuit 2 are 2, in response to the charging voltage expected by the battery being 3.4V, a voltage entering the DC-DC charge pump circuit 1 may be 6.8V, and a voltage entering the DC-DC charge pump circuit 2 may be 6.8V. In response to the charging voltage expected by the battery being 3.8V, the voltage entering the DC-DC charge pump circuit 1 may be 7.6V, and the voltage entering the DC-DC Charge Pump circuit 2 may be 7.6V. In this way, the charging voltage expected by the battery may be obtained after the DC-DC charge pump circuit 1 and the DC-DC charge pump circuit 2 are passed through.

In response to the rated voltage of the battery being 4.4V, after the AC/DC converting circuits finish performing the rectification process and the filtering process on the received AC, the DC may be obtained. The first voltage converting circuit 313 and second voltage converting circuit 323 may be configured to perform the voltage-bucking process for the DC. In the trickle charging stage, the third voltage converting circuit 314 may be configured to perform the voltage-bucking process for the voltage after being processed by the rectification process and the filtering process.

When the voltage of the battery reaches the first voltage threshold, for example, when the voltage of the battery reaches 3V, the constant-current charging stage may be entered. In the constant-current charging stage, each of the voltage converting circuits may be configured to adopt the DC-DC charge pump circuit to perform the voltage-bucking process for voltages on different circuit paths after being processed by the second AC/DC converting circuit 322. Referring to FIG. 6, for example, the first voltage converting circuit 313 may be configured to adopt the DC-DC Charge Pump circuit 1 to perform the voltage-bucking process for the voltage on the circuit path A after being processed by the first AC/DC converting circuit 312. The second voltage converting circuit 323 may be configured to use the DC-DC charge pump circuit 2 to perform the voltage-bucking process for the voltage on the circuit path B after being processed by the second AC/DC converting circuit 322. When the buck ratios of the DC-DC charge pump circuits are 2, in response to the charging voltage expected by the battery being 3.4V, voltages entering the DC-DC charge pump circuits may be 6.8V. In response to the charging voltage expected by the battery being 3.8V, the voltages entering the DC-DC charge pump circuits may be 7.6V. In this way, the charging voltage expected by the battery may be obtained after the DC-DC charge pump circuits are passed through.

When the voltage of the battery reaches the second voltage threshold, for example, when the voltage of the battery reaches 4.2V, the constant-voltage charging stage may be entered. In the constant-voltage charging stage, the third voltage converting circuit 314 may be configured to perform a converting process for the voltage after being processed by the first AC/DC converting circuit 312 and/or the second AC/DC converting circuit 322. In response to entering the constant-voltage charging stage, since the voltage may substantially remain unchanged in the constant-voltage charging stage, the third voltage converting circuit 314 may be configured to perform the voltage-bucking process for the voltage after being processed by the rectification process and the filtering process.

It should be understood that the numerical values in the present embodiment are simply for illustration as examples, other numerical values may also be allowed, which should not be construed as particular limitations to the present disclosure.

It should also be understood that, in the present embodiment, the voltage converting circuits with the fixed buck ratio may also be adopted in the trickle charging stage and the constant-voltage charging stage in the charging process, and the voltage converting circuits without a fixed buck ratio may also be adopted in the constant-current charging stage in the charging process, which are not specifically limited in the present disclosure.

In the above description, the controlling circuit may be configured to determine converting circuits that may be adopted by the voltage converting circuits based on the charging stages of the battery. The controlling circuit may also be configured to determine the converting circuits that may be adopted by the voltage converting circuits based on the charging modes of the battery. A further specific description will be introduced in the following.

In some embodiments, the wireless receiving-processing circuits include a first AC/DC converting circuit connected to the first receiving coil, and configured to convert the first wireless charging signal in a first DC voltage and a first DC current; a second AC/DC converting circuit connected to the second receiving coil, and configured to convert the second wireless charging signal to a second DC voltage and a second DC current; a first voltage converting circuit connected to the first AC/DC converting circuit; and a second voltage converting circuit connected to the second AC/DC converting circuit. The first AC/DC converting circuit and the second AC/DC converting circuit are configured to perform a voltage-boosting or a voltage-bucking process for the first DC voltage and the second DC voltage respectively, to obtain a third DC voltage for charging the battery.

The wireless receiving-processing circuits further include a controlling circuit configured to control the first AC/DC converting circuit and the first voltage converting circuit to operate, and/or control the second AC/DC converting circuit and the second voltage converting circuit to operate, based on charging modes of the battery. The charging modes of the battery include a first charging mode and a second charging mode, and a first charging speed of the first charging mode is greater than a second charging speed of the second charging mode.

In the present embodiment, referring to FIG. 6a, the controlling circuit 340 may be configured to choose the converting circuits included in the voltage converting circuits based on the charging modes of the battery. For example, the charging modes of the battery include the first charging mode and the second charging mode, and the first charging speed of the first charging mode is greater than the second charging speed of the second charging mode. For example, the first charging mode may be a fast charging mode with a voltage of 9V and a current of 2 A, and the second charging mode may be a standard charging mode with a voltage of 5V and a current of 1 A.

In some embodiments, the first voltage converting circuit includes the buck circuit, or the buck-boost circuit or the charging IC.

In some embodiments, the controlling circuit is configured to control the buck circuit or the buck-boost circuit or the charging IC to operate in the second charging mode.

In the present embodiments, referring to FIG. 6a, in response to the first voltage converting circuit 313 including the buck circuit, the buck-boost circuit, or the charging IC, the controlling circuit 340 may be configured to control the buck circuit, or the buck-boost circuit, or the charging IC to operate in the second charging mode. That is, the controlling circuit 340 may be configured to control the buck circuit or the buck-boost circuit or the charging IC to operate in a charging mode with a smaller voltage and a smaller current.

In some embodiments, the second voltage converting circuit includes the charge pump circuit.

In some embodiments, the controlling circuit is configured to control the charge pump circuit to operate in the first charging mode.

In the present embodiment, referring FIG. 6a, in response to the second voltage converting circuit 323 including the charge pump circuit, the controlling circuit 340 may be configured to control the charge pump circuit to operate in the first charging mode. In the first charging mode, the battery may be charged with a relatively large current and a relatively large voltage.

It should be understood that the first charging speed of the first charging mode and the second charging speed of the second charging mode in the present embodiment are relative. Currents and voltages of the first charging mode and the second charging mode are not limited in the present disclosure. As long as a current and a voltage satisfy a condition that the first charging speed of the first charging mode is greater than the second charging speed of the second charging mode, the current and the voltage may be applied to the present disclosure.

In some embodiments, both the first voltage converting circuit and the second voltage converting circuit include the charge pump circuit. The wireless receiving-processing circuits further include a third voltage converting circuit 314 connected to the first AC/DC converting circuit 312 and/or the second AC/DC converting circuit 322. The controlling circuit is configured to control the first voltage converting circuit 313 and the second voltage converting circuit 323 to operate in the first charging mode, and control the third voltage converting circuit 314 to operate in the second charging mode.

In some embodiments, the third voltage converting circuit includes a buck circuit or a buck-boost circuit or a charging IC.

In the present embodiment, referring to FIG. 6, in response to both the first voltage converting circuit 313 and the second voltage converting circuit 323 being configured to adopt charge pump circuits, the controlling circuit 340 may be configured to control the charge pump circuits to operate in the first charging mode. In response to the third voltage converting circuit connected to the first voltage converting circuit 313 or the second voltage conversion circuit 323 being configured to adopt the buck circuit, or the buck-boost circuit or the charging IC, the controlling circuit 340 may be configured to control the buck circuit, or the buck-boost circuit or the charging IC to operate in the second charging mode.

In the charging process mentioned above, voltages and currents of the circuit path A and the circuit path B are configured to charge the same battery. The battery in the wireless receiving device may include a single cell, or a plurality of cells connected in parallel, or a plurality of cells connected in series. The plurality of cells connected in parallel or the plurality of cells connected in series that may be included in the battery will be described in detail in the following.

In some embodiments, the voltage converting circuits included in the wireless receiving-processing circuits are configured to perform the voltage-bucking process for DC voltages after being processed by the AC/DC converting circuits included in the wireless receiving-processing circuits, in response to the battery including the plurality of cells connected in parallel.

In some embodiments, the voltage converting circuits included in the wireless receiving-processing circuits are configured to perform the voltage-boosting process for DC voltages after being processed by the AC/DC converting circuits included in the wireless receiving-processing circuits, in response to the battery including the plurality of cells connected in series.

Figure 7A:
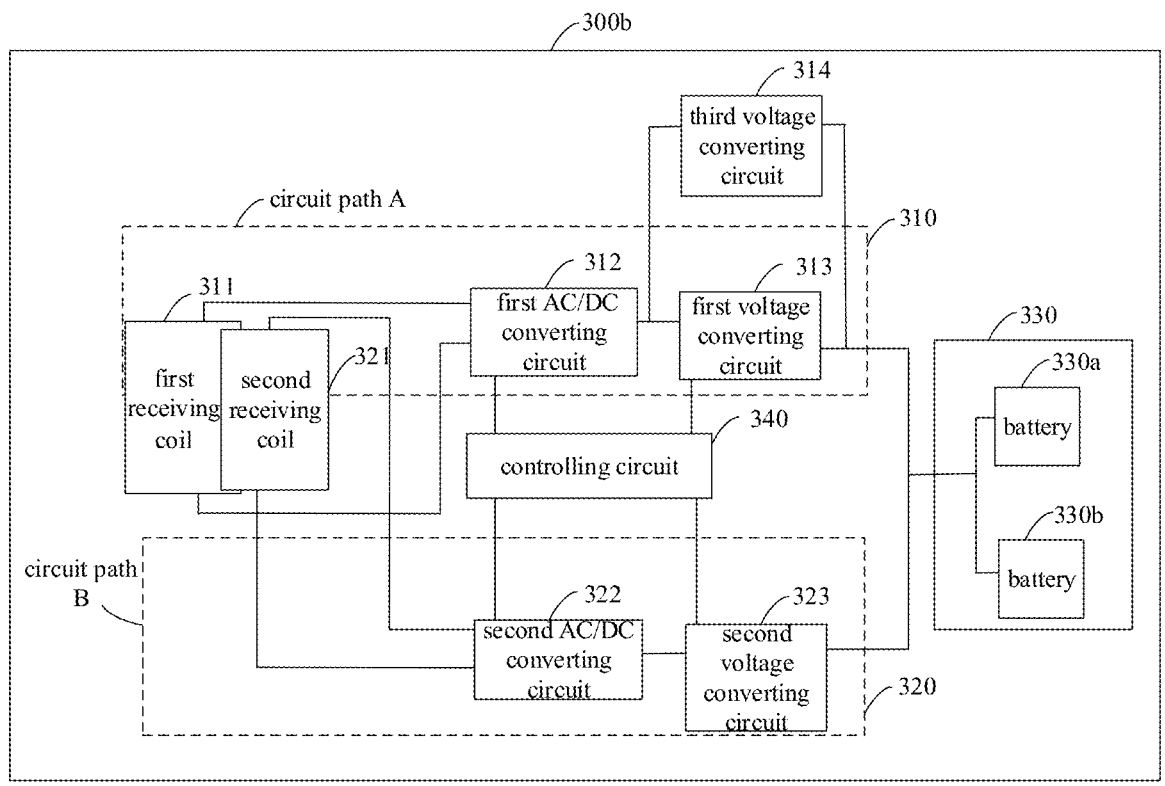
FIG. 7a is a schematic view of the wireless receiving device according to a yet embodiment of the present disclosure.

Referring to FIG. 7a, another wireless receiving device is provided by the present embodiments. The battery in the device may include two cells, that is, a cell 330a and a cell 330b. The cell 330a and the cell 330b may be connected in parallel.

In the present embodiment, since the cell 330a and the cell 330b are connected in parallel, the first voltage converting circuit 313 and the second voltage converting circuit 323 may be configured to adopt the buck circuits to obtain the voltage expected by the battery.

In some embodiments, in response to the rated voltage of the battery being 4.4V, the rated voltage after the cell 330a and the cell 330b are connected in parallel is still 4.4V. When the voltages after being processed by the first AC/DC converting circuit 312 and the second AC/DC converting circuit 322 are 8.8V, both the first voltage converting circuit 313 and the second voltage converting circuit 323 may be configured to adopt the buck circuits with a fixed buck ratio of 2. The voltage after being converted by the first voltage converting circuit 313 and the second voltage converting circuit 323 may be 4.4V, which may satisfy the voltage expected by the battery. Therefore, the battery 330 may be charged based on the voltage.

Figure 7B:
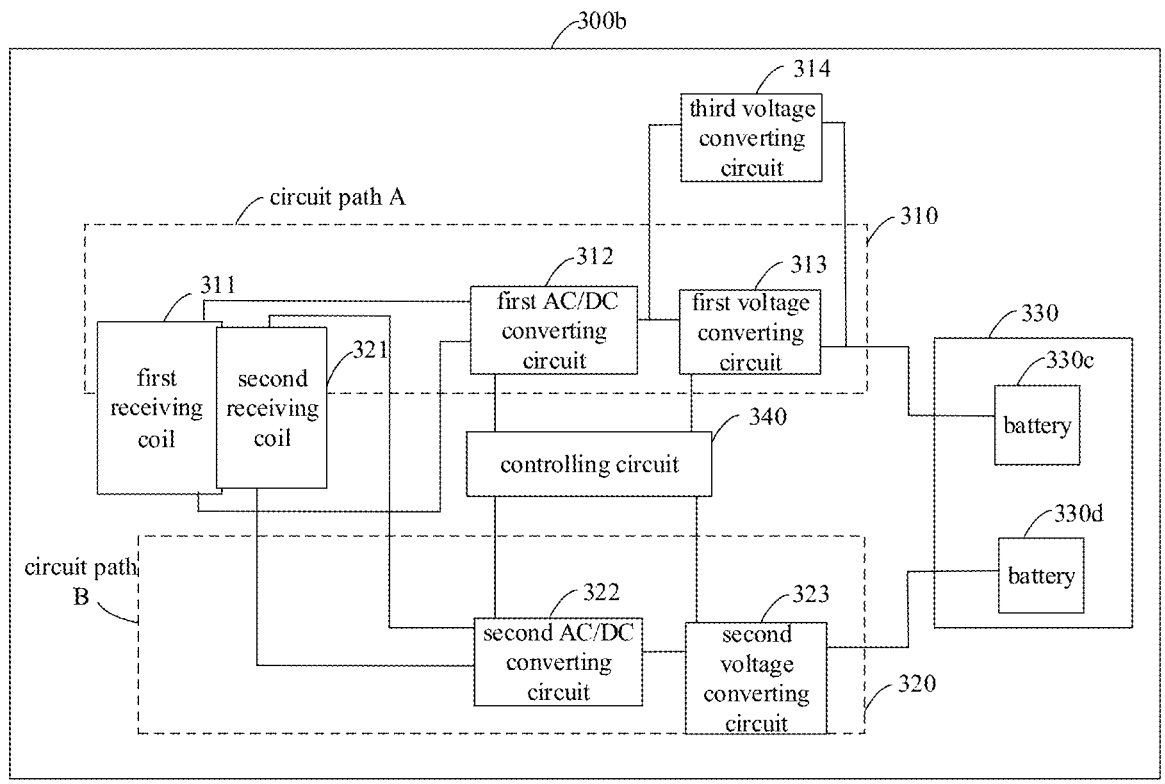
FIG. 7b is a schematic view of the wireless receiving device according to a yet embodiment of the present disclosure.

In another embodiment, referring to FIG. 7b, another wireless receiving device is provided in the present embodiment. The battery in the device may include two cells, that is, a cell 330c and a cell 330d. The cell 330c and the cell 330d may also be connected in parallel. In the present embodiment, the voltage after being performed the converting process by the first voltage converting circuit 313, may be configured to charge the cell 330c. The voltage after being performed the converting process by the second voltage converting circuit 323, may be configured to charge the cell 330d.

Figure 7C:
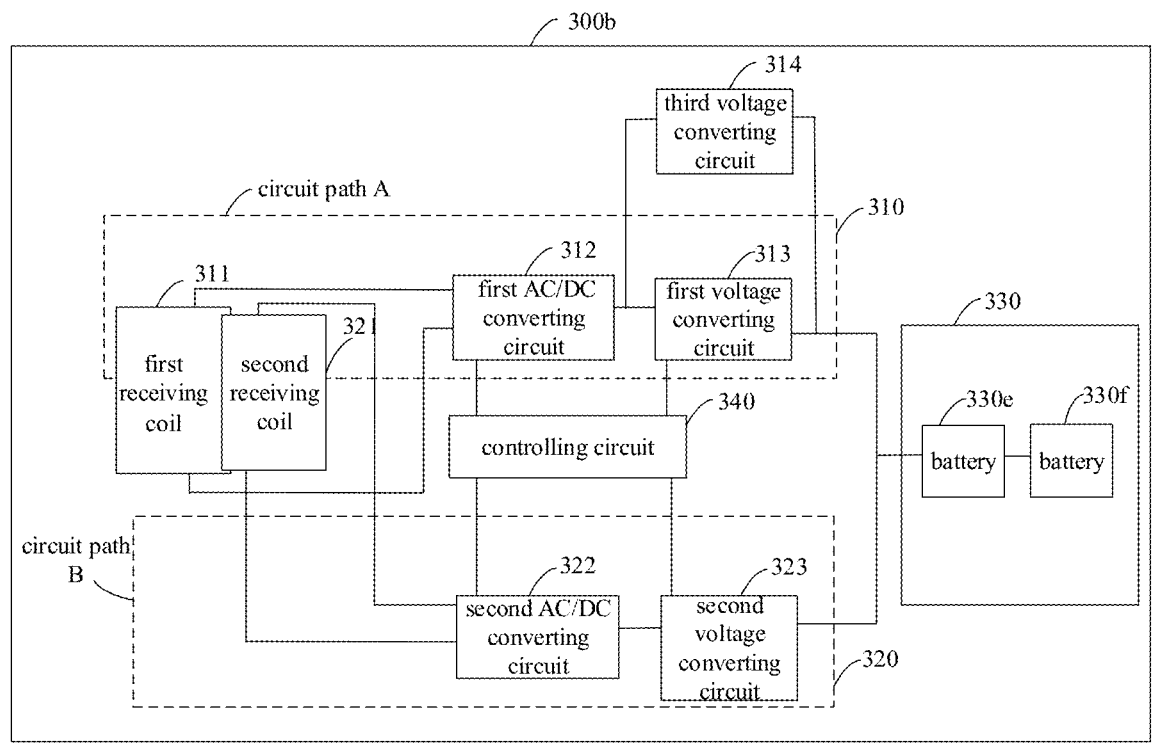
FIG. 7c is a schematic view of the wireless receiving device according to a yet embodiment of the present disclosure.

Referring to FIG. 7c, another wireless receiving device is provided by the present embodiment. The battery in the device may also include two cells, that is, a cell 330e and a cell 330f. The cell 330e and the cell 330f may be connected in series.

In the present embodiment, since the cell 330e and the cell 330f are connected in series, the first voltage converting circuit 313 and the second voltage converting circuit 323 may be configured to adopt the boost circuits to satisfy the voltage expected by the battery.

In the present embodiments, in response to the cell 330e and the cell 330f being connected in series, the first voltage converting circuit 313 and the second voltage converting circuit 323 may be the boost circuits, or may be charge pump circuits with the fixed boost ratio.

In some embodiments, in response to the rated voltage of the battery being 4.4V, the rated voltage after the cell 330e and the cell 330f are connected in series turns to 8.8V. When the voltages after being processed by the first AC/DC converting circuit 312 and the second AC/DC converting circuit 322 are 4.4V, both the first voltage converting circuit 313 and the second voltage converting circuit 323 may be configured to adopt the boost circuits with a fixed boost ratio of 2. The voltage after being performed the voltage-boosting process by the first voltage converting circuit 313 and the second voltage converting circuit 323 may be 8.8V, which may satisfy the voltage expected by the battery. Therefore, the cell 330e and the cell 330f may be charged based on the voltage.

In some embodiments, each of the wireless receiving-processing circuits includes an AC/DC converting circuit configured to convert a wireless charging signal received by a receiving coil connected to the AC/DC converting circuit to a DC voltage and a DC current; and a voltage converting circuit configured to perform a voltage-boosting or a voltage-bucking process for the DC voltage output by the AC/DC converting circuit, to obtain a charging voltage satisfying charging requirements of the battery.

In the present embodiment, the voltage converting circuit may be configured to perform a converting processing for the voltage output by the AC/DC converting module. For example, the voltage converting circuit may be configured to perform the voltage-bucking process for a voltage after being performed a filtering process by a filtering circuit included in the AC/DC converting module, or perform the voltage-boosting process for the voltage after being performed the filtering process, which is not specifically limited in the present disclosure.

The AC/DC converting circuit in the present embodiment may be configured to be controlled by the MCU and/or the AP.

In order to further ensure the charging efficiency during the charging process, the wireless receiving device may be configured to transmit a feedback signal to the wireless transmitting device. The wireless transmitting device may be configured to adjust a transmission power based on a voltage and/or a current corresponding to the feedback signal, which will be described in detail in the following.

In some embodiments, the wireless receiving device may further include a controlling circuit 340 configured to generate feedback information based on at least one of charging parameters and feed the feedback information back to a wireless transmitting device. The charging parameters include a voltage between two terminals of the battery, a charging current of the battery, an output current of each of the AC/DC converting circuits, and an output voltage of each of the AC/DC converting circuits. The feedback information is configured to instruct the wireless transmitting device to adjust transmission powers of wireless charging signals transmitted from the wireless transmitting device.

In the present embodiments, the controlling circuit in the wireless receiving device may be configured to feed the feedback information back to the wireless transmitting device. The wireless transmitting device may be configured to adjust the transmission powers based on the feedback information after receiving the feedback information.

In some embodiments, the feedback information may include the voltage between two terminals of the battery, the charging current of the battery, the output current of each of the AC/DC converting circuits, and the output voltage of each of the AC/DC converting circuits.

The voltage between two terminals of the battery and the charging current of the battery are provided to the wireless transmitting device to determine the transmission powers of the wireless charging signals, the output current of each of the AC/DC converting circuits and the output voltage of each of the AC/DC converting circuits are provided to the wireless transmitting device to determine transmission voltages of the wireless charging signals after the transmission powers of the wireless charging signals being determined.

In some embodiments, the controlling circuit 340 may be further configured to determine a required charging power of the battery based on the voltage between the two terminals of the battery and/or the charging current of the battery, and feed the required charging power as the feedback information back to the wireless transmitting device, to make the wireless transmitting device may adjust the transmitting powers of the wireless charging signals.

In the present embodiment, in the process of charging the battery, multiple charging circuit paths may include two circuit paths, one of the two circuit paths may be configured to feed an actually-received power entering the battery back to the wireless transmitting device, and the other of the two circuit paths may be configured not to feed back. In other embodiments, the multiple charging circuit paths may be configured to be staggered to feed the actually-received power entering the battery back to the wireless transmitting device. The multiple charging circuit paths may be configured to be staggered to feed the actually-received power entering the battery back to the wireless transmitting device.

Similarly, FIG. 3 is taken as an example for description. The controlling circuit 340 may be configured to feed an actually-received power entering the battery, of the circuit path A to the wireless transmitting device, but not to feed an actually-received power entering the battery, of the circuit path B back to the wireless transmitting device. In other embodiments, the controlling circuit 340 may be configured to feed the actually-received power entering the battery, of the circuit path B back to the wireless transmitting device, but not to feed the actually-received power entering the battery, of the circuit path A back to the wireless transmitting device. In other embodiments, the controlling circuit 340 may be configured to feed the actually-received power entering the battery in the trickle charging stage of the charging process, of the circuit path A back to the wireless transmitting device, and to feed the actually-received power entering the battery in the constant-current charging stage and/or the constant-voltage charging stage of the charging process, of the circuit path B back to the wireless transmitting device. No specific limitations will be made to the present disclosure.

It can be understood that, in a case where the multiple charging circuit paths may be configured to be staggered to feed the actually-received power entering the battery back to the wireless transmitting device, it may be configured not to determine which one of the multiple charging circuit paths to feed the actually-received power entering the battery back to the wireless transmitting device based on the charging stages of the charging process. The multiple charging circuit paths may be configured to be staggered to feed the actually-received power entering the battery back to the wireless transmitting device based on charging time.

For example, within first 5 minutes since starting charging, the controlling circuit 340 may be configured to feed the actually-received power entering the battery of the circuit path A back to the wireless transmitting device, and not to feed the actually-received power entering the battery of the circuit path B back to the wireless transmitting device. During a charging process where the charging time is equal to or greater than 5 minutes, the controlling circuit 340 may be configured to feed the actually-received power entering the battery of the circuit path B back to the wireless transmitting device, and not to feed the actually-received power entering the battery of the circuit path A back to the wireless transmitting device.

After the wireless transmitting device receives the actually-received power entering the battery fed back by the wireless receiving device, the wireless transmitting device may be configured to adjust a transmission power based on the actually-received power. For example, when a power fed back by the wireless receiving device received by the wireless transmitting device is 20 W, which is greater than a preset target value, a controlling unit in the wireless transmitting device may be configured to reduce a voltage and/or a current of a transmitting circuit to reduce a transmission power of the wireless transmitting device. When the power fed back by the wireless receiving device received by the wireless transmitting device is 5 W, which is less than the preset target value, the controlling unit in the wireless transmitting device may be configured to increase the voltage and/or current of the transmitting circuit to increase the transmission power of the wireless transmitting device. When the power fed back by the wireless receiving device received by the wireless transmitting device is 10 W, which is equal to the preset target value, the controlling unit in the wireless transmitting device may be configured not to adjust the transmission power.

In the present embodiment, the charging power may not be limited to be fed back to the wireless transmitting device by means of feeding back a power signal, and other means may be used. For example, the charging power of the battery may be fed back to the wireless transmitting device by means of Bluetooth, Wi-Fi, etc.

In some embodiments, the wireless receiving device may further include a controlling circuit 340 configured to determine a required current of the battery based on output currents and/or output voltages of the AC/DC converting circuits, and feed the required current back to the wireless transmitting device to make the wireless transmitting device adjust the transmission powers of the wireless charging signals based on the required current.

In the present embodiment, the controlling circuit 340 may be configured to feed the required current of the battery back to the wireless transmitting device. For example, when a preset current threshold of the receiving coils is 5 A, in response to the currents received by the receiving coils being 8 A, which is greater than the preset current threshold, the controlling circuit 340 may be configured to feed 5 A as the required current back to the wireless transmitting device, so as to reduce heating of the receiving coil. After receiving a feedback of the wireless receiving device, the wireless transmitting device may be configured to adjust wireless transmitting currents, that is, to adjust wireless transmission powers.

In the wireless receiving device provided by the present embodiment, the controlling circuit may be configured to feed the required current of the battery back to the wireless transmitting device, such that the wireless transmitting device may adjust the wireless transmitting current based on the required current, so as to further reduce the heating of the wireless receiving device.

In some embodiments, the wireless receiving device may further includes a controlling circuit 340 configured to determine a required charging power of the battery based on information of the battery, and determine a required current of the battery based on output currents of the AC/DC converting circuits, and determine a required voltage of the battery based on the required charging power and the required current, and feed the required voltage or a voltage difference between the required voltage and an output voltage of any one of the AC/DC converting circuits back to the wireless transmitting device.

In the present embodiment, after the required charging power and the required current of the battery are determined, the required voltage of the battery may be determined, such that the required voltage may be fed back to the wireless transmitting device. After the required voltage transmitted by the wireless receiving device is received by the wireless transmitting device, the wireless transmitting device may be configured to adjust the transmission voltages based on the required voltage.

In the present embodiment, the battery information may include information such as the voltage between the two terminals of the battery, the charging current of the battery, a temperature of the battery, or the like.

In the present embodiment, after the required voltage is determined, the voltage difference between the required voltage and the output voltage of any one of the AC/DC converting circuits may be fed back to the wireless transmitting device. After the voltage difference is received by the wireless transmitting device, the wireless transmitting device may be configured to adjust the transmission voltages based on the voltage difference.

Specifically, after the voltage difference fed back by the wireless receiving device is received by the wireless transmitting device, the wireless transmitting device may be configured to adjust the transmission powers based on the voltage difference. For example, when the voltage difference received by the wireless transmitting device and fed back by the wireless receiving device is greater than 0, it indicates that, a transmission voltage transmitted by the wireless transmitting device is greater than the voltage expected by the battery. In response to the transmission voltage transmitted by the wireless transmitting device being greater than the voltage expected by the battery, the wireless transmitting device may be configured to reduce the transmission voltage. When the voltage difference received by the wireless transmitting device and fed back by the wireless receiving device is less than 0, it indicates that, the transmission voltage transmitted by the wireless transmitting device is less than the voltage expected by the battery. In response to the transmission voltage transmitted by the wireless transmitting device being less than the voltage expected by the battery, the wireless transmitting device may be configured to increase the transmission voltage. When the voltage difference received by the wireless transmitting device and fed back by the wireless receiving device is equal to 0, it indicates that, the transmission voltage transmitted by the wireless transmitting device is equal to the voltage expected by the battery. In response to the transmission voltage transmitted by the wireless transmitting device being equal to the voltage expected by the battery, the wireless transmitting device may be configured not to adjust the transmission voltage.

In another embodiment, a difference between an expected-received power of the battery and the actually-received power may be fed back to the wireless transmitting device. In the present embodiment, the expected-received power may be a product of a charging voltage and a charging current that are expected to be received by the battery, and the actually-received power may be a product of an actual charging voltage and an actual charging current of the battery.

In some embodiments, in the process of charging the battery, the multiple charging circuit paths may include two charging circuit paths. The controlling circuit 340 may be configured to feed a difference between an expected-received power of one of the two charging circuit paths and the actually-received power entering the battery back to the wireless transmitting device, and not to feed that of the other of the two charging circuit paths. In other embodiments, the controlling circuit 340 may be configured to stagger feedbacks of differences between expected-received powers of the multiple charging circuit paths and actually-received powers entering the battery to the wireless transmitting device.

For example, for the circuit path A in FIG. 3, the controlling circuit 340 may be configured to feed the difference between the expected-received power and the actually-received power entering the battery back to the wireless transmitting device. For the circuit path B in FIG. 3, the controlling circuit 340 may be configured not to feed the difference between the expected-received power and the actually-received power entering the battery back to the wireless transmitting device. Or the controlling circuit 340 may be configured to feed the difference between the expected-received power and the actually-received power entering the battery, of the circuit path B back to the wireless transmitting device, and not to feed the difference between the expected-received power and the actually-received power entering the battery, of the circuit path A back to the wireless transmitting device. Or the controlling circuit 340 may be configured to feed the difference between the expected-received power and the actually-received power entering the battery in the trickle charging stage of the charging process, of the circuit path A back to the wireless transmitting device, and to feed the difference between the expected-received power and the actually-received power entering the battery, in the constant-current charging stage/the constant-voltage charging stage of the charging process, of the circuit path B back to the wireless transmitting device. No specific limitations will be made in the present disclosure.

It can be understood that, in a case where the multiple charging circuit paths may be configured to be staggered to feed the difference between the expected-received power and the actually-received power entering the battery back to the wireless transmitting device, it may be configured not to determine which one of the multiple charging circuit paths to feed the difference between the expected-received power and the actually-received power entering the battery back to the wireless transmitting device based on the charging stages of the charging process. The multiple charging circuit paths may be configured to be staggered to feed the difference between the expected-received power and the actually-received power entering the battery back to the wireless transmitting device based on the charging time.

For example, within first 5 minutes since starting charging, the controlling circuit 340 may be configured to feed the difference between the expected-received power and the actually-received power entering the battery, of the circuit path A back to the wireless transmitting device, and not to feed the difference between the expected-received power and the actually-received power entering the battery, of the circuit path B back to the wireless transmitting device. During the charging process where the charging time is equal to or greater than 5 minutes, the controlling circuit 340 may be configured to feed the difference between the expected-received power and the actually-received power entering the battery, of the circuit path B back to the wireless transmitting device, and not to feed the difference between the expected-received power and the actually-received power entering the battery, of the circuit path A back to the wireless transmitting device.

After the wireless transmitting device receives the difference between the expected-received power and the actually-received power entering the battery, fed back by the wireless receiving device, the wireless transmitting device may be configured to adjust the transmission powers based on the difference. For example, when the difference fed back by the wireless receiving device received by the wireless transmitting device is greater than 0, it indicates that, the transmission power transmitted by the wireless transmitting device is greater than the charging power expected by the battery. In response to the transmission power transmitted by the wireless transmitting device being greater than the charging power expected by the battery, the wireless transmitting device may be configured to reduce the transmission power, for example, reduce the transmission current and/or transmission voltage. When the difference fed back by the wireless receiving device received by the wireless transmitting device is less than 0, it indicates that, the transmission power transmitted by the wireless transmitting device is less than the charging power expected by the battery. In response to the transmission power transmitted by the wireless transmitting device being less than the charging power expected by the battery, the wireless transmitting device may be configured to increase the transmission power, for example, increase the transmission current and/or transmission voltage. When the difference fed back by the wireless receiving device received by the wireless transmitting device is equal to 0, it indicates that, the transmission power transmitted by the wireless transmitting device is equal to the charging power expected by the battery. In response to the transmission power transmitted by the wireless transmitting device being equal to the charging power expected by the battery, the wireless transmitting device may be configured not to adjust the transmission power.

In some embodiments, the feedback information is configured to instruct the wireless transmitting device to increase or decrease the transmission voltages.

In the present embodiment, after the wireless receiving device determines a situation of a currently-received voltage and/or current, the wireless receiving device may be configured to send the feedback information instructing increasing the voltage or reducing the voltage to the wireless transmitting device based on the information of the battery. After the wireless transmitting device receives the feedback information, the wireless receiving device may be configured to adjust the transmission voltage to satisfy the voltage expected by the battery based on the feedback information.

In the present embodiment, after receiving the feedback information sent by the wireless receiving device, the wireless transmitting device may be configured to adjust the transmission voltage based on a certain adjustment level. For example, the wireless transmitting device receives first feedback information and second feedback information sent by the wireless receiving device. The first feedback information is the information of a first coil fed back by the control circuit 340, and the second feedback information is the information of a second coil fed back by the control circuit 340. The wireless transmitting device may be configured to first adjust the transmission voltage based on the first feedback information, and then adjust the transmission voltage based on the second feedback information. After receiving an adjusted power, the wireless receiving device may be configured to feed back to the wireless transmitting device in real time, such that the wireless transmitting device may adjust the transmitting voltage in real time to satisfy the voltage expected by the battery, based on the feedback information sent by the wireless receiving device.

In some embodiments, the wireless receiving device is configured to send the feedback information to the wireless transmitting device by any one or more of the plurality of the receiving coils; or the wireless receiving device is configured to send the feedback information to the wireless transmitting device by means of an out-of-band communication.

In the present embodiment, the wireless receiving device may be configured to send the feedback information to the wireless transmitting device by one of the plurality of the receiving coils, or may be configured to send the feedback information to the wireless transmitting device by more than one of the plurality of receiving coils. The wireless receiving device may be further configured to send the feedback information to the wireless transmitting device by means of the out-of-band communication. For example, the wireless receiving device may send the feedback information to the wireless transmitting device by means of the Bluetooth, the Wi-Fi, or the like In some embodiments, power received by the plurality of the receiving coils are the same.

In some embodiments, the wireless receiving device may further include a controlling circuit configured to control the powers received by the plurality of the receiving coils.

In the present embodiment, referring to FIG. 3, when the number of turns of the first receiving coil 311 is the same with the number of turns of the second receiving coil 321, in a case that the wireless transmission powers are constant, a power received by the first receiving coil 311 may be the same with a power received by the second receiving coil 321.

In the present embodiment, when the number of turns of the first receiving coil 311 is different from the number of turns of the second receiving coil 321, in a case where the wireless transmission powers are constant, the power received by the first receiving coil 311 is different from the power received by the second receiving coil 321. In some embodiments, the controlling circuit 340 may be configured to control an amount of a power allocated to the first receiving coil 311 and an amount of a power allocated to the second receiving coil 321. For example, a transmission power transmitted by the wireless transmitting device is 10 W, in a case without the energy loss, the controlling circuit 340 may be configured to control a power received by the first receiving coil 311 to be 7 W, and a power received by the second receiving coil 321 to be 3 W.

In some embodiments, the controlling circuit is configured to control the powers received by the plurality of the receiving coils based on differences among impedances of the plurality of the receiving coils.

In the present embodiment, when the required current is required to be fed back to the wireless transmitting device, a required current of the first coil may be fed back to the wireless transmitting device, or a required current of a coil with a serious heat may be fed back to the wireless transmitting device. For example, when the first receiving coil 311 is the first coil and the second receiving coil 321 is the second coil, a required current of the first receiving coil 311 may be fed back to the wireless transmitting device. When a heat on the first receiving coil 311 is serious, the required current of the first receiving coil 311 may be fed back to the wireless transmitting device. When a heat on the second receiving coil 321 is serious, a required current of the second receiving coil 321 may be fed back to the wireless transmitting device.

In some embodiments, the wireless transmitting device may further include a controlling circuit 340 configured to control and adjust output currents of at least part of the plurality of the receiving coils, in response to impedances of the plurality of the receiving coils being different from each other or impedances of the plurality of the wireless receiving-processing circuits being different from each other.

In the present embodiment, when the receiving coils or rectification circuits or filtering circuits or voltage-transforming circuits on different charging circuit paths are different from each other, for example, coils of the plurality of the receiving coils may be different from each other, impedances of the coils are different from each other, due to the materials of the coils being different from each other. Or the impedances of the coils are different from each other, due to the turns of the coils being different from each other. Or impedances of multiple filtering circuits may also be different from each other, for example, the impedances of the multiple filtering circuits may be different from each other due to different circuit forms or different components included in the rectification circuits. Since impedances of different charging circuit paths are different from each other, heats on the different charging circuit paths may be different in the wireless charging process. Therefore, in this case, a current and a voltage of a charging circuit path may be adjusted based on impedances of components included in the charging circuit path.

Specifically, referring to FIG. 3, when wireless charging circuit paths include two circuit paths, that is, the circuit path A and the circuit path B, a circuit path impedance of the first receiving coil 311, the first AD/DC converting circuit 312 and the first voltage converting circuit 313 included in the circuit path A is greater than a circuit path impedance of the second receiving coil 321, the second AD/DC converting circuit 322 and the second voltage converting circuit 323 included in the circuit path B, respectively. As a result, a heat on the circuit path A may be greater than a heat on the circuit path B. Therefore, a communication controlling circuit may control a charging current on the circuit path A to be reduced, such that the heat on the circuit path A may be reduced as much as possible.

The communication controlling circuit in the present embodiment may include the MCU and/or the AP. In the present embodiment, the MCU or the AP, or the MCU and the AP together may be configured to implement adjusting the charging current through the communication controlling circuit, which is not specifically limited in the present disclosure.

In some embodiments, the wireless transmitting device may further include a controlling circuit 340 configured to control some of the plurality of the receiving coils to receive the wireless charging signals transmitted from a wireless transmitting device, and some of the wireless receiving-processing circuits corresponding to the some of the receiving coils are configured to perform a voltage and/or current process for the wireless charging signals. The some of the receiving coils are at least one of the receiving coils.

In the present embodiment, for example, referring to FIG. 3, the first receiving coil 311 may be configured to receive the wireless charging signals transmitted from the wireless transmitting device, and the second receiving coil 321 may be configured not to receive the wireless charging signals transmitted from the wireless transmitting device. Or the first receiving coil 311 may be configured not to receive the wireless charging signals transmitted from the wireless transmitting device, and the second receiving coil 321 may be configured to receive the wireless charging signals transmitted from the wireless transmitting device. In a case where the first receiving coil 311 may be configured to receive the wireless charging signals transmitted from the wireless transmitting device, and the second receiving coil 321 may be configured not to receive the wireless charging signals transmitted from the wireless transmitting device, the first AC/DC converting circuit 312 and the first voltage converting circuit 313 may be configured not to operate. Or in a case where the first receiving coil 311 may be configured not to receive the wireless charging signals transmitted from the wireless transmitting device, and the second receiving coil 321 may be configured to receive the wireless charging signals transmitted from the wireless transmitting device, the second AC/DC converting circuit 322 and the second voltage converting circuit 323 may be configured not to operate.

In some embodiments, the controlling circuit is configured to control the some of the plurality of the receiving coils to receive the wireless charging signals transmitted from the wireless transmitting device, the some of the wireless receiving-processing circuits corresponding to the some of the receiving coils being configured to perform the voltage and/or current process for the wireless charging signals, in response to at least one of preset conditions being satisfied. The preset conditions include a power transmitted from the wireless transmitting device being less than a preset power threshold; a temperature of any one of the multiple receiving coils being greater than a preset temperature threshold; and an output voltage or output current of any one of the wireless receiving-processing circuits being greater than a preset voltage/current threshold.

In the present embodiment, when a power of the wireless transmitting device is less than the preset power threshold, for example, when the power of the wireless transmitting device is less than 5 W, the controlling circuit 340 may be configured to control the some of the plurality of the receiving coils to receive the wireless charging signals. For example, the controlling circuit 340 may be configured to control the first receiving coil 311 to receive the wireless charging signals. Correspondingly, the controlling circuit 340 may be configured to control the wireless receiving-processing circuit connected to the first receiving coil 311 to operate. Or the controlling circuit 340 may be configured to control the second receiving coil 321 to receive the wireless charging signals. Correspondingly, the controlling circuit 340 may be configured to control the wireless receiving-processing circuit connected to the second receiving coil 321 to operate.

Or, when the temperatures of the some of the receiving coils are greater than the preset temperature threshold, for example, when the temperatures of the some of the receiving coils are greater than 50° C., the controlling circuit 340 may be configured to control the some of the plurality of the receiving coils to receive the wireless charging signals. For example, when a temperature of the first receiving coil 311 is greater than 50° C., the controlling circuit 340 may be configured to control the second receiving coil 321 to receive the wireless charging signals. Correspondingly, the controlling circuit 340 may be configured to control the wireless receiving-processing circuit connected to the second receiving coil 321 to operate. Or when a temperature of the second receiving coil 321 is greater than 50° C., the controlling circuit 340 may be configured to control the first receiving coil 311 to receive the wireless charging signals. Correspondingly, the controlling circuit 340 may be configured to control the wireless receiving-processing circuit connected to the first receiving coil 311 to operate.

Or, when output voltages of some of the wireless receiving-processing circuits are greater than the preset voltage, or output currents of some of the wireless receiving-processing circuits are greater than the preset current threshold, the controlling circuit 340 may be configured to control the receiving coils connected to the wireless receiving-processing circuits having input voltages being greater than the preset voltage preset threshold or input currents are greater than the preset current preset threshold, not to operate. Or when output voltages of the wireless receiving-processing circuits are greater than the preset voltage, and/or output currents of the wireless receiving-processing circuits are greater than the preset current threshold, the controlling circuit 340 may be configured to stop charging the battery.

For example, when an output voltage of a first wireless receiving-operating circuit is greater than the preset voltage threshold, for example, the output voltage of the first wireless receiving-operating circuit is greater than 20V, the controlling circuit 340 may be configured to control the second receiving coil 321 to receive the wireless charging signals. Correspondingly, the controlling circuit 340 may be configured to control a second wireless receiving-processing circuit connected to the second receiving coil 321 to operate. Or, when an output voltage of the second wireless receiving-operating circuit is greater than the preset voltage threshold, for example, the output voltage of the second wireless receiving-operating circuit is greater than 20V, the controlling circuit 340 may be configured to control the first receiving coil 311 to receive the wireless charging signals. Correspondingly, the controlling circuit 340 may be configured to control the first wireless receiving-processing circuit connected to the first receiving coil 311 to operate. Or, when both the output voltage of the first wireless receiving-operating circuit and the output voltage of the second wireless receiving-operating circuit are greater than the preset voltage threshold, for example, both the output voltage of the first wireless receiving-operating circuit and the output voltage of the second wireless receiving-operating circuit are greater than 20V, the controlling circuit 340 may be configured to control both the first receiving coil 311 and the second receiving coil 321 to stop receiving wireless charging signals, that is, the controlling circuit 340 may be configured to stop charging the battery.

It should be understood that numerical values above are only for illustration as examples, other numerical values may also be allowed, which should not be construed particular limitations to the present disclosure.

In some embodiments, the battery includes a plurality of cells, and each of the plurality of the wireless receiving-processing circuits is connected to and configured to charge for one of the cells.

In the present embodiment, each of the plurality of the wireless receiving-processing circuits may be connected to one cell included in the battery. Referring to FIG. 7b, for example, a voltage on the circuit path A after being converted by the first voltage converting circuit 313 may be configured to charge for the cell 330c included in the battery, and a voltage on the circuit path B after being converted by the second voltage converting circuit 323 may be configured to charge for the cell 330d included by the battery.

The plurality of cells in the present embodiment may be connected in series, or may be connected in parallel.

Figure 8:
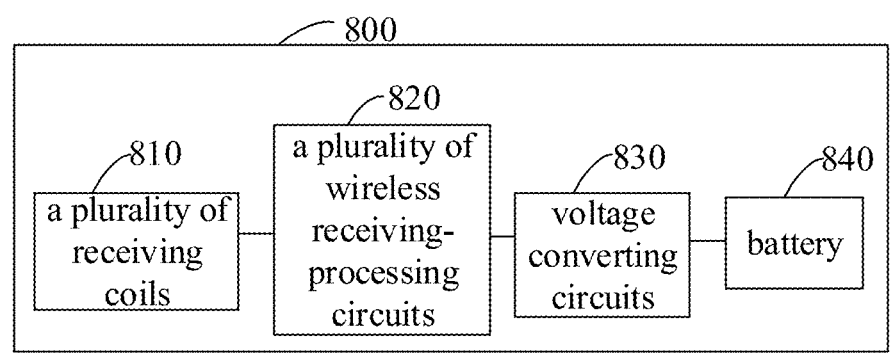
FIG. 8 is a schematic view of the wireless receiving device according to a yet embodiment of the present disclosure.

FIG. 8 is a schematic view of the wireless receiving device 800 according to a yet embodiment of the present disclosure. The wireless receiving device 800 may include a plurality of receiving coils 810, a plurality of AC/DC converting circuits 820, voltage converting circuits 830 and a battery 840.

The plurality of receiving coils 810 are coupled with a transmitting coil, and configured to receive wireless charging signals transmitted from the transmitting coil respectively.

The plurality of AC/DC converting circuits 820 are configured to perform a voltage and/or current process for the wireless charging signals received from the receiving coils respectively, to obtain DC voltages and DC currents.

The voltage converting circuits 830 are connected to the AC/DC converting circuits 820, and configured to perform a voltage-boosting or voltage-bucking process for the DC voltages to obtain a target DC voltage for charging the battery 840.

A terminal of each of the AC/DC converting circuits 820 is connected to a corresponding one of the receiving coils 810, and another terminal of each of the AC/DC converting circuits 820 is connected to the voltage converting circuits 830.

In the present embodiment, the voltage converting circuits 830 may perform the voltage-boosting or voltage-bucking process for a voltage after being processed by the AC/DC converting circuits 820. Since the wireless receiving device includes the plurality of AC/DC converting circuits 820 respectively configured to process voltages and/or currents received by the receiving coils 810, a possibility of an operating disorder of a rectifying circuit may be reduced. Furthermore, since the currents received by the receiving coils are processed by the AC/DC converting circuits, within a voltage range and a current range that the battery is allowed to be charged, a charging voltage and a charging current of the battery may be further increased, such that a charging power and a charging speed of the battery may be improved.

In some embodiments, the plurality of the receiving coils include a first receiving coil coupled to the transmitting coil, and configured to receive a first wireless charging signal from the transmitting coils; and a second receiving coil coupled to the transmitting coil, and configured to receive a second wireless charging signal from the transmitting coil.

In some embodiments, the first receiving coil and the second receiving coil are arranged at least overlappingly, to make the first receiving coil and the second receiving coil able to be simultaneously aligned with the transmitting coil.

In some embodiments, the first receiving coil and the second receiving coil are arranged on a same FPC substrate and are isolated by a shielding layer.

In some embodiments, both the first receiving coil and the second receiving coil are formed by winding wires covered with an insulating material.

In some embodiments, the plurality of the AC/DC converting circuits include a first AC/DC converting circuit connected to the first receiving coil, and configured to convert the first wireless charging signal to a first DC voltage and a first DC current; and a second AC/DC converting circuit connected to the second receiving coil, and configured to convert the second wireless charging signal to a second DC voltage and a second DC current.

The voltage converting circuits include a first voltage converting circuit configured to perform the voltage-boosting or voltage-bucking process for the first DC voltage and the second DC current, to obtain the target DC voltage for charging the battery. The wireless receiving device further includes a controlling circuit configured to control the first AC/DC converting circuit and the first voltage converting circuit to operate, and/or control the second AC/DC converting circuit and the first voltage converting circuit to operate, based on charging stages of the battery. The charging stages of the battery include at least one of: a trickle charging stage, a constant-current charging stage and a constant-voltage charging stage.

In some embodiments, the first voltage converting circuit includes a buck circuit or a buck-boost circuit or a charging IC.

In some embodiments, the controlling circuit is configured to control the buck circuit or the buck-boost circuit or the charging IC to operate in one or more of the following charging stages: the trickle charging stage, the constant-current stage and the constant-voltage stage.

In some embodiments, the first voltage converting circuit includes a charge pump circuit. The voltage converting circuits further include a second converting circuit connected to the first AC/DC converting circuit and/or the second AC/DC converting module. The controlling circuit is configured to control the first voltage converting circuit to operate in the constant-current charging stage and control the second voltage converting circuit to operate in the trickle charging stage and the constant-voltage charging stage.

In some embodiments, the second voltage converting circuit includes a buck circuit, a buck-boost circuit or a charging IC.

In some embodiments, the wireless receiving-processing circuits include a first AC/DC converting circuit connected to the first receiving coil, and configured to convert the first wireless charging signal to a first DC voltage and a first DC current; a second AC/DC converting circuit connected to the second receiving coil, and configured to convert the second wireless charging signal to a second DC voltage and a second DC current.

The voltage converting circuits include a first voltage converting circuit configured to perform the voltage-boosting or voltage-bucking process for the first DC voltage and the second DC current, to obtain the target DC voltage for charging the battery. The wireless receiving device further includes a controlling circuit configured to control the first AC/DC converting circuit and the first voltage converting circuit to operate, and/or control the second AC/DC converting circuit and the first voltage converting circuit to operate, based on charging modes of the battery. The charging modes of the battery include a first charging mode and a second charging mode, and a first charging speed of the first charging mode is greater than a second charging speed of the second charging mode.

In some embodiments, the first voltage converting circuit includes a buck circuit or a buck-boost circuit or a charging IC.

In some embodiments, the controlling circuit is configured to control the buck circuit or the buck-boost circuit or the charging IC to operate in the second charging mode.

In some embodiments, the first voltage converting circuit includes a charge pump circuit. The voltage converting circuits further include a second converting circuit connected to the first AC/DC converting circuit and/or the second AC/DC converting module. The controlling circuit is configured to control the first voltage converting circuit to operate in the first charging mode and control the second voltage converting circuit to operate in the second charging mode.

In some embodiments, the second voltage converting circuit includes a buck circuit, a buck-boost circuit or a charging IC.

In some embodiments, the battery includes a plurality of cells connected in parallel or a plurality of cells connected in series.

In some embodiments, the voltage converting circuits are configured to perform a voltage-bucking process for DC voltages after being processed by the AC/DC converting circuits, in response to the battery including a plurality of cells connected in parallel.

In some embodiments, the voltage converting circuits are configured to perform a voltage-boosting process for DC voltages after being processed by the AC/DC converting circuits, in response to the battery including a plurality of cells connected in series.

In some embodiments, the wireless receiving device further includes a controlling circuit configured to generate feedback information based on at least one of charging parameters and feed the feedback information back to a wireless transmitting device. The charging parameters include a voltage between two terminals of the battery, a charging current of the battery, an output current of each of the AC/DC converting circuits, and an output voltage of each of the AC/DC converting circuits. The feedback information is configured to instruct the wireless transmitting device to adjust transmission powers of wireless charging signals transmitted from the wireless transmitting device.

In some embodiments, the feedback information includes the voltage between two terminals of the battery, the charging current of the battery, the output current of each of the AC/DC converting circuits, and the output voltage of each of the AC/DC converting circuits. The voltage between the two terminals of the battery and the charging current of the battery are provided to the wireless transmitting device to determine the transmission powers of the wireless charging signals. The output current of each of the AC/DC converting circuits and the output voltage of each of the AC/DC converting circuits are provided to the wireless transmitting device to determine transmission voltages of the wireless charging signals after the transmission powers of the wireless charging signals being determined.

In some embodiments, the controlling circuit is further configured to determine a required charging power of the battery based on the voltage between the two terminals of the battery and/or the charging current of the battery, and feed the required charging power as the feedback information back to the wireless transmitting device, to make the wireless transmitting device adjust the transmission powers of the wireless charging signals.

In some embodiments, the controlling circuit is further configured to determine a required current of the battery based on output currents and/or output voltages of the AC/DC converting circuits, and feed the required current as the feedback information back to the wireless transmitting device to make the wireless transmitting device adjust the transmission powers of the wireless charging signals based on the required current.

In some embodiments, the controlling circuit is further configured to determine a required charging power of the battery based on information of the battery, and determine a required current of the battery based on output currents of the AC/DC converting circuits, and determine a required voltage of the battery based on the required charging power and the required current, and feed the required voltage or a voltage difference between the required voltage and an output voltage of any one of the AC/DC converting circuits as the feedback information back to the wireless transmitting device.

In some embodiments, the feedback information is configured to instruct the wireless transmitting device to increase or decrease the transmission voltages.

In some embodiments, the wireless receiving device is configured to send feedback information to a wireless transmitting device by any one or more of the plurality of the receiving coils. Or the wireless receiving device is configured to send the feedback information to a wireless transmitting device by means of an out-of-band communication.

In some embodiments, powers received by the plurality of the receiving coils are the same.

In some embodiments, the wireless receiving device further includes a controlling circuit configured to control powers received by the plurality of the receiving coils.

In some embodiments, the controlling circuit is configured to control the powers received by the receiving coils based on differences among impedances of the plurality of the receiving coils.

In some embodiments, the wireless receiving device further includes a controlling circuit configured to control and adjust output currents of at least part of the plurality of the receiving coils, in response to impedances of the plurality of the receiving coils being different from each other or impedances of the plurality of the wireless receiving-processing circuits being different from each other.

In some embodiments, the wireless receiving device further includes a controlling circuit configured to control some of the plurality of the receiving coils to receive the wireless charging signals transmitted from a wireless transmitting device, some of the wireless receiving-processing circuits corresponding to the some of the receiving coils are configured to perform a voltage and/or current process for the wireless charging signals. The some of the receiving coils are at least one of the receiving coils.

In some embodiments, the controlling circuit is configured to control the some of the receiving coils to receive the wireless charging signals transmitted from the wireless transmitting device, the some of the wireless receiving-processing circuits corresponding to the some of the receiving coils being configured to perform the voltage and/or current process for the wireless charging signals, in response to at least one of preset conditions being satisfied. The preset conditions include a power transmitted by the wireless transmitting device being less than a preset power threshold; a temperature of any one of the multiple receiving coils being greater than a preset temperature threshold; and an output voltage or output current of any one of the wireless receiving-processing circuits being greater than a preset voltage/current threshold.

Figure 9:
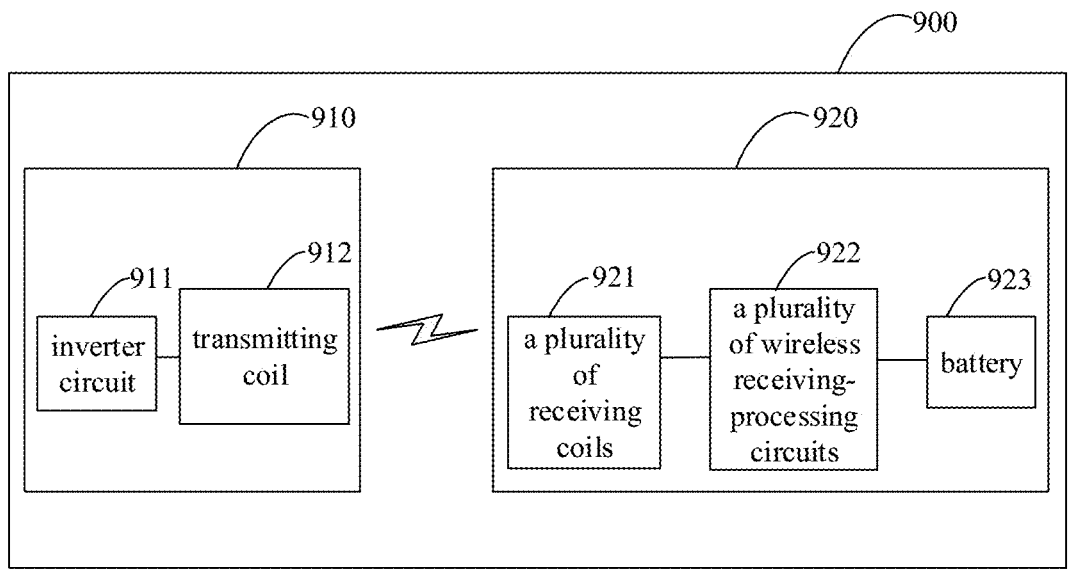
FIG. 9 is a schematic view of the wireless charging system according to another embodiment of the present disclosure.

FIG. 9 is a schematic view of the wireless charging system 900 according to another embodiment of the present disclosure. The wireless charging system 900 may include a wireless transmitting device 910 and a wireless receiving device 920. The wireless transmitting device 910 may include an inverter circuit 911 and a transmitting coil 912. The wireless receiving device 920 may include a plurality of receiving coils 921, a plurality of wireless receiving-processing circuits 922 and a battery 923.

The wireless transmitting device 910 may include the following.

The inverter circuit 911 is configured to convert an input DC to an AC.

The transmitting coil 912 is configured to convert the AC to a wireless charging signal capable of being transmitted through an electromagnetic domain.

The wireless receiving device 920 may include the following.

The plurality of receiving coils 921 are coupled to the transmitting coil, and configured to receive wireless charging signals transmitted from the transmitting coil.

The wireless charging signals in the present embodiment may be transmitted through a transmitting coil (or a transmission antenna) of a wireless transmitting device. In some embodiments, the wireless transmitting device may include a wireless transmitting drive circuit and a transmitting coil. The wireless transmitting driving circuit may be configured to generate an AC with a higher frequency. The transmitting coil or the transmission antenna may be configured to convert the AC with the higher frequency to an electromagnetic signal and transmit the electromagnetic signal out.

The plurality of the receiving coils 921 in the present embodiment may include two or three or more receiving coils, which are not specifically limited in the present disclosure. In the present embodiment, the plurality of the receiving coils 921 may simultaneously receive wireless signals transmitted from the wireless transmitting device, or may not simultaneously receive the wireless signals transmitted from the wireless transmitting device.

The plurality of wireless receiving-processing circuits 922 are configured to perform a voltage and/or current process for the wireless charging signals received by the receiving coils, to charge the battery 923.

A terminal of each of the wireless receiving-processing circuits is connected to a corresponding one of the receiving coils, and another terminal of each of the wireless receiving-processing circuits is connected to the battery.

In the present embodiment, the wireless receiving-processing circuits 922 may correspond to the receiving coils 921 one to one, and respectively process voltages and/or currents of the wireless charging signals received by the receiving coils 921. Voltages and currents after being processed by the wireless receiving-processing circuits 922 may be used together to charge the battery 923.

For the wireless charging system provided by the present embodiment, since the wireless receiving device includes a plurality of receiving coils and a plurality of wireless receiving-processing circuits, a charging speed and a charging efficiency of wireless charging may be improved. Further, since the plurality of the wireless receiving-processing circuits are configured to process voltages and currents received by the plurality of the receiving coils, a possibility of an operating disorder of a rectifying circuit may be reduced.

In some embodiments, the receiving coils 921 include a first receiving coil coupled to the transmitting coil, and configured to receive a first wireless charging signal from the transmitting coil; a second receiving coil coupled to the transmitting coil, and configured to receive a second wireless charging signal from the transmitting coil.

In some embodiments, the wireless receiving-processing circuits include the following. a first AC/DC converting circuit is connected to the first receiving coil, and configured to convert the first wireless charging signal to a first DC voltage and a first DC current. A second AC/DC converting circuit is connected to the second receiving coil, and configured to convert the second wireless charging signal to a second DC voltage and a second DC current. A first voltage converting circuit is connected to the first AC/DC converting module, and a second voltage converting circuit is connected to the second AC/DC converting module. The first voltage converting circuit and the second voltage converting circuit are configured to perform a voltage-boosting or voltage-bucking voltage process for the first DC voltage and the second DC voltage respectively, to obtain a third DC voltage for charging the battery. The wireless receiving device further includes a controlling circuit configured to control the first AC/DC converting circuit and the first voltage converting circuit to operate, and/or control the second AC/DC converting circuit and the second voltage converting circuit to operate, based on charging stages or charging modes of the battery. The charging stages of the battery include at least one of: a trickle charging stage, a constant-current charging stage and a constant-voltage charging stage. The charging modes of the battery include a first charging mode and a second charging mode, and a first charging speed of the first charging mode is greater than a second charging speed of the second charging mode.

In the present embodiment, the voltage converting circuits may be configured to perform a converting processing for a voltage output by the AC/DC converting module. For example, the voltage converting circuit may be configured to perform the bucking voltage process for a voltage after being performed a filtering process by a filtering circuit included in the AC/DC converting module, or perform the voltage-boosting process for the voltage after being performed the filtering process, which is not specifically limited in the present disclosure.

The AC/DC converting circuit in the present embodiment may be configured to be controlled by an MCU and/or an AP.

In the present embodiment, the first receiving coil and the second receiving coil may simultaneously receive the wireless charging signals transmitted from the transmitting coil, or may not simultaneously receive the wireless charging signals transmitted from the transmitting coil. A terminal of the first AC/DC converting circuit is connected to the first receiving coil, and another terminal of the first AC/DC converting circuit is connected to the battery. A terminal of the second AC/DC converting circuit is connected to the second receiving coil, and another terminal of the second AC/DC converting circuit is connected to the battery. The first AC/DC converting circuit is configured to process a voltage and/or a current corresponding to a received power of a first wireless charging signal received by the first receiving coil. The second AC/DC converting circuit is configured to process a voltage and/or a current corresponding to a received power of a second wireless charging signal received by the second receiving coil. For example, the first AC/DC converting circuit may be configured to perform a rectification process and a filtering process for the wireless charging signal received by the first receiving coil, and the second AC/DC converting circuit may be configured to perform the rectification process and the filtering process for the second wireless charging signal received by the second receiving coil.

In the present embodiment, the first receiving coil and the second receiving coil may be the receiving coils 921 in FIG. 9, and a circuit composed of the first AC/DC converting circuit, the first voltage converting circuit, the second AC/DC converting circuit and the second voltage converting circuit may be the plurality of the wireless receiving-processing circuits 922 in FIG. 9.

In the present embodiment, a current output by the first AC/DC converting circuit may be a current output by the first receiving coil, or may be a current detected on a charging circuit path from the first receiving coil to the first AC/DC converting circuit, which will not be limited specifically in the present disclosure. As long as a current may reflect the first receiving coil, the current may be applied in the present embodiment. Similarly, a current output by the second AC/DC converting circuit may be a current output by the second receiving coil, or may be a current detected on a charging circuit path from the second receiving coil to the second AC/DC converting circuit, which will not be limited specifically in the present disclosure. As long as a current may reflect the second receiving coil, the current may be applied in the present embodiment.

For the wireless charging system provided by the present embodiment, since the wireless receiving device includes the multiple receiving coils and the multiple wireless receiving-processing circuits, the charging speed and the charging efficiency of the wireless charging may be improved. Further, since the plurality of the wireless receiving-processing circuits are respectively configured to process the voltages and the currents received by the plurality of the receiving coils, the possibility of the operating disorder of the rectifying circuit may be reduced.

In some embodiments, the battery includes a plurality of cells, and each of the wireless receiving-processing circuits is connected to and configured to charge for one of the cells.

Device embodiments of the present disclosure are described in detail above with reference to FIGS. 1 to 9. Method embodiments of the present disclosure will be described in detail in the following with reference to FIGS. 10 to 13. The method embodiments correspond to the device embodiments, therefore parts not described in detail may refer to previous device embodiments.

Figure 10:
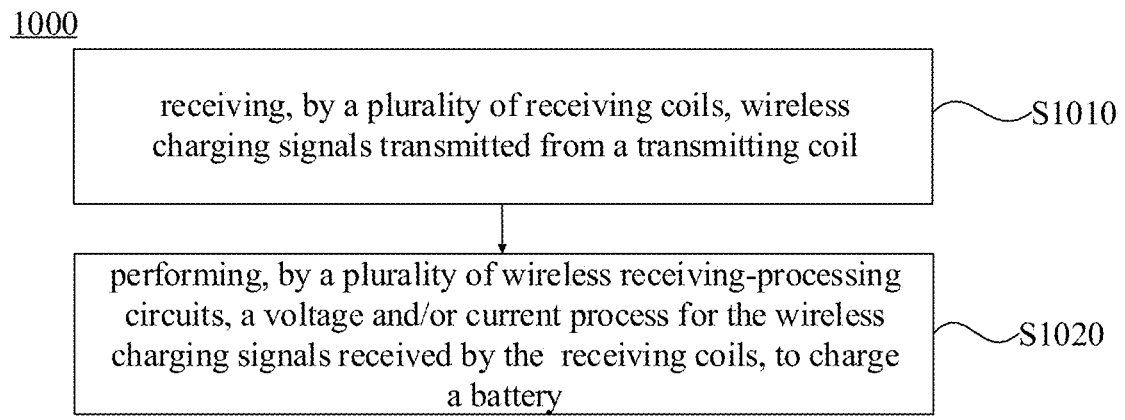
FIG. 10 is a schematic flowchart of a wireless charging method according to an embodiment of the present disclosure.

FIG. 10 is a schematic flowchart of a wireless charging method 1000 according to an embodiment of the present disclosure. The method 1000 may be applied to a wireless receiving device. For example, the wireless receiving device may be any one of the wireless receiving device 200 or 300b or 800. The method according to FIG. 10 may include operations S1010-1020.

S1010: receiving, by a plurality of receiving coils, wireless charging signals transmitted from a transmitting coil.

S1020: performing, by a plurality of wireless receiving-processing circuits, a voltage and/or current process for the wireless charging signals received by the receiving coils, to charge a battery.

In some embodiments, a terminal of each of the wireless receiving-processing circuits is connected to a corresponding one of the receiving coils, and another terminal of each of the wireless receiving-processing circuits is connected to the battery.

In some embodiments, the plurality of the receiving coils include a first receiving coil and a second receiving coil. The operation of receiving, by the plurality of receiving coils, the wireless charging signals transmitted from the transmitting coil, includes the first receiving coil receiving a first wireless charging signal transmitted from the transmitting coil, and the second receiving coil receiving a second wireless charging signal transmitted from the transmitting coil.

In some embodiments, the first receiving coil and the second receiving coil are arranged at least overlappingly, to make the first receiving coil and the second receiving coil able to be simultaneously aligned with the transmitting coil.

In some embodiments, the first receiving coil and the second receiving coil are arranged on a same FPC substrate and are isolated by a shielding layer.

In some embodiments, both the first receiving coil and the second receiving coil are formed by winding wires covered with an insulating material.

In some embodiments, the plurality of the wireless receiving-processing circuits include a first AC/DC converting circuit connected to the first receiving coil and a second AC/DC converting circuit connected to the second receiving coil, and the method further includes the first AC/DC converting circuit converting the first wireless charging signal to a first DC voltage and a first DC current; and the second AC/DC converting circuit converting the second wireless charging signal to a second DC voltage and a second DC current. The wireless receiving-processing circuits further include a first voltage converting circuit connected to the first AC/DC converting circuit and a second voltage converting circuit connected to the second AC/DC converting circuit, and the method further includes the first voltage converting circuit and the second voltage converting circuit performing a voltage-boosting or voltage-bucking process for the first DC voltage and the second DC voltage respectively, to obtain a third DC voltage for charging the battery. The wireless receiving device further includes a controlling circuit, and the method further includes the controlling circuit controlling the first AC/DC converting circuit and the first voltage converting circuit to operate, and/or controlling the second AC/DC converting circuit and the second voltage converting circuit to operate, based on charging stages of the battery. The charging stages of the battery include at least one of: a trickle charging stage, a constant-current charging stage and a constant-voltage charging stage.

In some embodiments, the first voltage converting circuit includes a buck circuit or a buck-boost circuit or a charging IC.

In some embodiments, the operation of controlling the first AC/DC converting circuit and the first voltage converting circuit to operate, and/or controlling the second AC/DC converting circuit and the second voltage converting circuit to operate, includes controlling the buck circuit or the buck-boost circuit or the charging IC to operate in one or more of the following charging stages: the trickle charging stage, the constant-current stage and the constant-voltage stage.

In some embodiments, the second voltage converting circuit includes a charge pump.

In some embodiments, the operation of controlling the first AC/DC converting circuit and the first voltage converting circuit to operate, and/or controlling the second AC/DC converting circuit and the second voltage converting circuit to operate, includes controlling the charge pump circuit to operate in the constant-current stage.

In some embodiments, in some embodiments, both the first AC/DC converting circuit and the second AC/DC converting circuit include a charge pump circuit respectively. The voltage converting circuits further include a third voltage converting circuit connected to the first AC/DC converting circuit and/or the second AC/DC converting circuit. The operation of controlling the first AC/DC converting circuit and the first voltage converting circuit to operate, and/or controlling the second AC/DC converting circuit and the second voltage converting circuit to operate, includes controlling the first voltage converting circuit and the second voltage converting circuit to operate in the constant-current charging stage, and controlling the third voltage converting circuit to operate in the trickle charging stage and/or the constant-voltage charging stage.

In some embodiments, the third voltage converting circuit includes a buck circuit, a buck-boost circuit or a charging IC.

In some embodiments, the plurality of the wireless receiving-processing circuits include a first AC/DC converting circuit connected to the first receiving coil and a second AC/DC converting circuit connected to the second receiving coil, and the method further includes the first AC/DC converting circuit converting the first wireless charging signal to a first DC voltage and a first DC current; and the second AC/DC converting circuit converting the second wireless charging signal to a second DC voltage and a second DC current. The wireless receiving-processing circuits further include a first voltage converting circuit connected to the first AC/DC converting circuit and a second voltage converting circuit connected to the second AC/DC converting circuit, and the method further includes the first voltage converting circuit and the second voltage converting circuit performing a voltage-boosting or voltage-bucking process for the first DC voltage and the second DC voltage respectively, to obtain a third DC voltage for charging the battery. The wireless receiving device further includes a controlling circuit, and the method further includes the controlling circuit controlling the first AC/DC converting circuit and the first voltage converting circuit to operate, and/or controlling the second AC/DC converting circuit and the second voltage converting circuit to operate, based on charging modes of the battery. The charging modes of the battery include a first charging mode and a second charging mode, and a first charging speed of the first charging mode is greater than a second charging speed of the second charging mode.

In some embodiments, the first voltage converting circuit includes a buck circuit or a buck-boost circuit or a charging IC.

In some embodiments, the operation of controlling the first AC/DC converting circuit and the first voltage converting circuit to operate, and/or controlling the second AC/DC converting circuit and the second voltage converting circuit to operate, includes controlling the buck circuit or the buck-boost circuit or the charging IC to operate in the second charging mode.

In some embodiments, the second voltage converting circuit includes a charge pump.

In some embodiments, the operation of controlling the first AC/DC converting circuit and the first voltage converting circuit to operate, and/or controlling the second AC/DC converting circuit and the second voltage converting circuit to operate, includes controlling the charge pump circuit to operate in the first charging mode.

In some embodiments, in some embodiments, both the first AC/DC converting circuit and the second AC/DC converting circuit include a charge pump circuit respectively. The voltage converting circuits further include a third voltage converting circuit connected to the first AC/DC converting circuit and/or the second AC/DC converting module. The operation of controlling the first AC/DC converting circuit and the first voltage converting circuit to operate, and/or controlling the second AC/DC converting circuit and the second voltage converting circuit to operate, includes controlling the first voltage converting circuit and the second voltage converting circuit to operate in the first charging mode, and controlling the third voltage converting circuit to operate in the second charging mode.

In some embodiments, the third voltage converting circuit includes a buck circuit, a buck-boost circuit or a charging IC.

In some embodiments, the battery includes a plurality of cells connected in parallel or a plurality of cells connected in series.

In some embodiments, the operation of controlling the first AC/DC converting module and the first voltage converting module to operate, and/or controlling the second AC/DC converting module and the second voltage converting module to operate, includes controlling the first voltage converting circuit and the second voltage converting circuit to respectively perform a voltage-bucking process for DC voltages after being processed by the AC/DC converting circuits included by the wireless receiving-processing circuits, in response to the battery including a plurality of cells connected in parallel.

In some embodiments, the first voltage converting circuit and the second voltage converting circuit are voltage-boosting circuits. The operation of controlling the first AC/DC converting circuit and the first voltage converting circuit to operate, and/or controlling the second AC/DC converting circuit and the second voltage converting circuit to operate, includes controlling the first voltage converting circuit and the second voltage converting circuit to respectively perform a voltage-boosting process for the DC voltages after being processed by the AC/DC converting circuits included by the wireless receiving-processing circuits, in response to the battery including a plurality of cells connected in series.

In some embodiments, the operation of performing, by a plurality of wireless receiving-processing circuits, a voltage and/or current process for the wireless charging signals received by the receiving coils, includes each of the AC/DC converting circuits included in the wireless receiving-processing circuits converting a wireless charging signal received by a receiving coil connected to the AC/DC converting circuit to a DC voltage and a DC current; and each of the voltage converting circuits included in the wireless receiving-processing circuits performing the voltage-boosting or voltage-bucking process for the DC voltage output by the AC/DC converting circuit, to obtain a charging voltage satisfying charging requirements of the battery.

In some embodiments, the method further includes generating feedback information based on at least one of charging parameters and feed the feedback information back to a wireless transmitting device. The charging parameters include a voltage between two terminals of the battery, a charging current of the battery, an output current of each of the AC/DC converting circuits, and an output voltage of each of the AC/DC converting circuits. The feedback information is configured to instruct the wireless transmitting device to adjust transmission powers of wireless charging signals transmitted from the wireless transmitting device.

In some embodiments, the feedback information includes the voltage between two terminals of the battery, the charging current of the battery, the output current of each of the AC/DC converting circuits, and the output voltage of each of the AC/DC converting circuits. The voltage between the two terminals of the battery and the charging current of the battery are provided to the wireless transmitting device to determine the transmission powers of the wireless charging signals, and the output current of each of the AC/DC converting circuits and the output voltage of each of the AC/DC converting circuits are provided to the wireless transmitting device to determine transmission voltages of the wireless charging signals after the transmission powers of the wireless charging signals are determined.

In some embodiments, the method 1000 further includes determining a required charging power of the battery based on the voltage between the two terminals of the battery and/or the charging current of the battery, and feed the required charging power as the feedback information back to the wireless transmitting device, to make the wireless transmitting device adjust the transmission powers of the wireless charging signals.

In some embodiments, the method 1000 further includes determining a required current of the battery based on output currents and/or output voltages of the AC/DC converting circuits, and feed the required current as the feedback information back to the wireless transmitting device to make the wireless transmitting device adjust the transmission powers of the wireless charging signals based on the required current.

In some embodiments, the method 1000 further includes determining a required charging power of the battery based on information of the battery, determine a required current of the battery based on output currents of the AC/DC converting circuits, determine a required voltage of the battery based on the required charging power and the required current, and feed the required voltage or a voltage difference between the required voltage and an output voltage of any one of the AC/DC converting circuits as the feedback information back to the wireless transmitting device.

In some embodiments, the method 1000 further includes sending the feedback information to the wireless transmitting device. The feedback information is configured to instruct the wireless transmitting device to increase or decrease the transmission voltages.

In some embodiments, powers received by the plurality of the receiving coils are the same.

In some embodiments, the method 1000 further includes controlling the powers received by the plurality of the receiving coils, respectively.

In some embodiments, the method 1000 further includes controlling the powers received by the receiving coils based on differences among impedances of the plurality of the receiving coils.

In some embodiments, referring to FIG. 10, the method 1000 may further include an operation S1030.

S1030: controlling and adjusting output currents of at least some of the plurality of the receiving coils, in response to the impedances of the plurality of the receiving coils being different from each other or impedances of the plurality of wireless receiving-processing circuits being different from each other.

In some embodiments, the method 1000 may include controlling the some of the plurality of the receiving coils to receive the wireless charging signals transmitted from a wireless transmitting device, and some of the wireless receiving-processing circuits corresponding to the some of the receiving coils performing a voltage and/or current process for the wireless charging signals. The some of the receiving coils are at least one of the receiving coils.

In some embodiments, the operation of controlling the some of the plurality of the receiving coils to receive the wireless charging signals transmitted from a wireless transmitting device, the some of the wireless receiving-processing circuits corresponding to the some of the receiving coils performing a voltage and/or current process for the wireless charging signals, includes controlling the some of the receiving coils to receive the wireless charging signals transmitted from the wireless transmitting device, the some of the wireless receiving-processing circuits corresponding to the some of the receiving coils performing the voltage and/or current process for the wireless charging signals, in response to at least one of preset conditions being satisfied. The preset conditions include a power transmitted by the wireless transmitting device being less than a preset power threshold; a temperature of any one of the multiple receiving coils being greater than a preset temperature threshold; and an output voltage or output current of any one of the wireless receiving-processing circuits being greater than a preset voltage/current threshold.

FIG. 12 is a schematic flowchart of the wireless charging method 1200 according to a yet embodiment of the present disclosure. The method 1200 may be applied to a wireless receiving device. For example, the wireless receiving device may be any one of the wireless receiving device 200 or 300*b* or 800. The method according to FIG. 12 may include operations S1210-1030.

S1210: receiving, by a plurality of receiving coils, wireless charging signals transmitted from a transmitting coil.

S1220: performing, by a plurality of AC/DC converting circuits, a voltage and/or current process for the wireless charging signals received by the receiving coils, to obtain DC voltages and DC currents.

S1230: performing, by voltage converting circuits, a voltage-boosting or voltage-bucking process for the DC voltages to obtain a target DC voltage for charging a battery.

In some embodiments, a terminal of each of the AC/DC converting circuits is connected to a corresponding one of the plurality of the receiving coils, and another terminal of each of the AC/DC converting circuits is connected to the voltage converting circuits.

In some embodiments, the plurality of the receiving coils include a first receiving coil and a second receiving coil. The operation of receiving, by a plurality of receiving coils, wireless charging signals transmitted from a transmitting coil, includes the first receiving coil receiving a first wireless charging signal transmitted from the transmitting coil; and the second receiving coil receiving a second wireless charging signal transmitted from the transmitting coil.

In some embodiments, the first receiving coil and the second receiving coil are arranged at least overlappingly, to make the first receiving coil and the second receiving coil able to be simultaneously aligned with the transmitting coil.

In some embodiments, the first receiving coil and the second receiving coil are arranged on a same FPC substrate and are isolated by a shielding layer.

In some embodiments, both the first receiving coil and the second receiving coil are formed by winding wires covered with an insulating material.

In some embodiments, the plurality of the AC/DC converting circuits include a first AC/DC converting circuit connected to the first receiving coil and a second AC/DC converting circuit connected to the second receiving coil, and the method further includes the first AC/DC converting circuit converting the first wireless charging signal to a first DC voltage and a first DC current; and the second AC/DC converting circuit converting the second wireless charging signal to a second DC voltage and a second DC current. The voltage converting circuits include a first voltage converting module. The operation of performing, by voltage converting circuits, a voltage-boosting or voltage-bucking process for the DC voltages to obtain a target DC voltage for charging a battery, includes the first voltage converting circuit performing a voltage-boosting or voltage-bucking process for the first DC voltage and the second DC voltage, to obtain the target DC voltage for charging the battery. The wireless receiving device further includes a controlling circuit, and the method 1200 further includes the controlling circuit controlling the first AC/DC converting circuit and the voltage converting circuits to operate, and/or controlling the second AC/DC converting circuit and the voltage converting circuits to operate, based on charging stages of the battery. The charging stages of the battery include at least one of: a trickle charging stage, a constant-current charging stage and a constant-voltage charging stage.

In some embodiments, the first voltage converting circuit includes a buck circuit or a buck-boost circuit or a charging IC.

In some embodiments, the operation of controlling the first AC/DC converting circuit and the voltage converting circuits to operate, and/or controlling the second AC/DC converting circuit and the voltage converting circuits to operate, includes controlling the buck circuit or the buck-boost circuit or the charging IC to operate in one or more of the following charging stages: the trickle charging stage, the constant-current stage and the constant-voltage stage.

In some embodiments, the first voltage converting circuit includes a charge pump circuit. The voltage converting circuits further include a second converting circuit connected to the first AC/DC converting circuit and/or the second AC/DC converting circuit. The method 1200 further includes controlling the first voltage converting circuit to operate in the constant-current stage and controlling the second voltage converting circuit to operate in the trickle charging stage and the constant-voltage stage.

In some embodiments, the second voltage converting circuit includes a buck circuit, a buck-boost circuit or a charging IC.

In some embodiments, the plurality of the wireless receiving-processing circuits include a first AC/DC converting circuit connected to the first receiving coil and a second AC/DC converting circuit connected to the second receiving coil, and the method further includes the first AC/DC converting circuit converting the first wireless charging signal to a first DC voltage and a first DC current; and the second AC/DC converting circuit converting the second wireless charging signal to a second DC voltage and a second DC current. The voltage converting circuits include a first voltage converting module. The operation of performing, by voltage converting circuits, a voltage-boosting or voltage-bucking process for the DC voltages to obtain a target DC voltage for charging a battery, includes the first voltage converting circuit performing a voltage-boosting or voltage-bucking process for the first DC voltage and the second DC voltage, to obtain the target DC voltage for charging the battery. The wireless receiving device further includes a controlling circuit, and the method 1200 further includes the controlling circuit controlling the first AC/DC converting circuit and the first voltage converting circuit included by the voltage converting circuits to operate, and/or controlling the second AC/DC converting circuit and the first voltage converting circuit included in the voltage converting circuits to operate, based on charging modes of the battery. The charging modes of the battery include a first charging mode and a second charging mode, and a first charging speed of the first charging mode is greater than a second charging speed of the second charging mode.

In some embodiments, the first voltage converting circuit includes a buck circuit or a buck-boost circuit or a charging IC.

In some embodiments, the operation of controlling the first AC/DC converting circuit and the voltage converting circuits to operate, and/or controlling the second AC/DC converting circuit and the voltage converting circuits to operate, includes controlling the buck circuit or the buck-boost circuit or the charging IC to operate in the second charging mode.

In some embodiments, the first voltage converting circuit includes a charge pump circuit. The voltage converting circuits further include a second converting circuit connected to the first AC/DC converting circuit and/or the second AC/DC converting circuit. The method 1200 further includes controlling the first voltage converting circuit to operate in the first charging mode and controlling the second voltage converting circuit to operate in the second charging mode.

In some embodiments, the second voltage converting circuit includes a buck circuit or a buck-boost circuit or a charging IC.

In some embodiments, the battery includes a plurality of cells connected in parallel or a plurality of cells connected in series.

In some embodiments, the operation of performing, by voltage converting circuits, a voltage-boosting or voltage-bucking process for the DC voltages, includes the voltage converting circuits performing a voltage-bucking process for the DC voltages, in response to the battery including a plurality of cells connected in parallel.

In some embodiments, the operation of performing, by voltage converting circuits, a voltage-boosting or voltage-bucking process for the DC voltages, includes the voltage converting circuits performing a voltage-boosting process for the DC voltages, in response to the battery including a plurality of cells connected in series.

In some embodiments, the method further includes generating feedback information based on at least one of charging parameters and feed the feedback information back to a wireless transmitting device. The charging parameters include a voltage between two terminals of the battery, a charging current of the battery, an output current of each of the AC/DC converting circuits, an output voltage of each of the AC/DC converting circuits. The feedback information is configured to instruct the wireless transmitting device to adjust transmission powers of wireless charging signals transmitted from the wireless transmitting device.

In some embodiments, the feedback information includes the voltage between two terminals of the battery, the charging current of the battery, the output current of each of the AC/DC converting circuits, and the output voltage of each of the AC/DC converting circuits. The voltage between the two terminals of the battery and the charging current of the battery are provided to the wireless transmitting device to determine the transmission powers of the wireless charging signals, and the output current of each of the AC/DC converting circuits and the output voltage of each of the AC/DC converting circuits are provided to the wireless transmitting device to determine transmission voltages of the wireless charging signals after the transmission powers of the wireless charging signals being determined.

In some embodiments, the method 1200 further includes determining a required charging power of the battery based on the voltage between the two terminals of the battery and/or the charging current of the battery, and feed the required charging power as the feedback information back to the wireless transmitting device, to make the wireless transmitting device adjust the transmission powers of the wireless charging signals.

In some embodiments, the method 1000 further includes determining a required current of the battery based on output currents and/or output voltages of the AC/DC converting circuits, and feed the required current as the feedback information back to the wireless transmitting device to make the wireless transmitting device adjust the transmission powers of the wireless charging signals based on the required current.

In some embodiments, the method 1000 further includes determining a required charging power of the battery based on information of the battery, determine a required current of the battery based on output currents of the AC/DC converting circuits, determine a required voltage of the battery based on the required charging power and the required current, and feed the required voltage or a voltage difference between the required voltage and an output voltage of any one of the AC/DC converting circuits as the feedback information back to the wireless transmitting device.

In some embodiments, the method 1200 further includes sending the feedback information to the wireless transmitting device. The feedback information is configured to instruct the wireless transmitting device to increase or decrease the transmission voltages.

In some embodiments, the method 1200 further includes sending feedback information to a wireless transmitting device by the controlling circuit or by means of an out-of-band communication.

In some embodiments, powers received by the plurality of the receiving coils are the same.

In some embodiments, the method 1200 further includes controlling the powers received by the plurality of the receiving coils, respectively.

In some embodiments, the operation of controlling the powers received by the plurality of the receiving coils, includes controlling the powers received by the receiving coils based on differences among impedances of the plurality of the receiving coils.

In some embodiments, the method 1200 further includes controlling and adjusting output currents of at least some of the plurality of the receiving coils, in response to the impedances of the plurality of the receiving coils being different from each other or impedances of the plurality of wireless receiving-processing circuits being different from each other.

In some embodiments, the method 1200 may include controlling the some of the plurality of the receiving coils to receive the wireless charging signals transmitted from a wireless transmitting device, some of the wireless receiving-processing circuits corresponding to the some of the receiving coils performing a voltage and/or current process for the wireless charging signals. The some of the receiving coils are at least one of the receiving coils.

In some embodiments, the operation of controlling the some of the plurality of the receiving coils to receive the wireless charging signals transmitted from a wireless transmitting device, some of the wireless receiving-processing circuits corresponding to the some of the receiving coils performing a voltage and/or current process for the wireless charging signals, includes controlling the some of the receiving coils to receive the wireless charging signals transmitted from the wireless transmitting device, the some of the wireless receiving-processing circuits corresponding to the some of the receiving coils performing the voltage and/or current process for the wireless charging signals, in response to at least one of preset conditions being satisfied. The preset conditions include a power transmitted by the wireless transmitting device being less than a preset power threshold; a temperature of any one of the multiple receiving coils being greater than a preset temperature threshold; and an output voltage or output current of any one of the wireless receiving-processing circuits being greater than a preset voltage/current threshold.

Figure 13:
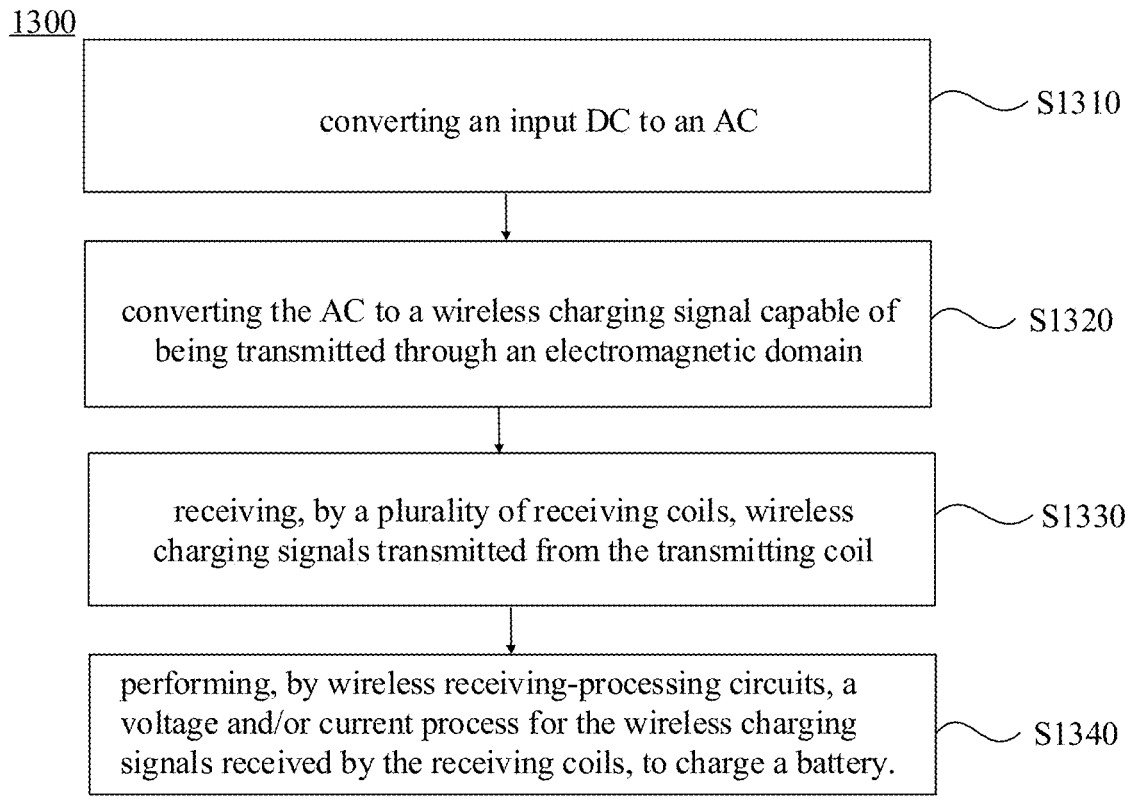
FIG. 13 is a schematic flowchart of the wireless charging method according to a yet embodiment of the present disclosure.

FIG. 13 is a schematic flowchart of the wireless charging method 1300 according to a yet embodiment of the present disclosure. The method 1300 may be applied to a wireless charging system. For example, the wireless charging system may be any one of devices in the wireless charging system 900 described above. The method according to FIG. 13 may include operations S1310-S1340.

S1310: converting an input DC to an AC.

S1320: converting the AC to a wireless charging signal capable of being transmitted through an electromagnetic domain.

S1330: receiving, by a plurality of receiving coils, wireless charging signals transmitted from the transmitting coil.

S1340: performing, by wireless receiving-processing circuits, a voltage and/or current process for the wireless charging signals received by the receiving coils, to charge a battery.

In some embodiments, a terminal of each of the wireless receiving-processing circuits is connected to a corresponding one of the receiving coils, and another terminal of each of the wireless receiving-processing circuits is connected to the battery.

In some embodiments, the plurality of the receiving coils include a first receiving coil and a second receiving coil. The operation of receiving, by a plurality of receiving coils, wireless charging signals transmitted from a transmitting coil, includes the first receiving coil receiving a first wireless charging signal transmitted from the transmitting coil; and the second receiving coil receiving a second wireless charging signal transmitted from the transmitting coil.

In some embodiments, the plurality of the wireless receiving-processing circuits include a first AC/DC converting circuit connected to the first receiving coil and a second AC/DC converting circuit connected to the second receiving coil, and the method 1300 further includes the first AC/DC converting circuit converting the first wireless charging signal to a first DC voltage and a first DC current; and the second AC/DC converting circuit converting the second wireless charging signal to a second DC voltage and a second DC current. The wireless receiving-processing circuits further include a first voltage converting circuit connected to the first AC/DC converting circuit and a second voltage converting circuit connected to the second AC/DC converting circuit, and the method 1300 further includes the first voltage converting circuit and the second voltage converting circuit performing a voltage-boosting or voltage-bucking process for the first DC voltage and the second DC voltage respectively, to obtain a third DC voltage for charging the battery. The wireless receiving device further includes a controlling circuit, and the method 1300 further includes the controlling circuit controlling the first AC/DC converting circuit and the first voltage converting circuit to operate, and/or controlling the second AC/DC converting circuit and the second voltage converting circuit to operate, based on charging stages of the battery. The charging stages of the battery include at least one of: a trickle charging stage, a constant-current charging stage and a constant-voltage charging stage.

A non-transitory computer-readable storage medium is provided in the present embodiment. The non-transitory computer-readable storage medium is configured to store computer-executable instructions. The computer-executable instructions are configured to perform any one of the wireless charging method 1000 or 1200 or 1300.

A computer program product is also provided in the present embodiment, and includes computer programs stored in a non-transitory computer-readable storage medium. The computer programs include program instructions. When the program instructions are executed by a computer, the computer is controlled to perform any one of the wireless charging method 1000 or 1200 or 1300.

A wireless charging process applied in the embodiments of the present disclosure will be described in the following with reference to FIG. 14 to FIG. 17.

For a traditional wireless charging technology, generally a power supply device (such as an adapter) is connected to a wireless charging device (such as the wireless charging base). An output power of the power supply device is transmitted to a to-be-charged device by means of a wireless (such as an electromagnetic microwave) through the wireless charging device and configured to wirelessly charge the to-be-charged device. The to-be-charged device may be the electronic device above.

Based on wireless charging principles being different, wireless charging methods may be divided into three methods: a magnetic coupling (or an electromagnetic induction), a magnetic resonance and a radio wave. In the art, mainstream wireless charging standards include a QI standard, a Power Matters Alliance (PMA) standard, and an Alliance for Wireless Power (A4WP). Both the QI standard and the PMA standard adopt the magnetic coupling for wireless charging. The A4WP standard adopts the magnetic resonance for the wireless charging.

The wireless charging method of an embodiment will be described in the following with reference to FIG. 14.

Figure 14:
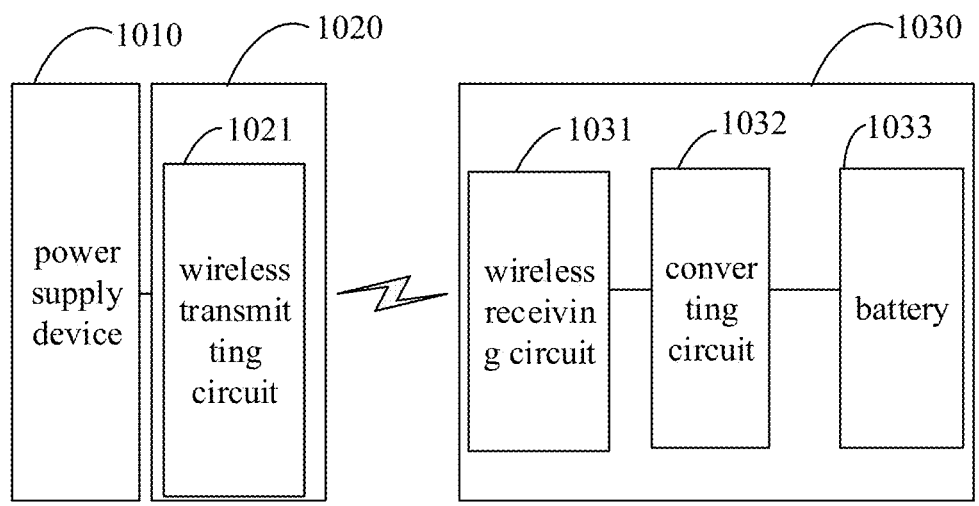
FIG. 14 is a schematic view of the wireless charging system according to a yet embodiment of the present disclosure.

Referring to FIG. 14, the wireless charging system includes a power supply device 1010, a transmitting device 1020 of a wireless charging signal, and a charging controlling device 1030. The transmitting device 1020 may be the wireless transmitting device 300a or 910 in the embodiments of the present disclosure. For example, the transmitting device 1020 may be a wireless charging base. The charging controlling device 1030 may refer to any one of the wireless receiving device 200 or 300b or 920 in the embodiments of the present disclosure.

After the power supply device 1010 is connected to the transmitting device 1020, an output voltage and an output current of the power supply device 1010 are transmitted to the transmitting device 1020.

The transmitting device 1020 may convert the output voltage and the output current of the power supply device 1010 to wireless charging signals (e.g., electromagnetic signals) through an internal wireless transmitting circuit 1021 for transmission. For example, the wireless transmitting circuit 1021 may convert the output current of the power supply device 1010 to an AC, and convert the AC to a wireless charging signal through a transmitting coil or a transmitting antenna.

FIG. 14 only exemplarily shows a schematic structural diagram of the wireless charging system, but the embodiments of the present disclosure is not limited thereto. For example, the transmitting device 1020 may also be referred to as the transmitting device of the wireless charging signal, and the charging controlling device 1030 may also be referred to as the receiving device of the wireless charging signal. The receiving device of the wireless charging signal may be, for example, a chip with a receiving function for the wireless charging signal, which may receive the wireless charging signal transmitted from the transmitting device 1020. The receiving device of the wireless charging signal may also be a to-be-charged device.

The charging controlling device 1030 may be configured to receive the wireless charging signal transmitted from the wireless transmitting circuit 1021 through a wireless receiving circuit 1031, and convert the wireless charging signal to an output voltage and an output current of the wireless receiving circuit 1031. For example, the wireless receiving circuit 1031 may be configured to convert the wireless charging signal transmitted from the wireless transmitting circuit 1021 to the AC through the receiving coil or the receiving antenna, and perform a rectification and/or filtering process for the AC, to convert the AC to the output voltage and the output current of the wireless receiving circuit 1031.

In some embodiments, before the wireless charging, the transmitting device 1020 and the charging controlling device 1030 may pre-negotiate a transmission power of the wireless transmitting circuit 1021. When the power negotiated by the transmitting device 1020 and the charging controlling device 1030 is 5 W, the output voltage of the wireless receiving circuit 1031 may be generally 5V, and the output current of the wireless receiving circuit 1031 may be generally 1 A. When the power negotiated by the transmitting device 1020 and the charging controlling device 1030 is 10.10 W, the output voltage of the wireless receiving circuit 1031 may be generally 9V, and the output current of the wireless receiving circuit 1031 may be generally 1.2 A.

When the output voltage of the wireless receiving circuit 1031 is not suitable to be directly loaded to the two ends of the battery 1033, it is necessary to first perform a constant voltage process and/or a constant current controlling process through the converting circuit 1032 in the charging controlling device 1030, to obtain a charging voltage and/or a charging current expected by the battery 1033 inside the charging controlling device 1030.

The converting circuit 1032 may be configured to convert the output voltage of the wireless receiving circuit 1031, to make the output voltage of the converting circuit 1032 satisfy the charging voltage expected by the battery 1033 and/or the charging current of the converting circuit 1032 satisfy the charging current expected by the battery 1033.

As an example, the converting circuit 1032 may be, for example, a charging IC, or may be a power-managing circuit. During a charging process of the battery 1033, the converting circuit 1032 may be configured to manage the charging voltage and/or the charging current of the battery 1033. The converting circuit 1032 may include a voltage feedback function and/or a current feedback function to manage the charging voltage and/or charging current of the battery 1033.

During a normal charging process, the charging voltage and/or charging current required by the battery may change continuously during different charging stages. The output voltage and/or the output current of the wireless receiving circuit may need to be continuously adjusted to satisfy a current charging requirement of the battery. For example, in the constant current charging stage of the battery, during the charging process, the charging current of the battery remains unchanged, but the voltage of the battery is constantly increasing. Therefore, the charging voltage required by the battery is also constantly increasing. As the charging voltage required by the battery is constantly increasing, the charging power required by the battery is also constantly increasing. When the charging power required by the battery increases, the wireless receiving circuit is required to increase the output power to satisfy the charging requirement of the battery.

When the output power of the wireless receiving circuit is less than the charging power currently required by the battery, the communication controlling circuit may be configured to transmit instruction information to the transmitting device, to instruct the transmitting device to increase the transmission power, so as to increase the output power of the wireless receiving circuit. Therefore, during the charging process, the communication controlling circuit may communicate with the transmitting device, such that the output power of the wireless receiving circuit may satisfy charging requirements of the battery in different charging stages.

Figure 15:
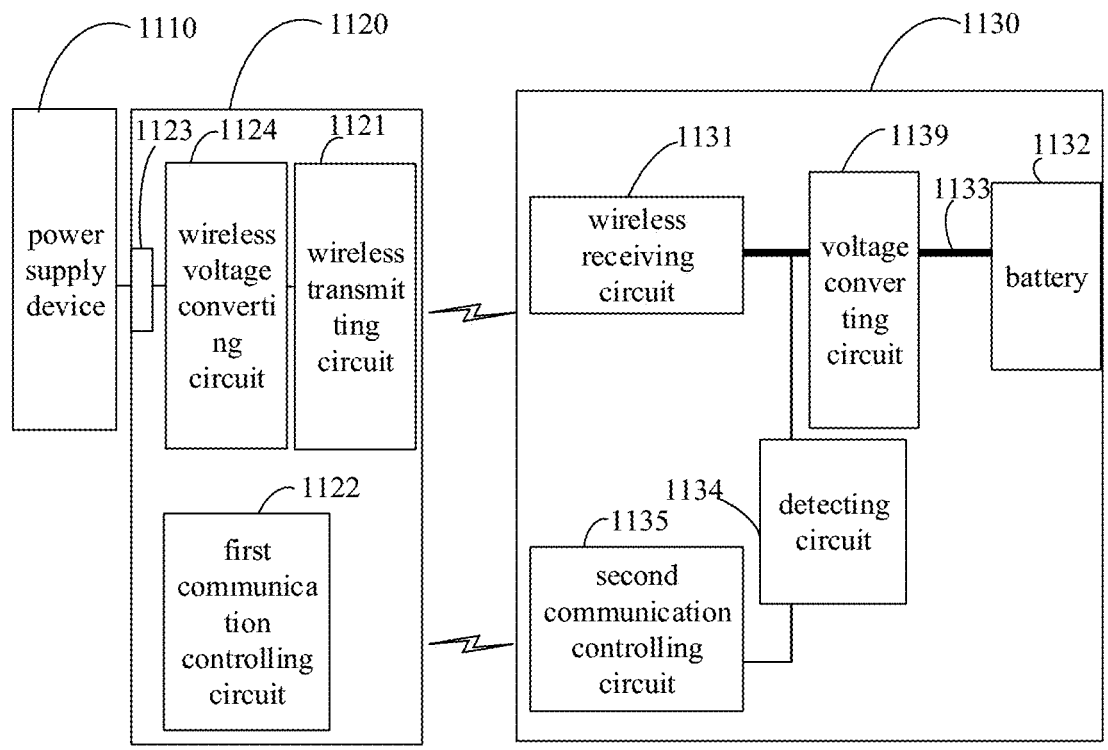
FIG. 15 is a schematic structural view of the wireless charging system according to another embodiment of the present disclosure.

Referring to FIG. 15, FIG. 15 is a schematic structural view of the wireless charging system according to another embodiment of the present disclosure. A to-be-charged device 11370 may include a second communication controlling circuit 1135. The present embodiment does not specifically limit a communication means between the second communication controlling circuit 1135 and the transmitting device 1120. In some embodiments, the second communication controlling circuit 1135 and the transmitting device 1120 may communicate by wireless communication means such as a Bluetooth communication, a Wi-Fi communication or a backscatter modulation (or power load modulation) communication, a short-range wireless communication based on a high carrier-wave frequency, an optical communication, an ultrasonic communication, an ultra-wideband communication, or a mobile communication, and the like.

In an embodiment, the short-range wireless communication based on a high carrier-wave frequency may include an IC chip with an Extremely High Frequency (EHF) antenna packaged inside. In some embodiments, the high carrier-wave frequency may be 60 GHz.

In an embodiment, the optical communication may be performed through an optical communication circuit. The optical communication circuit may include an infrared communication circuit. The infrared communication circuit may be configured to transmit information by infrared rays.

In an embodiment, the mobile communication may be performed through a mobile communication circuit. The mobile communication circuit may be configured to transmit the information by mobile communication protocols such as a 5G communication protocol, a 4G communication protocol or a 3G communication protocol, and the like.

Compared to a method in a Qi standard of communicating through being coupled to coils of the wireless receiving circuits by means of a signal modulation, by adopting the wireless communication means above, a reliability of communication may be improved, and a possibility that voltage ripples caused by adopting a signal coupling means for communication influences on a voltage-processing process of the Buck circuit may be reduced.

In some embodiments, the second communication controlling circuit 1135 and the transmitting device 1120 may also adopt a wired communication mode by a data interface to communicate.

Referring to FIG. 15, the transmitting device 1120 of the wireless charging signal may further include a charging interface 1123 configured to be connected with an external power supply device 1110. The wireless transmitting circuit 1121 may also be configured to generate the wireless charging signal based on an output current and an output current of the power supply device 1110.

In some embodiments, the transmitting device 1120 may include a first communication controlling circuit 1122. The first communication controlling circuit 1122 may be configured to adjust a power amount extracted by the wireless transmitting circuit 1121 from an output power of the power supply device 1110 during the wireless charging process, to adjust a transmission power of the wireless transmitting circuit 1121, such that a power transmitted by the wireless transmitting circuit 1121, that is, the transmission power of the, may satisfy the charging requirements of the battery. For example, the power supply device 1110 may be configured to directly output a relatively large fixed output power (e.g., 40 W), and the first communication controlling circuit 1122 may be configured to directly adjust the power amount extracted by the wireless transmitting circuit 1121 from the fixed power provided by the power supply device 1110.

In the present embodiment, the output power of the power supply device 1110 may be fixed. For example, the power supply device 1110 may be configured to directly output the relatively large fixed output power (e.g., 40 W). The power supply device 1110 may be configured to provide the output voltage and the output current to the wireless charging device 1120 based on the fixed output power. During the charging process, the first communication controlling circuit 1122 may be configured to extract a certain power amount from the fixed output power of the power supply device 1110 for the wireless charging. That is, in the present embodiment, a control right of adjusting the transmission power of the wireless transmitting circuit 1121 is allocated to the first communication controlling circuit 1122. The first communication controlling circuit 1122 may be configured to adjust the transmission power of the wireless transmitting circuit 1121 immediately after receiving instructing information sent by the second communication controlling circuit 1135, to satisfy the current charging requirements of the battery. In this way, a fast adjustment speed and a high efficiency may be achieved.

The present embodiment does not specifically limit a means that the wireless transmitting circuit 1121 extracts the power amount from the maximum output power provided by the power supply device 1110. For example, a wireless voltage converting circuit 1124 may be configured to be arranged inside the wireless charging device 1120. The wireless voltage converting circuit 1124 may be configured to be connected to the transmitting coils or the transmitting antenna to adjust the power received by the transmitting coils or the transmitting antenna. The wireless voltage converting circuit 1124 may include, for example, Pulse Width Modulation (PWM) controller and a switch unit. The first communication controlling circuit 1122 may be configured to adjust the transmission power of the wireless transmitting circuit 1121 by adjusting a duty cycle of a control signal sent by the PWM controller.

The present embodiment does not specifically limit a type of the power supply device 1110. For example, the power supply device 1110 may be a device such as the adapter, a power bank, a car charger, or a computer, and so on.

The present embodiment does not specifically limit a type of the charging interface 1123. In some embodiments, the charging interface 1123 may be a USB interface. The USB interface may be, for example, a USB 2.0 interface, a micro USB interface, or a USB TYPE-C interface. In other embodiments, the charging interface 1123 may also be a lightning interface, or any other type of parallel port and/or serial port that may be used for charging.

The present embodiment does not specifically limit a communication means between the first communication controlling circuit 1122 and the power supply device 1110. As an example, the first communication controlling circuit 1122 may be connected to the power supply device 1110 through another communication interface except the charging interface 1123, and communicate with the power supply device 1110 through the communication interface. As another example, the first communication controlling circuit 1122 may communicate with the power supply device 1110 in a wireless manner. For example, the first communication controlling circuit 1122 may perform a Near Field Communication (NFC) with the power supply device 1110. As a yet example, the first communication controlling circuit 1122 may communicate with the power supply device 1110 through the charging interface 1123, without setting additional communication interfaces or other wireless communication circuits, which may simplify a structure of the wireless charging device 1120. For example, the charging interface 1123 may be a USB interface, and the first communication controlling circuit 1122 may communicate with the power supply device 1110 based on a data line (e.g., a D+ and/or D− line) in the USB interface. For another example, the charging interface 1123 may be a USB interface (such as a USB TYPE-C interface) supporting a Power Delivery (PD) communication protocol, and the first communication controlling circuit 1122 and the power supply device 1110 may communicate based on the PD communication protocol.

In some embodiments, the first communication controlling circuit 1122 adjusting a transmission power of the wireless charging signal may refer to the first communication controlling circuit 1122 adjusting the transmission power of the wireless charging signal by adjusting an input voltage and/or an input current of the wireless transmitting circuit 1121. For example, the first communication controlling circuit may be configured to increase the transmission power of the wireless transmitting circuit by increasing the input voltage of the wireless transmitting circuit.

In some embodiments, referring to FIG. 15, the to-be-charged device 1130 may further include a first charging channel 1133 configured to provide an output voltage and/or an output current of a wireless receiving device 1130 to a battery 1132, to charge the battery 1132.

In some embodiments, a voltage converting circuit 1139 may be arranged on the first charging channel 1133. An input terminal of the voltage converting circuit 1139 is electrically connected to an output terminal of the wireless receiving circuit 1131. The voltage converting circuit 1139 is configured to perform a constant voltage and/or a constant current process on the output voltage of the wireless receiving circuit 1131, to charge the battery 1132. In this way, an output voltage and/or an output current of the voltage converting circuit 1139 may match the charging voltage and/or the charging currently required by the battery.

In some embodiments, increasing the transmission power of the wireless transmitting circuit 1121 may refer to increasing the transmission voltage of the wireless transmitting circuit 1121. Increasing the transmission voltage of the wireless transmitting circuit 1121 may be achieved by increasing an output voltage of the wireless voltage converting circuit 1124. For example, after receiving the instructing information instructing increasing the transmission power, and sent by the second communication controlling circuit 1135, the first communication controlling circuit 1122 may be configured to increase the transmission power of the wireless transmitting circuit 1121 by increasing the output voltage of the wireless voltage converting circuit 1124.

The present embodiment does not specifically limit a means of the second communication controlling circuit 1135 sending the instructing information to the first communication controlling circuit 1122.

For example, the second communication controlling circuit 1135 may be configured to periodically send instructing information to the first communication controlling circuit 1122. In other embodiments, the second communication controlling circuit 1135 may be configured to send the instructing information to the first communication controlling circuit 1122 only when the voltage of the battery reaches a charging cutoff voltage, or the charging current of the battery reaches a charging cutoff current.

In some embodiments, the receiving device of the wireless charging signal may further include a detecting circuit 1134. The detecting circuit 1134 may detect a voltage and/or a charging current of the battery 1132. The second communication controlling circuit 1135 may be configured to send the instructing information to the first communication controlling circuit 1122, based on the voltage and/or the charging current of the battery 1132, to instruct the first communication controlling circuit 1122 to adjust an output voltage and/or an output current corresponding to the transmission power of the wireless transmitting circuit1 1121.

In an embodiment, for the to-be-charged device, in a process of the constant current charging, the voltage of the battery will be constantly increasing, and the charging power required by the battery will also be increasing accordingly. As a result, the transmission power of the wireless charging signal is required to be increased to satisfy the current charging requirements of the battery. In a process of the constant voltage charging, the charging current of the battery may be decreasing constantly, and the charging power required by the battery will also be decreasing accordingly. As a result, the transmission power of the wireless charging signal is required to be reduced to satisfy the current charging requirements of the battery.

The first communication control circuit 1122 may be configured to adjust the transmission power of the wireless charging signal based on the instruction information, which may mean that the first communication control circuit 1122 adjusts the transmission power of the wireless charging signal to make the transmission power of the wireless charging signal match the charging voltage and/or the charging current currently required by the battery.

The transmission power of the wireless transmitting circuit 1121 matches the charging voltage and/or the charging current currently required by the battery 1132, which may mean that a configuration of the transmission power of the wireless charging signal by the first communication controlling circuit 1122 makes an output voltage and/or an output current of the first charging channel 1133 match the charging voltage and/or the charging current currently required by the battery 1132 (or, the configuration of the transmission power of the wireless charging signal by the first communication controlling circuit 1122 makes the output voltage and/or the output current of the first charging channel 1133 satisfy the charging requirements of the battery 1132 (including requirements of the battery 1132 for the charging voltage and/or the charging current)).

It should be understood that, in an embodiment of the present disclosure, "the output voltage and/or the output current of the first charging channel 1133 matches the charging voltage and/or the charging current currently required by the battery 1132" includes the following. A voltage of the DC output by the first charging channel 1133 is equal to the charging voltage required by the battery 1132, or a voltage difference between the voltage of the DC output by the first charging channel 1133 and the charging voltage required by the battery 1132 is within a preset voltage-floating range (for example, a voltage difference fluctuating by 100 mV to 200 mV). And/or a current of the DC output by the first charging channel 1133 is equal to the charging current required by the battery 1132, or a current difference between the current of the DC output by the first charging channel 1133 and the charging current required by the battery 1132 is within a preset current-floating range (for example, a current difference fluctuating by 100 mV to 200 mV).

The second communication controlling circuit 1135 is configured to perform the wireless communication with the first communication controlling circuit 1122, based on the voltage and/or the charging current of the battery 1132 detected by the detecting circuit 1134. In this way, the first communication controlling circuit 1122 may adjust the transmission power of the wireless transmitting circuit 1121, based on the voltage and/or the charging current of the battery 1132, which may include the following. In the constant current charging stage of the battery 1132, the second communication controlling circuit 1135 is configured to perform the wireless communication with the first communication controlling circuit 1122 based on a detected voltage of the battery, such that the first communication controlling circuit 1122 may adjust the transmission power of the wireless transmitting circuit 1121. In this way, the output voltage of the first charging channel 1133 may match the charging voltage required by the battery in the constant current charging stage (or, the output voltage of the first charging channel 1133 may satisfy the requirements of battery 1132 for the charging voltage in the constant current charging stage).

Figure 16:
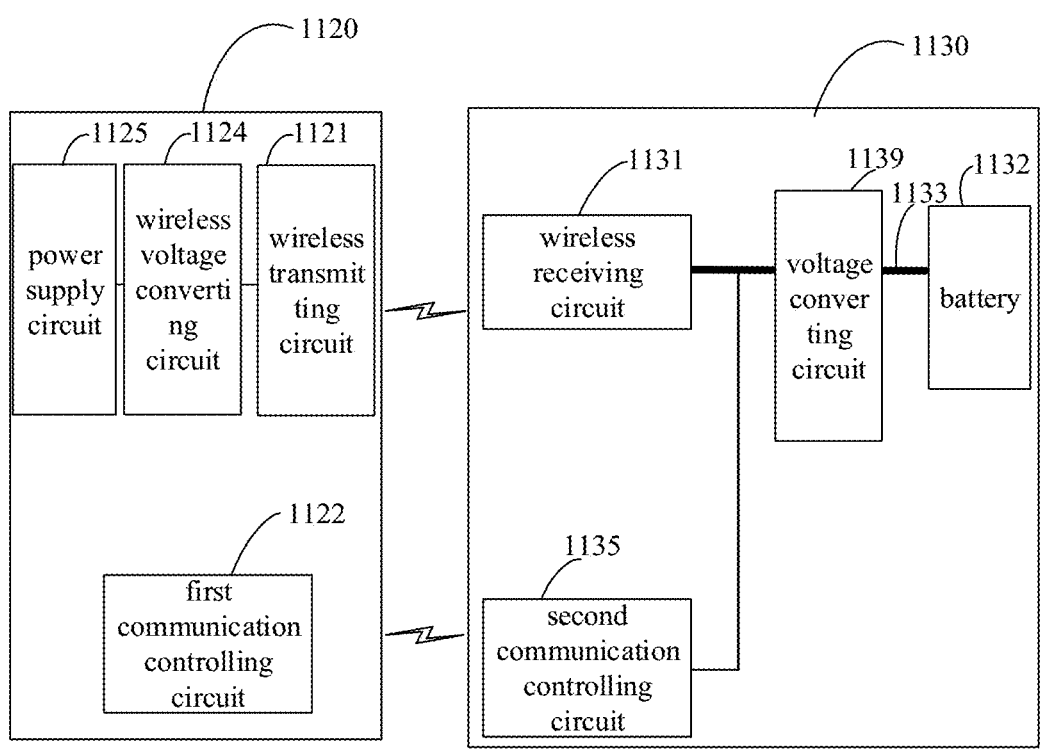
FIG. 16 is a schematic structural view of the wireless charging system according to a yet embodiment of the present disclosure.

FIG. 16 is another example of the charging system provided by the embodiments of the present disclosure. The transmitting device 1120 of the wireless charging signal, corresponding to the embodiment of FIG. 16, does not obtain power from the power supply device 1110, but directly converts an externally inputting an AC (for example, a commercial power) to the wireless charging signal mentioned above.

Referring to FIG. 16, the transmitting device 1120 of the wireless charging signal may further include a wireless voltage converting circuit 1124 and a power supply circuit 1125. The power supply circuit 1125 may be configured to receive the externally inputting AC (e.g., the commercial power), and generate an output voltage and an output current of the power supply circuit 1125 based on the AC. For example, the power supply circuit 1125 may be configured to perform the rectification process and/or the filtering process on the AC to obtain a DC or a pulsating DC, and transmit the DC or the pulsating DC to the wireless voltage converting circuit 1124.

The wireless voltage converting circuit 1124 may be configured to receive the output voltage of the power supply circuit 1125 and perform a converting process on the output voltage of the power supply circuit 1125 to obtain an output voltage and an output current of the wireless voltage converting circuit 1124. The wireless transmitting circuit 1121 may be further configured to generate the wireless charging signal based on the output voltage and the output current of the wireless voltage converting circuit 1124.

In the present embodiment, a function similar to the adapter is integrated inside the transmitting device 1120 of the wireless charging signal, such that the transmitting device 1120 of the wireless charging signal does not need to obtain a power from the external power supply device. In this way, an integration degree of the transmitting device 1120 of the wireless charging signal may be improved, and the number of components required to implement the wireless charging process may be reduced.

In some embodiments, the transmitting device 1120 of the wireless charging signal may be configured to support a first wireless charging mode and a second wireless charging mode. A charging speed of the transmitting device 1120 of the wireless charging signal to the to-be-charged device under the first wireless charging mode is greater than a charging speed of the transmitting device 1120 of the wireless charging signal to the to-be-charged device under the second wireless charging mode. In other words, compared to the transmitting device 1120 of the wireless charging signal operating in the second wireless charging mode, the time taken by the transmitting device 1120 of the wireless charging signal, operating in the first wireless charging mode, to fully charge a battery having the same capacity in the to-be-charged device may be shorter.

The charging method provided by the present embodiment may adopt the first charging mode for charging, or may adopt the second charging mode for charging, which is not limited in the present embodiment.

The second wireless charging mode may be considered as a normal wireless charging mode. For example, the second wireless charging mode may be a conventional wireless charging mode based on the QI standard, a PMA standard or an A4WP standard. The first wireless charging mode may be considered as a fast wireless charging mode. The normal wireless charging mode may refer to a charging mode that a transmission power of the transmitting device 1120 of the wireless charging signal may be relatively small (generally less than 15 W, and a commonly-used transmission power is 5 W or 10 W). Under the normal wireless charging mode, generally several hours may be taken to fully charge a relatively large-capacity battery (such as a battery with a capacity of 3000 mAh). Whereas, in the fast wireless charging mode, the transmission power of the transmitting device 1120 of the wireless charging signal is relatively large (generally greater than or equal to 15 W). Compared to the normal wireless charging mode, in the fast wireless charging mode, the charging time required by the transmitting device 1120 of the wireless charging signal to fully charge the battery having the same capacity may be significantly shortened, that is, the charging speed in the fast wireless charging mode is faster than the charging speed in the normal wireless charging mode.

Figure 17:
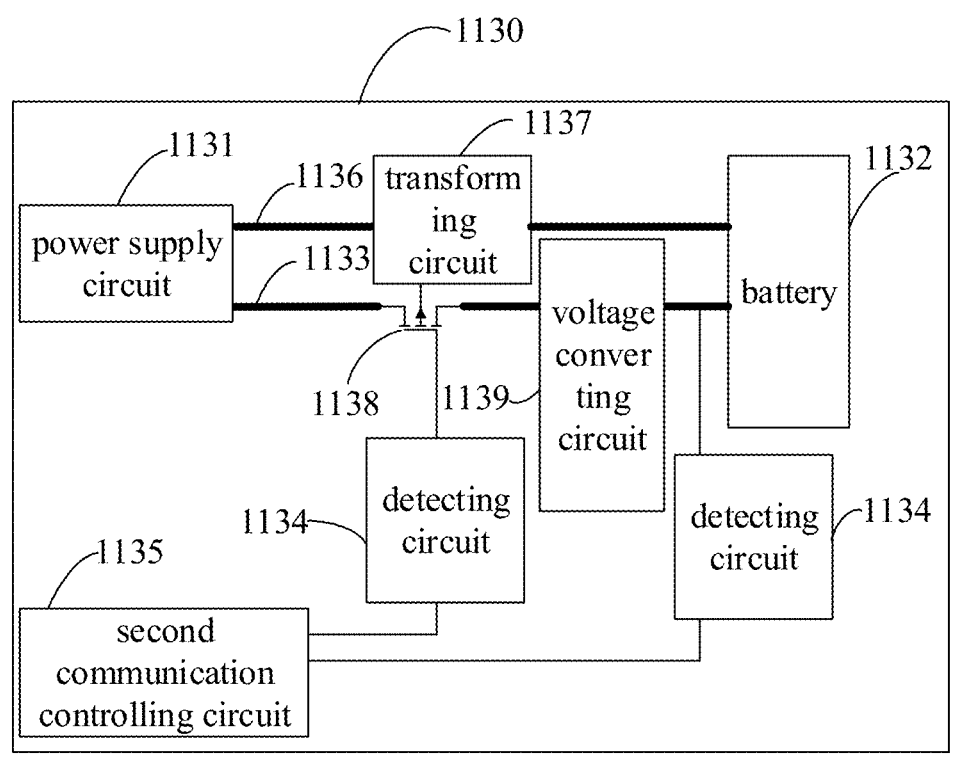
FIG. 17 is a schematic structural view of the wireless receiving device according to a yet embodiment of the present disclosure.

Referring to FIG. 17, in an embodiment of the present disclosure, the to-be-charged 1130 may further include a second charging channel 1136. The second charging channel 1136 may be a wire. A transforming circuit 1137 may be arranged on the second charging channel 1136, and configured to perform a voltage controlling process on the DC output by the wireless receiving circuit 1131. In this way, an output voltage and an output current of the second charging channel 1136 may be obtained to charge the battery 1132.

In an embodiment, the transforming circuit 1137 may be configured to be used in the Buck circuit and output an electrical energy of a constant voltage and/or a constant current. In other words, the transforming circuit 1137 may be configured to control a constant-voltage and/or constant-current in the charging process of the battery.

When the second charging channel 1136 is adopted to charge the battery 1132, the wireless transmitting circuit 1121 may be configured to transmit an electromagnetic signal by adopting a constant transmission power. After the wireless receiving circuit 1131 receives the electromagnetic signal, the transforming circuit 1137 is configured to process the electromagnetic signal to obtain the voltage and the current satisfying the charging requirements of the battery 1132, and input the voltage and the current to the battery 1132, so as to realize charging the battery 1132. It should be understood that, in some embodiments, the constant transmission power may not mean that the transmission power remains completely unchanged, but may vary within a certain range. For example, the transmission power is 7.5 W, fluctuating by 0.5 W.

In the embodiments of the present disclosure, a charging method of charging the battery 1132 through the first charging channel 1133 is the first charging mode, and a charging method of charging the battery 1132 through the second charging channel 1136 is the second charging mode. The transmitting device 1120 of the wireless charging signal and the to-be-charged device may be configured to determine whether the first charging mode or the second charging mode to be adopted to charge the battery 1132, through a handshake communication.

In the present embodiment, for transmitting device 1120 of the wireless charging signal, when the to-be-charged device is charged through the first charging mode, the maximum transmission power of the wireless transmitting circuit 1121 may be a first transmission power value. When the to-be-charged device is charged through the second charging mode, the maximum transmission power of the wireless transmitting circuit 1121 may be a second transmission power value. The first transmission power value is greater than the second transmission power value. Therefore, the first charging speed of charging the to-be-charged device through the first charging mode is greater than the second charging speed of charging the to-be-charged device through the second charging mode.

The second communication controlling circuit 1135 may also be configured to control a switching between the first charging channel 1133 and the second charging channel 1136. For example, referring to FIG. 17, a switch 1138 may be arranged on the first charging channel 1133, and the second communication controlling circuit 1135 may be configured to control the switching between the first charging channel 1133 and the second charging channel 1136 through controlling an on and an off of the switch 1138. As mentioned above, in some embodiments, the transmitting device of the wireless charging signal 1120 may include a first charging mode and a second charging mode. The first charging speed of the transmitting device 1120 of the wireless charging signal to the to-be-charged device under the first charging mode is greater than the second charging speed of the transmitting device 1120 of the wireless charging signal to the to-be-charged device under the second charging mode. When the transmitting device 1120 of the wireless charging signal charges the battery in the to-be-charged device 1130 through the first charging mode, the to-be-charged device 1130 may be configured to control the first charging channel 1133 to operate. When the transmitting device 1120 of the wireless charging signal charges the battery in the to-be-charged device 1130 through the second charging mode, the to-be-charged device 1130 may be configured to control the second charging channel 1136 to operate.

On a side of the to-be-charged device 1130, the second communication controlling circuit 1135 may be configured to switch between the first charging channel 1133 and the second charging channel 1136 based on the charging modes. When the first wireless charging mode is adopted, the second communication controlling circuit 1135 is configured to control the voltage converting circuit 1139 on the first charging channel 1133 to operate. When the second wireless charging mode is adopted, the second communication controlling circuit 1135 is configured to control the converting circuit 1137 on the second charging channel 1136 to operate.

In some embodiments, the transmitting device 1120 of the wireless charging signal may be configured to communicate with the to-be-charged device 1130, to negotiate the charging modes between the transmitting device 1120 of the wireless charging signal and the to-be-charged device 1130.

Besides a communication content described above, a lot of other communication information may be exchanged between the first communication controlling circuit 1122 in the transmitting device 1120 of the wireless charging signal and the second communication controlling circuit 1135 in the to-be-charged device 130. In some embodiments, the first communication controlling circuit 1122 and the second communication controlling circuit 1135 may be configured to exchange information used for a safety protection, an abnormality detection, or a fault handling, such as temperature information of the battery 1132, instruction information of entering overvoltage protection or overcurrent protection, power-transmission efficiency information (the power-transmission efficiency information may be configured to indicate a power-transmission efficiency between the wireless transmitting circuit 1121 and the wireless receiving circuit 1131).

In some embodiments, the communication between the second communication controlling circuit 1135 and the first communication controlling circuit 1122 may be a unidirectional communication or a bidirectional communication, which is not specifically limited in the embodiments of the present disclosure.

In the present embodiment, a function of the second communication controlling circuit may be implemented by an application processor of the to-be-charged device 1130, such that a hardware cost may be saved. In other embodiments, the function of the second communication controlling circuit may be implemented by an independent control chip, such that a reliability of controlling may be improved.

In the present embodiment, both the wireless receiving circuit 1131 and the voltage converting circuit 1139 may be integrated into the same wireless charging chip. In this way, an integration degree of the to-be-charged device 1130 may be improved, which may simplify a structure of the to-be-charged device 1130. For example, functions of a traditional wireless charging chip may be extended to include a charging management function.

In the above embodiments, the method may be implemented by a software, a hardware, a firmware or any other combination in whole or in part. When the method is implemented by the software, the method may be implemented in a form of a computer program product in whole or in part. The computer program product includes one or more computer instructions. When the computer instructions are loaded and executed on a computer, processes or functions described in the embodiments of the present disclosure are generated in whole or in part. The computer may be a general purpose computer, a special purpose computer, a computer network, or other programmable devices. The computer instructions may be stored in a non-transitory computer-readable storage medium, or be transmitted from a non-transitory computer-readable storage medium to another non-transitory computer-readable storage medium. For example, the computer instructions may be transmitted from a website site, a computer, a server, or a data center to another website site, another computer, another server, or another data center by a wire way (e.g., a coaxial cable, an optical fiber, a Digital Subscriber Line (DSL)) or a wireless way (e.g., an infrared, a microwave, etc.). The non-transitory computer-readable storage medium may be any available medium that may be accessed by the computer. Or the non-transitory computer-readable storage medium may be a data storage device such as the server, the data center, etc., including one available medium or an integration of more available media. The available medium may be a magnetic media (e.g., a floppy disk, a hard disk, a magnetic tape), an optical media (e.g., Digital Video Disc (DVD)), or a semiconductor media (e.g., a Solid State Disk (SSD)), etc.

Those of ordinary skill in the art can realize that a unit and an algorithm operation of each example described in conjunction with the embodiments disclosed herein may be implemented by means of an electronic hardware, or a combination of a computer software and the electronic hardware. Whether the functions are performed by means of a hardware or a software depends on a specific application and a design constraint of a technical solution. A professional skilled person may implement the functions described by adopting a different method for each particular application, which should not be considered beyond the scope of the present disclosure.

In several embodiments provided in the present disclosure, it should be understood that the system, the device and the method disclosed may be implemented in other manners. For example, the embodiments of the device described above are only illustrative. For example, a division of units is only a logical-function division. In an actual implementation, there may be other division manners. For example, multiple units or components may be combined or integrated to another system. Or some features may be omitted, or not implemented. On the other hand, a mutual coupling or a direct coupling or a communication connection shown or discussed, may be implemented through some interfaces. An indirect coupling or the communication connection between devices or the units, may be in electrical, mechanical or in other forms.

In the present disclosure, although terms "first", "second", etc. may be used to describe various devices, the devices should not be limited by the terms. The terms are only used to distinguish a device from another device. For example, without changing a meaning of the description, a first device may be referred to a second device, and likewise, the second device may be referred to the first device, as long as all "first device" occurred are consistently renamed and all "second device" occurred are renamed consistently. The first device and the second device are both devices, but may not be the same device.

The units described as separate components may or may not be physically separated. Components displayed as units may or may not be physical units, that is, the components may be located in one place, or may be distributed to multiple network units. Some or all of the units may be selected according to actual needs to achieve a purpose of the present embodiment solution.

In addition, each functional unit in each of the embodiments of the present disclosure may be integrated into a processing unit, or each functional unit may exist physically alone, or two or more functional units may be integrated into the processing unit.

The above descriptions are only specific embodiments of the present disclosure, but the protection scope of the present disclosure is not limited to thereof. Any changes or transformations may be easily obtained by a person skilled in the art, within a technical scope of the present disclosure, should be included in the protection scope of the present disclosure. Therefore, the protection scope of the present disclosure should be subject to a protection scope of the claims.

What is claimed is:

1. A wireless receiving device, comprising:
a plurality of receiving coils, coupled with a transmitting coil respectively, and configured to receive wireless charging signals transmitted from the transmitting coil respectively; and
a plurality of wireless receiving-processing circuits, configured to perform a voltage and/or current process for the wireless charging signals received by the receiving coils, to charge a battery;
wherein a terminal of each of the wireless receiving-processing circuits is connected to a corresponding one of the receiving coils, and another terminal of each of the wireless receiving-processing circuits is connected to the battery;
wherein the receiving coils comprise:
a first receiving coil, coupled to the transmitting coil, and configured to receive a first wireless charging signal from the transmitting coil; and
a second receiving coil, coupled to the transmitting coil, and configured to receive a second wireless charging signal from the transmitting coil;
wherein the wireless receiving-processing circuits comprise:
a first Alternating Current (AC)/Direct Current (DC) converting circuit, connected to the first receiving coil, and configured to convert the first wireless charging signal to a first DC voltage and a first DC current;
a second AC/DC converting circuit, connected to the second receiving coil, and configured to convert the second wireless charging signal to a second DC voltage and a second DC current; and
a first voltage converting circuit, connected to the first AC/DC converting circuit; and a second voltage converting circuit, connected to the second AC/DC converting circuit;
wherein the first voltage converting circuit and the second voltage converting circuit are configured to perform a voltage-boosting or a voltage-bucking process for the first DC voltage and the second DC voltage respectively, to obtain a third DC voltage for charging the battery;
wherein the wireless receiving device further comprises:
a controlling circuit, configured to control the first AC/DC converting circuit and the first voltage converting circuit to operate, and/or control the second AC/DC converting circuit and the second voltage converting circuit to operate, based on charging modes of the battery;
wherein the charging modes of the battery comprise a first charging mode and a second charging mode, and a first charging speed of the first charging mode is greater than a second charging speed of the second charging mode.

2. The device according to claim 1, wherein the wireless receiving-processing circuits comprise:
the controlling circuit is configured to control the first AC/DC converting circuit and the first voltage converting circuit to operate, and/or control the second AC/DC converting circuit and the second voltage converting circuit to operate, based on charging stages of the battery;
wherein the charging stages of the battery comprise at least one of: a trickle charging stage, a constant-current charging stage and a constant-voltage charging stage.

3. The device according to claim 2, wherein the first voltage converting circuit comprises a buck circuit, or a buck-boost circuit or a charging Integrated Circuit (IC).

4. The device according to claim 2, wherein the second voltage converting circuit comprises a charge pump circuit, and the controlling circuit is configured to control the charge pump circuit to operate in the constant-current charging stage.

5. The device according to claim 2, wherein the wireless receiving-processing circuits further comprise a third voltage converting circuit connected to the first AC/DC converting circuit and/or the second AC/DC converting circuit;

wherein both the first voltage converting circuit and the second voltage converting circuit comprise a charge pump circuit respectively, the controlling circuit is configured to control the first voltage converting circuit and the second voltage converting circuit to operate in the constant-current charging stage, and control the third voltage converting circuit to operate in the trickle charging stage and/or the constant-voltage charging stage.

6. The device according to claim 5, wherein the third voltage converting circuit comprises a buck circuit, or a buck-boost circuit or a charging IC.

7. The device according to claim 1, wherein voltage converting circuits comprised by the wireless receiving-processing circuits are configured to perform a voltage-bucking process for DC voltages after being processed by AC/DC converting circuits comprised by the wireless receiving-processing circuits, in response to the battery comprising a plurality of cells connected in parallel.

8. The device according to claim 1, wherein voltage converting circuits comprised by the wireless receiving-processing circuits are configured to perform a voltage-boosting process for DC voltages after being processed by AC/DC converting circuits comprised by the wireless receiving-processing circuits, in response to the battery comprising a plurality of cells connected in series.

9. The device according to claim 1, wherein each of the wireless receiving-processing circuits comprises:
   an AC/DC converting circuit, configured to convert a wireless charging signal received by a receiving coil connected to the AC/DC converting circuit to a DC voltage and a DC current; and
   a voltage converting circuit, configured to perform a voltage-boosting or a voltage-bucking process for the DC voltage output by the AC/DC converting circuit, to obtain a charging voltage satisfying charging requirements of the battery.

10. The device according to the claim 9, further comprising:
   a controlling circuit, configured to generate feedback information based on at least one of charging parameters and feed the feedback information back to a wireless transmitting device;
   wherein the charging parameters comprise a voltage between two terminals of the battery, a charging current of the battery, an output current of each of the AC/DC converting circuits, an output voltage of each of the AC/DC converting circuits;
   wherein the feedback information is configured to instruct the wireless transmitting device to adjust transmission powers of wireless charging signals transmitted from the wireless transmitting device; and
   wherein the voltage between the two terminals of the battery and the charging current of the battery are provided to the wireless transmitting device to determine the transmission powers of the wireless charging signals, the output current of each of the AC/DC converting circuits and the output voltage of each of the AC/DC converting circuits are provided to the wireless transmitting device to determine transmission voltages of the wireless charging signals after the transmission powers of the wireless charging signals being determined.

11. The device according to claim 10, wherein the controlling circuit is further configured to determine a required charging power of the battery based on the voltage between the two terminals of the battery and/or the charging current of the battery, and feed the required charging power as the feedback information back to the wireless transmitting device, to make the wireless transmitting device adjust the transmission powers of the wireless charging signals.

12. The device according to claim 10,
   wherein the controlling circuit is further configured to determine a required current of the battery based on output currents and/or output voltages of the AC/DC converting circuits, and feed the required current as the feedback information back to the wireless transmitting device to make the wireless transmitting device adjust the transmission powers of the wireless charging signals based on the required current.

13. The device according to claim 10, wherein the controlling circuit is further configured to determine a required charging power of the battery based on information of the battery, and determine a required current of the battery based on output currents of the AC/DC converting circuits, and determine a required voltage of the battery based on the required charging power and the required current, and feed the required voltage or a voltage difference between the required voltage and an output voltage of any one of the AC/DC converting circuits as the feedback information back to the wireless transmitting device.

14. The device according to claim 10, wherein the feedback information is configured to instruct the wireless transmitting device to increase or decrease the transmission voltages.

15. The device according to claim 1, further comprising:
   a controlling circuit, configured to control some of the plurality of the receiving coils to receive the wireless charging signals transmitted from a wireless transmitting device, some of the wireless receiving-processing circuits corresponding to the some of the receiving coils being configured to perform a voltage and/or current process for the wireless charging signals;
   wherein the some of the receiving coils are at least one of the receiving coils.

16. The device according to claim 15, wherein the controlling circuit is configured to control the some of the receiving coils to receive the wireless charging signals transmitted from the wireless transmitting device, the some of the wireless receiving-processing circuits corresponding to the some of the receiving coils being configured to perform the voltage and/or current process for the wireless charging signals, in response to at least one of preset conditions being satisfied;
   wherein the preset conditions comprise:
   a power transmitted from the wireless transmitting device being less than a preset power threshold;
   a temperature of any one of the plurality of receiving coils being greater than a preset temperature threshold; and
   an output voltage or output current of any one of the wireless receiving-processing circuits being greater than a preset voltage/current threshold.

17. A wireless charging system, comprising:
   a wireless transmitting device, comprising:
      an inverter circuit, configured to convert an input DC to an AC; and
      a transmitting coil, configured to convert the AC to a wireless charging signal capable of being transmitted through an electromagnetic domain; and
   a wireless receiving device, comprising:
      a plurality of receiving coils, coupled with the transmitting coil, and configured to receive wireless charging signals transmitted by the transmitting coil; and a plurality of wireless receiving-processing circuits, configured to perform a voltage and/or current process for the wireless charging signals received by the receiving coils, to charge a battery;
wherein a terminal of each of the wireless receiving-processing circuits is connected to a corresponding one of the receiving coils, and another terminal of each of the wireless receiving-processing circuits is connected to the battery;
wherein the receiving coils comprise:
   a first receiving coil, coupled to the transmitting coil, and configured to receive a first wireless charging signal from the transmitting coil; and
   a second receiving coil, coupled to the transmitting coil, and configured to receive a second wireless charging signal from the transmitting coil;
wherein the wireless receiving-processing circuits comprise:
   a first Alternating Current (AC)/Direct Current (DC) converting circuit, connected to the first receiving coil, and configured to convert the first wireless charging signal to a first DC voltage and a first DC current;
   a second AC/DC converting circuit, connected to the second receiving coil, and configured to convert the second wireless charging signal to a second DC voltage and a second DC current; and
   a first voltage converting circuit, connected to the first AC/DC converting circuit; and a second voltage converting circuit, connected to the second AC/DC converting circuit;
wherein the first voltage converting circuit and the second voltage converting circuit are configured to perform a voltage-boosting or a voltage-bucking process for the first DC voltage and the second DC voltage respectively, to obtain a third DC voltage for charging the battery;
wherein the wireless receiving device further comprises:
   a controlling circuit, configured to control the first AC/DC converting circuit and the first voltage converting circuit to operate, and/or control the second AC/DC converting circuit and the second voltage converting circuit to operate, based on charging modes of the battery;
wherein the charging modes of the battery comprise a first charging mode and a second charging mode, and a first charging speed of the first charging mode is greater than a second charging speed of the second charging mode.

18. A wireless charging method, comprising:
a plurality of receiving coils receiving wireless charging signals transmitted from a transmitting coil; and
a plurality of wireless receiving-processing circuits performing a voltage and/or current process for the wireless charging signals received by the receiving coils, to charge a battery;
wherein a terminal of each of the wireless receiving-processing circuits is connected to a corresponding one of the receiving coils, and another terminal of each of the wireless receiving-processing circuits is connected to the battery;
wherein the receiving coils comprise:
   a first receiving coil, coupled to the transmitting coil, and configured to receive a first wireless charging signal from the transmitting coil; and
   a second receiving coil, coupled to the transmitting coil, and configured to receive a second wireless charging signal from the transmitting coil;
wherein the wireless receiving-processing circuits comprise:
   a first Alternating Current (AC)/Direct Current (DC) converting circuit, connected to the first receiving coil, and configured to convert the first wireless charging signal to a first DC voltage and a first DC current;
   a second AC/DC converting circuit, connected to the second receiving coil, and configured to convert the second wireless charging signal to a second DC voltage and a second DC current; and
   a first voltage converting circuit, connected to the first AC/DC converting circuit; and a second voltage converting circuit, connected to the second AC/DC converting circuit;
wherein the first voltage converting circuit and the second voltage converting circuit are configured to perform a voltage-boosting or a voltage-bucking process for the first DC voltage and the second DC voltage respectively, to obtain a third DC voltage for charging the battery;
wherein the wireless charging method further comprises:
   a controlling circuit controlling the first AC/DC converting circuit and the first voltage converting circuit to operate, and/or control the second AC/DC converting circuit and the second voltage converting circuit to operate, based on charging modes of the battery;
wherein the charging modes of the battery comprise a first charging mode and a second charging mode, and a first charging speed of the first charging mode is greater than a second charging speed of the second charging mode.

* * * * *